United States Patent [19]
Ohuchi

[11] Patent Number: 5,488,938
[45] Date of Patent: Feb. 6, 1996

[54] FAULT DETECTING APPARATUS FOR EXHAUST GAS RECIRCULATION CONTROL SYSTEM OF INTERNAL COMBUSTION ENGINE

[75] Inventor: Hirofumi Ohuchi, Himeji, Japan

[73] Assignee: Mitsubishi Denki Kabushiki Kaisha, Tokyo, Japan

[21] Appl. No.: 397,641

[22] Filed: Mar. 2, 1995

[30] Foreign Application Priority Data

Jul. 20, 1994 [JP] Japan .................................. 6-168447

[51] Int. Cl.⁶ .................................................. F02M 25/07
[52] U.S. Cl. ........................................ 123/571; 73/117.3
[58] Field of Search ..................... 123/568, 569, 123/571; 73/117.3, 118.2; 364/431.06

[56] References Cited

U.S. PATENT DOCUMENTS

| | | | |
|---|---|---|---|
| 4,715,348 | 12/1987 | Kobayashi et al. ...................... | 123/571 |
| 4,762,109 | 8/1988 | Jeenicke .................................. | 123/571 |
| 5,137,004 | 8/1992 | Takahata et al. ........................ | 123/571 |
| 5,150,695 | 9/1992 | Kondo .................................... | 123/571 |
| 5,152,273 | 10/1992 | Ohuchi .................................... | 123/571 |
| 5,337,725 | 8/1994 | Narita ...................................... | 123/571 |
| 5,368,005 | 11/1994 | Kako ........................................ | 123/571 |

*Primary Examiner*—Willis R. Wolfe
*Attorney, Agent, or Firm*—Sughrue, Mion, Zinn, Macpeak and Seas

[57] ABSTRACT

A fault detecting apparatus for an exhaust gas recirculation control system of an internal combustion engine includes a throttle valve provided in an intake pipe of the engine, an exhaust gas recirculation pipe for introducing an exhaust gas of the engine to the intake pipe downstream of the throttle valve, an exhaust gas recirculation valve for regulating a recirculation flow rate of the exhaust gas, sensors for detecting operation state inclusive of an intake pressure, an exhaust gas recirculation valve control unit for controlling the exhaust gas recirculation valve in accordance with operation state information, a fault decision enabling condition detecting means for detecting satisfaction of the condition enabling the decision about occurrence of fault in the recirculation valve control unit on the basis of the operation state information, a unit for forcibly opening and/or closing the exhaust gas recirculation valve when the fault decision enabling condition is satisfied, a fault decision means for comparing a value derived from the intake pressures detected upon enforcive opening/closing of the exhaust gas recirculation control valve with a fault decision reference value to decide whether any fault occurs in the recirculation valve control unit, and a compensation means for compensating for influence of a parameter which affects the intake pressures detected upon enforcive opening/closing of the recirculation valve. The range within which the fault decision is enabled can be widened and/or reliability of the fault decision can be improved.

72 Claims, 27 Drawing Sheets

FAULT DETECTING APPARATUS FOR EXHAUST GAS RECIRCULATION CONTROL SYSTEM OF INTERNAL COMBUSTION ENGINE

BACKGROUND OF THE INVENTION

1. Field of the Invention

The present invention generally relates to a fault detecting apparatus for detecting abnormality or fault in an exhaust gas recirculation control system of an internal combustion engine (hereinafter also referred to simply as the engine). In particular, the invention is concerned with a fault detecting apparatus which is improved in respect to accuracy and reliability by suppressing influences of various factors or parameters involved in fault detection processes.

2. Description of Related Art

Heretofore, in the field of the engine control systems for the automobiles or motor vehicles, the exhaust gas recirculation control techniques for feeding back or recirculating a part of exhaust gas to the engine for thereby lowering the combustion temperature for the purpose of suppressing $NO_x$-components contained in the engine exhaust gas are widely known. For having better understanding of the background techniques of the present invention, description will first be made in some detail of conventional exhaust gas recirculation control systems.

FIG. 21 is a block diagram for illustrating schematically a general arrangement of an internal combustion engine system equipped with an exhaust gas recirculation control system known heretofore.

Referring to FIG. 21, the internal combustion engine system is comprised of an engine body 1 having a plurality of cylinders, an air cleaner 2 for purifying intake air to be introduced into the engine, an intake pipe 3 for feeding the air introduced through the air cleaner 2 to the engine, an intake 4 for connecting the intake pipe 3 to the plurality of cylinders of the engine 1, a fuel injector 5 for injecting fuel into the engine cylinders, a pressure sensor 6 for detecting a intake pressure Pb within the intake 4 or within the intake pipe 3 at a position located in the vicinity of the intake 4 (this pressure will be referred to as the intake pressure), a throttle valve 7 disposed within the intake pipe 3 for controlling an intake air flow, a throttle position sensor 8 for detecting an opening degree θ of the throttle valve 7, and a linear-solenoid type bypass air flow rate control means 9 for controlling an air flow rate which bypasses the throttle valve 7 via a pipe connected across the throttle valve 7 in parallel to the intake pipe 3.

An exhaust gas recirculation pipe (hereinafter also referred to as the EGR pipe) 10 is provided for feeding back or recirculating a part of the exhaust gas discharged from the engine 1 to the intake pipe 3. An exhaust gas recirculation valve (hereinafter also referred to as the EGR control valve) 11 of a vacuum-motor-driven type is installed in the EGR pipe 10 for controlling the flow rate of the exhaust gas flowing through the EGR pipe 10. Opening and closing of the EGR control valve 11 is controlled by a three-way solenoid valve device (hereinafter referred to as the EGR solenoid device) 12 which has inlet ports communicated to the intake pipe 3 and the atmosphere, respectively, and an outlet port communicated to the EGR control valve 11. The EGR control valve 11 and the EGR solenoid device 12 cooperate to constitute an exhaust gas recirculation flow control means for adjusting the exhaust gas recirculation flow rate in dependence on the operation states of the engine 1 under the control of an electronic control unit 22, which will be made apparent later on.

An ignition coil 13 serves for generating a high voltage required for combustion of air/fuel mixture gas within the individual cylinders of the engine 1. Provided in association with the ignition coil 13 is a firing or ignitor circuit 14 for interrupting a primary current of the ignition coil 13 to thereby generate a spark for triggering combustion of the air/fuel mixture. The exhaust gas resulting from the combustion within the engine cylinders is discharged through an exhaust pipe 15. A catalytic converter 16 for purifying the exhaust gas is installed in the exhaust pipe 15 at a position downstream of a location from which the EGR pipe 10 is branched.

An ignition signal Q generated by the ignition coil 13 adapted to be driven by the ignitor 14 has a frequency which corresponds to the rotation speed (rpm) of the engine 1 and thus can be utilized as a sensor signal indicative of the rotation speed or number (rpm) of the engine 1. Further, as other engine operation state sensor means, there are provided a water temperature sensor 17 for detecting a temperature T of the cooling water of the engine 1 and an idle switch 18 for detecting whether or not the throttle valve 7 is in the fully closed state (i.e., the state in which the opening degree of the throttle valve is zero), to thereby generate an idle signal I when the throttle valve 7 is in the fully closed state. An air-conditioner on/off switch 19 is provided for generating an air-conditioner power-on signal A serving as an on/off command for an air conditioner (not shown) which represents a typical one of the engine loads. An air-conditioner controller 19A is adapted to control the air conditioner in accordance with an air-conditioner control signal D generated by the electronic control unit 22 in response to the air-conditioner power-on signal A by taking into account the operation state of the engine.

The pressure sensor 6, the throttle position sensor 8, the ignition coil 13, the water temperature sensor 17, the idle switch 18, the air-conditioner on/off switch 19 and others cooperate to constitute a sensor means which provides information concerning the operation states of the engine 1. An ignition key switch 21 is closed upon starting of the engine operation for supplying an electric power to various electric/electronic units and devices of the motor vehicle from an onboard battery 20.

The electronic control unit 22 mentioned previously is constituted by a computer system. The electronic control unit 22 which is put into operation upon reception of an electric power from the battery 20 is designed to fetch from a variety of sensor means mentioned above the engine operation state information such as those typified by the throttle opening degree θ, the idle signal I, the intake manifold pressure Pb, the cooling water temperature T, the ignition signal Q (i.e., engine speed (rpm) signal), the air-conditioner power-on signal A and others to thereby control the fuel injection amount, the exhaust gas recirculation flow rate and the bypass air flow rate, respectively, in addition to the control of the air-conditioner.

More specifically, the electronic control unit 22 includes a fuel control means, an exhaust gas recirculation control means, an exhaust gas recirculation system fault decision means and others, whereby a fuel injection control signal J for the fuel injector 5, an EGR control signal for the EGR solenoid device 12, a bypass control signal B for the bypass air flow rate control means 9 and the air-conditioner control signal D for the air-conditioner controller 19A are outputted from the electronic control unit 22.

FIG. 22 is a block diagram showing in detail a functional configuration of the electronic control unit 22 of FIG. 21. Referring to FIG. 22, a microcomputer 100 includes a CPU (Central Processing Unit) 200 for generating the various control signals J, C, B and D mentioned above on the basis of the aforementioned engine operation state information Q, Pb, θ, T, I and A in accordance with predetermined programs, a free-running counter 201 for measuring a period of rotation cycle of the engine 1, a timer 202 for measuring timings and temporal durations for the various controls, an analogue-to-digital converter (hereinafter referred to as the A/D converter) 203 for converting analogue input signals into digital signals, an input port 204, a RAM (Random Access Memory) 205 used as a work memory, a ROM (Read-Only Memory) 206 for storing various processing programs, an output port 207 for outputting the fuel injection control signal J, the exhaust gas recirculation control signal C, the bypass control signal B and the air-conditioner control signal D, and a common bus 208 for interconnecting the CPU 200 with the various components 201 to 207 mentioned above.

The electronic control unit 22 further includes a first input interface circuit 101 for shaping the ignition signal Q for the ignition coil 13 to thereby generate an interrupt signal to be inputted to the microcomputer 100. Thus, upon every generation of the ignition signal Q as the interrupt signal, the CPU 200 incorporated in the microcomputer 100 reads the count value from the counter 201 to calculate the rotation period of the engine 1 on the basis of a difference between the count values read out at the current time point and at a preceding time point, respectively. The engine rotation period thus determined is then stored in the RAM 205.

The electronic control unit 22 includes a second input interface circuit 102 which serves for fetching the intake pressure Pb, the throttle opening degree signal θ and the cooling water temperature T, respectively, from the pressure sensor 6, the throttle position sensor 8 and the water temperature sensor 17. These sensor signals are inputted to the A/D converter 203.

Further, the electronic control unit 22 includes a third input interface circuit 103 through which the idle signal I and the air-conditioner power-on signal A are fetched from the idle switch 18 and the air-conditioner on/off switch 19, respectively, to be supplied to the input port 204.

On the other hand, an output interface circuit 104 of the microcomputer 100 serves to receive the various control signals J, C, B and D from the output port 207 to thereby output these control signals to the fuel injector 5, the EGR solenoid device 12, the bypass air flow rate control means 9 and the air-conditioner controller 19A, respectively, after amplification and shaping of the control signals.

Next, the exhaust gas recirculation control operation of the conventional control system will be described by reference to FIGS. 21 and 22.

When the EGR solenoid device 12 is electrically energized in response to the EGR control signal C, a negative pressure is applied to a negative pressure chamber of the EGR control valve 11, as a result of which the EGR control valve 11 is opened, whereby a part of the engine exhaust gas is recirculated to be introduced into the engine 1.

On the other hand, when the EGR solenoid device 12 is turned off in response to the EGR control signal C, the atmospheric pressure is applied to the negative pressure chamber of the EGR control valve 11, which will result in closing of the EGR control valve 11 and hence inhibition of recirculation of the exhaust gas into the engine 1. In this manner, the EGR solenoid device 12 controls introduction of the exhaust gas to the engine 1 in response to the EGR control signal C.

The bypass control signal B for the bypass air flow rate control means 9 which may be constituted by an ISC solenoid valve device is supplied in the form of a pulse signal having a duty ratio which is controllable. Thus, when the duty ratio of the bypass control signal B is increased, the current flowing the bypass air flow rate control means 9 increases correspondingly. As a result of this, the flow area of the ISC solenoid valve device is increased, whereby the cross sectional area of the air passage bypassing the throttle valve 7 increases. In this manner, the bypass air flow rate can be controlled.

The engine load driving means incorporated in the electronic control unit 22 generates the air-conditioner control signal D for actuating the air conditioner when the air-conditioner power-on signal A indicates the command "ON" and when the engine operation state satisfies the condition which permits the air conditioner to be put into operation. On the other hand, when the air-conditioner power-on signal A commands the turn-off of the air conditioner, the air-conditioner control signal D for deenergizing the air conditioner is generated. In this way, the air conditioner is controlled with preference being put on the engine operation state with a view to protecting the engine against application of an excessively large load.

Next, description will turn to the operation of a hitherto known fault or abnormality detecting apparatus for the exhaust gas recirculation control system implemented in the structure described above by reference to FIGS. 21 and 22 on the assumption, by way of example only, that the fault detection is carried out in the deceleration state of the engine. FIG. 23 is a flow chart for illustrating a conventional fault detection processing executed by the CPU 200 incorporated in the electronic control unit 22 for detecting occurrence of a fault or abnormality in the exhaust gas recirculation control system.

At first, in a step S101, it is checked from an engine rotation number Ne (rpm) determined previously on the basis of the ignition signal Q through a proper processing routine (not shown) and the idle signal I outputted from the idle switch 18 whether the engine rotation number Ne is higher than a predetermined value and whether the throttle valve 7 is in the fully closed state (i.e., the idle signal I is at the on-level). When both the conditions mentioned above are satisfied, it is then decided that the motor vehicle is in the state of deceleration (i.e., the conditions prerequisite for making the decision concerning occurrence of a fault or abnormality in the exhaust gas recirculation control system are met or satisfied).

When it is decided in the above-mentioned step S101 that the motor vehicle is not in the deceleration state (i.e., when the decision step S101 results in negation "NO"), the fault detection processing illustrated in FIG. 23 is terminated, as represented by RETURN. In contrast, when the decision step S101 results in affirmation "YES", indicating that the motor vehicle is in the deceleration state, the processing proceeds to steps 102 et seq.

In the step S102, the EGR solenoid device 12 is electrically deenergized with the exhaust gas recirculation being invalidated or set to the EGR-off state, which is then followed by execution of the step S103 where the intake manifold pressure Pb in the EGR-off state is stored as a value PbOFF (hereinafter also referred to as the EGR-off intake pressure value). Parenthetically, it should be mentioned that in the deceleration state of the motor vehicle, the exhaust gas recirculation is normally invalidated in the initial state. Accordingly, it is unnecessary to turn off forcibly or positively the EGR solenoid device 12.

Subsequently, in a step S104, the EGR solenoid device 12 is forcibly turned on to open the EGR valve 11 for thereby validating the exhaust gas recirculation (i.e., set up the EGR-on state). In a next step S105, the intake manifold pressure Pb is fetched in the EGR-on state to be stored as a value PbON (hereinafter also referred to as the EGR-on intake pressure value).

In this conjunction, it will readily be understood that there will make appearance a difference between the EGR-off intake pressure value PbOFF and the EGR-on intake manifold pressure value PbON so long as the exhaust gas recirculation control system is operating normally without suffering any fault or abnormality. Accordingly, in a step S106, a pressure difference ΔP between the EGR-on intake manifold pressure value PbON and the EGR-off intake manifold pressure value PbOFF is arithmetically determined in accordance with:

$$\Delta P = PbON - PbOFF$$

In succession, in a step S107, it is decided whether or not the intake manifold pressure difference ΔP mentioned above is greater than a preset decision reference value FAIL (representing a lower limit value of the intake manifold pressure difference ΔP in the normal state of the exhaust gas recirculation). When the result of the decision in the step S107 is affirmative or "YES" (i.e., when ΔP≧FAIL), this means that the intake manifold pressure difference ΔP has a normal value (indicating the normal exhaust gas recirculation state). Accordingly, in a step S108, it is decided that the exhaust gas recirculation control system operates normally without suffering any abnormality.

On the other hand, when the decision result of the step S107 indicates that ΔP<FAIL (i.e., when the step S107 results in negation "NO"), this means that the intake manifold pressure difference ΔP does not reach the lower limit value of the normal pressure difference (i.e., exhaust gas recirculation is not normally carried out). Accordingly, decision is made in a step S109 that the exhaust gas recirculation control system suffers abnormality.

Incidentally, when the engine deceleration state is decided in the step S101 mentioned above, the intake manifold pressure Pb can first be fetched in the EGR-off state (steps S102 and S103) without manipulating the EGR control valve 11 because the latter must normally be in the fully closed state when the motor vehicle is in the deceleration state. Subsequently, the EGR control valve 11 is forcibly set to the fully opened state for validating the exhaust gas recirculation by energizing the EGR solenoid device 12, whereon the intake manifold pressure value PbON is fetched in the EGR-on state (steps S104 and S105). However, because it is undesirable to terminate this routine in the state where the exhaust gas recirculation is effectuated, the processing is terminated in practice after the EGR control valve 11 is again set to the fully closed state (i.e., after the EGR-off state is regained).

In this conjunction, it should be mentioned that when the EGR control valve 11 is in the fully closed state (i.e, in the EGR-off state), the intake manifold pressure Pb is normally on the order of 260 mmHg, while when the exhaust gas is forcibly introduced into the engine with the EGR control valve 11 being fully opened (i.e., in the EGR-on state), the intake manifold pressure Pb amounts to ca. 460 mmHg because of a steep increase in the flow rate of the intake air introduced into the engine 1, although it depends on the specifications of the engine and the operation states thereof.

Thus, the intake manifold pressure difference ΔP calculated in the step S106 will assume a value of about 200 (=460−260) mmHg. Under the circumstances, the preset decision value FAIL used as the reference value in the comparison at the step S107 should preferably be set at, for example, 100 mmHg so that it can definitely be discriminated from the normal value (200 mmHg) of the intake manifold pressure difference ΔP.

As can be seen from the foregoing, the fault detection for the exhaust gas recirculation control system can be realized by making use of the fact that difference in the quantity of the intake air (i.e., difference between the fresh intake air and a sum of the recirculated exhaust gas and the fresh intake air) is reflected onto the intake manifold pressure Pb. Of course, occurrence of abnormality in the exhaust gas recirculation control system as detected in this way may be informed to the driver by turning on, for example, an alarm lamp or the like device through an appropriate processing routine (not shown).

Next, assuming that the engine is in the stable state, a fault detection processing for the exhaust gas recirculation control system known heretofore will be described by reference to a flow chart of FIG. 24.

Referring to the figure, in a step S211, it is checked on the basis of the engine rotation number Ne (rpm) and the throttle opening degree θ, whether deviations (changes) in the engine rotation number Ne and the opening degree θ, respectively, are smaller than or equal to respective preset reference values, to thereby decide whether or not the engine or the motor vehicle is in the stable state (i.e., whether the condition prerequisite to the decision of occurrence of a fault in the exhaust gas recirculation control system in the stable state is satisfied or not).

When the decision step S201 results in negation "NO", indicating that the motor vehicle is not in the stable state, the fault detection processing routine illustrated in FIG. 24 is terminated (RETURN). On the contrary, when the answer of the decision step S201 is affirmative "YES", indicating the stable operation state of the engine, the processing proceeds to steps S212 et seq. (corresponding to those S102 et seq. in FIG. 23).

At first, in the step S212, the EGR solenoid device 12 is activated to validate the exhaust gas recirculation, whereupon the intake manifold pressure Pb in the EGR validated state is stored as the EGR-on intake manifold pressure value PbON. Parenthetically, it should be mentioned that since the exhaust gas recirculation is validated already in the initial state when the motor vehicle is in the stable state, there exists no necessity for positively actuating the EGR solenoid device 12 for controlling the EGR control valve.

Subsequently, in a step S214, the EGR solenoid device 12 is forcibly turned off to thereby invalidate positively the exhaust gas recirculation, which is then followed by a step S215 where the intake manifold pressure Pb in the EGR-off state is stored as the EGR-off intake manifold pressure value PbOFF.

In this case, there will equally make appearance a difference between the EGR-off intake manifold pressure value PbOFF and the EGR-on intake manifold pressure value PbON so long as the exhaust gas recirculation control system is operating normally. Accordingly, in a step S216, a pressure difference ΔP between the EGR-on intake manifold pressure value PbON and the EGR-off intake manifold pressure value PbOFF is arithmetically determined in accordance with:

$$\Delta P = PbON - PbOFF$$

In succession, in a step S217, it is decided whether or not the intake manifold pressure difference ΔP mentioned above is greater than a preset reference value FAIL (indicating a lower limit of the intake manifold pressure difference ΔP so long as the normal exhaust gas recirculation is normal). When the result of the decision in the step S217 is affirmative or "YES" (i.e., when ΔP≧FAIL), this means that the intake manifold pressure difference ΔP has a normal value (indicating the normal exhaust gas recirculation state). Accordingly, in a step S218, it is decided that the exhaust gas recirculation control system operates normally without suffering any abnormality.

On the other hand, when the decision result of the step S217 indicates that ΔP<FAIL (i.e., when it results in negation "NO"), this means that the intake manifold pressure difference ΔP does not reach the lower limit value of the normal pressure difference range (i.e., exhaust gas recirculation is not effected normally). Accordingly, decision is made in a step S219 that the exhaust gas recirculation control system suffers abnormality.

Parenthetically, when the stable state is decided in the step S211 as mentioned above, this means that the EGR control valve 11 is opened at a predetermined aperture value. Accordingly, the intake manifold pressure Pb in the EGR-validated state (i.e., the EGR-on intake manifold pressure value PbON) is first fetched (steps S212 and S213). Subsequently, the EGR control valve 11 is forcibly closed fully by actuating the EGR solenoid device 12 (i.e., the exhaust gas recirculation is invalidated), whereupon the intake manifold pressure Pb is fetched as the EGR-off intake manifold pressure value (steps S214 and S215).

At this juncture, it should be mentioned that change in the flow rate of the intake air in the engine stable state is smaller than that in the engine deceleration state mentioned previously, because the EGR control valve 11 is fully closed from the state where the EGR control valve 11 is opened at a predetermined value (i.e., from the EGR-on state). This will be explained below.

Let's assume, by way of example, that the EGR ratio (corresponding to the opening degree of the EGR control valve 11) in the stable state is 10% and that the intake manifold pressure Pb in this state is 400 mmHg. Then, the EGR-off intake manifold pressure value PbOFF in the fully closed state can be given as follows:

$$\begin{aligned} PbOFF &= 400 - 400 \times 0.1 \\ &= 360 \text{ [mmHg]} \end{aligned}$$

Thus, the intake manifold pressure difference ΔP calculated in the step S216 is 40 mmHg (=400−360 mmHg). Consequently, the predetermined value FAIL referenced in the comparison step S217 is set about 20 mmHg so that it can definitely be distinguished from the normal value (40 mmHg) of the intake manifold pressure difference value ΔP.

It should further be mentioned that a processing routine for detecting change or variation of the stable state of the engine 1 is provided, although it is not shown, and activated as an interruption processing periodically at every predetermined time interval for sampling the engine rotation number Ne and the throttle opening degree θ for the purpose of detecting change in the stable state on the basis of differences of these parameters before and after the sampling point, respectively. When occurrence of the change in the stable state is detected, the fault detecting routine for the exhaust gas recirculation control system illustrated in FIG. 24 is terminated.

Of course, in the case of the fault detecting routine illustrated in FIG. 24, the occurrence of fault in the exhaust gas recirculation control system can be detected by executing a plurality of processing steps mentioned above by making use of the fact that variation or change in the intake air flow introduced to the engine 1 is reflected onto the intake manifold pressure Pb. Besides, it goes without saying that a processing for turning on an alarm lamp may be performed on the basis of the result of the fault detection processing for informing the driver or operator of the fault event in the exhaust gas recirculation control system.

Next, paying attention to the operation of the bypass air flow rate control means 9, a control operation known heretofore for controlling a bypass air flow rate Qb in the deceleration state of the engine will be described by reference to a timing chart of FIG. 25 which graphically illustrates a relation between a deceleration flag and the bypass air flow rate Qb as well as change of the latter as a function of time lapse. Parenthetically, a broken line in FIG. 25 illustrates a change in the bypass air flow rate Qb in the case of a fourth embodiment of the invention described later on.

At first, it assumed that the engine or motor vehicle is in the running state and that the deceleration flag is set to "0" (indicating that the motor vehicle is not in the deceleration state). In this case, the bypass air flow rate Qb is so controlled as to assume a substantially constant value which is essentially determined by the throttle opening degree θ. On the other hand, after the time point t0 at which the deceleration flag is set to "1" (indicating the deceleration state), the bypass air flow rate Qb is arithmetically determined periodically at a predetermined time interval in accordance with the following expression:

$$Qb_n = Qb_{n-1} - \beta$$

In the above expression, Qb represents a bypass air flow rate at a current time point (hereinafter referred to as the current bypass air flow rate), $Qb_{n-1}$ represents a bypass air flow rate at a preceding time point (hereinafter referred to as the preceding bypass air flow rate), and β represents a predetermined value. As can be seen from the above expression, the bypass air flow rate Qb decreases progressively as a function of time lapse in the deceleration state, as illustrated in FIG. 25. Parenthetically, the bypass air flow rate (Qb) decreasing operation mentioned above is generally known as what is called a dashpot operation.

Additionally, it should be mentioned that when an engine load is connected, e.g. upon actuation of the air conditioner, the bypass air flow rate Qb is increased in response to the air-conditioner control signal D. More specifically, the electronic control unit 22 outputs the air-conditioner control signal D to the air-conditioner controller 19A to place the air conditioner in the operating state, while the intake air flow rate is increased to ensure the generation of a demanded output torque by the engine 1.

At this juncture, it is to be recalled that occurrence of a fault in the exhaust gas recirculation control system is decided on the basis of the pressure difference ΔP in the intake manifold pressure Pb between the EGR-off state and the EGR-on state.

Consequently, when the fault decision for the exhaust gas recirculation control system is performed in the deceleration state as described hereinbefore by reference to FIG. 23, the intake manifold pressure difference ΔP as detected may assume different values in dependence on difference of the deceleration state such as difference between a rapid deceleration and a slow deceleration, leading to an erroneous fault detection in the worst case.

Now, possibilities of erroneous fault detection of the fault detecting apparatus for the exhaust gas recirculation control system known heretofore will be explained by reference to FIGS. 26 and FIG. 27, wherein FIG. 26 is a timing chart which illustrates a fault detecting operation in accordance with the procedure shown in FIG. 23 on the assumption that the exhaust gas recirculation control system operates in the normal state without suffering any fault and which shows relations among the EGR flag (indicating the EGR-on and EGR-off state), the engine rotation number (rpm) Ne and the intake manifold pressure Pb and changes thereof as a function of time lapse. Incidentally, in conjunction with the engine rotation number Ne and the intake manifold pressure Pb, single-dotted broken-line curves represent these quantities in a slow deceleration state, while solid-line curves represent them in a rapid deceleration state.

On the other hand, FIG. 27 is a characteristic diagram for illustrating a relation between the engine rotation number Ne (rpm) and the intake manifold pressure Pb (mmHg), wherein a solid-line curve represents the relation in the EGR-off state with a broken-line curve representing the relation in the EGR-on state. In this conjunction, reference character TA (FIG. 26) represents a fault detecting period during which the fault decision enabling conditions are satisfied.

Additionally, a reference symbol a in FIG. 27 indicates a point on the solid-line characteristic curve in the EGR-off state, symbol b indicates a transition point on the broken-line characteristic curve for the EGR-on state from the point a when the change in the engine rotation number Ne is small, and a symbol c indicates a transition point on the EGR-on curve (broken-line curve) when the change in the engine rotation number Ne is large.

In the slow deceleration mode (represented by the single-dotted broken-line curves in FIG. 26), decreasing rate of the engine rotation number Ne is so small that the rate of change in the engine rotation number Ne during the fault detecting period TA can scarcely be observed. In this case, when the exhaust gas recirculation is forcibly put into effect (i.e., validated), transition takes place from the point a on the EGR-off characteristic curve (solid-line curve) to the point b on the EGR-on characteristic curve (broken-line curve), bringing about a remarkable change in the intake manifold pressure Pb, as can be seen from the single-dotted broken-line curve Pb.

When the EGR-on state and the EGR-off state are changed over at time points t1 and t2 during the fault detection period TA (refer to the steps S102 and S104), the EGR-off intake manifold pressure value PbOFF1 and the EGR-on intake manifold pressure value PbON1 in the slow deceleration state can be measured, as can be seen from FIG. 26. In that case, the intake manifold pressure difference ΔP in the slow deceleration state as determined in accordance with the following expression will be greater than the predetermined reference value FAIL mentioned previously, as can be seen from FIGS. 26 and 27.

$$\Delta P1 = PbON1 - PbOFF1 > \text{FAIL}$$

Thus, the fault decision means incorporated in the electronic control unit 22 decides in the steps S107 and S108 that the exhaust gas recirculation control system is normal.

On the other hand, in the case of the steep deceleration (refer to the solid-line curves shown in FIG. 26), decreasing in the engine rotation number Ne occurs at a higher rate during the fault detecting period TA, resulting in that the engine rotation number Ne undergoes a significant change with the intake manifold pressure Pb changing rather gently in correspondence to the engine rotation number Ne.

More specifically, referring to FIG. 27, when the exhaust gas recirculation is forcibly validated during the fault detecting period TA, there takes place a transition from the point a on the EGR-off characteristic curve (solid line) to the point c on the EGR-on characteristic curve (broken line). At that time, the intake manifold pressure Pb will of course increase under the effect of the exhaust gas recirculation. However, rate of the change in the intake manifold pressure Pb is relatively small when compared with that in the case of the slow deceleration.

By changing over the exhaust gas recirculation between the off-state (invalidated state) and the on-state (validated state), there can certainly be measured the EGR-off intake manifold pressure value PbOFF2 and the EGR-on intake manifold pressure value PbON2 even in the steep deceleration phase, as illustrated in FIG. 26. In this case, however, the intake manifold pressure difference ΔP2 determined in accordance with the undermentioned expression may assume a value smaller than the predetermined reference value "FAIL", as can be seen from FIGS. 26 and 27. Namely, $$\Delta P2 = PbON2 - PbOFF2 < \text{FAIL}$$

Such being the circumstances, the fault decision means incorporated in the electronic control unit 22 may erroneously decide in the steps S107 and S109 that the exhaust gas recirculation control system suffers abnormality, when the engine is in the steep deceleration state.

Besides, because the relation which the intake manifold pressure Pb bears to the engine rotation number Ne changes when the engine rotation number Ne is approximately 2000 rpm, there exists a possibility of the intake manifold pressure difference ΔP2 increasing.

As the measures for coping with the unwanted situations mentioned above, it is conceivable, by way of example, to inhibit the fault detection processing for the exhaust gas recirculation control system, when the change of the engine rotation number Ne occurs at a high rate (although such measures are not known heretofore). However, if the fault detection is inhibited whenever the change of the engine rotation number Ne is high, the opportunity for the fault detection will be much limited because the deceleration which is not accompanied with change of the engine rotation number Ne can scarcely take place, thus, making it difficult to detect whether the exhaust gas recirculation control system is normal or abnormal. In addition, because the intake manifold pressure difference ΔP assumes different values in dependence on the engine rotation number Ne in the deceleration phase even when the exhaust gas recirculation control system is normal, there may arise the possibility of erroneous detection.

On the other hand, when the fault occurrence detection processing is effected in the stable state as described hereinbefore by reference to FIG. 24, the fault detection processing is inhibited when the change of the throttle opening degree θ detected periodically at a predetermined time interval exceeds a predetermined value, because, in that case the engine is regarded as being in the instable state (i.e., the state where the condition for the fault detection is not satisfied). For this reason, there may arise those problems which will be explained below.

FIG. 28 is a timing chart for illustrating a fault detection procedure in the stable state and shows changes in the throttle opening degree θ, on/off-state of the EGR solenoid device 12, the EGR flow rate and the intake manifold pressure Pb in the stable state of the engine.

As can be seen from FIG. 28, so long as the engine rotation number Ne remains stable, this means that the condition for the fault detection processing is met. Accordingly, after detection of the EGR-on intake manifold pressure value PbON, the exhaust gas recirculation is forcibly invalidated, whereupon the intake manifold pressure Pb is detected to calculate the intake manifold pressure difference ΔP for executing the fault decision.

As first, when the variation or difference Δθa of the throttle opening degree θ remains within a predetermined range as encountered during a period from a time point t3 to t4 during which the exhaust gas recirculation is stopped, there can be determined the intake manifold pressure difference ΔP (ΔP=PbON3−PbOFF4 or ΔP=PbON3−PbOFF4a).

However, when a deviation Δθ of the throttle opening degree changes beyond the predetermined range at a time point t6 during the fault detecting period TA immediately after a time point t5, the prerequisite condition of the stable state can no more be met, whereby the fault detection processing is inhibited. As a consequence of this, the exhaust gas recirculation will be regained at the time point t6 before the intake manifold pressure Pb can be determined in the EGR-off state.

Subsequently, when the deviation Δθ of the throttle opening degree is again stabilized at a value smaller than the predetermined one, the fault detection processing is again started, whereby the exhaust gas recirculation is invalidated during a period from a time point t7 to t8.

To be more concrete, when the deviation Δθ of the throttle opening degree increases in the course of execution of the fault detection processing in the stable state, as shown at the time point t6, the fault detection processing (in the EGR-off state) is inhibited on the way, as a result of which decision as to whether or not the exhaust gas recirculation control system is normal is rendered impossible. The fault detection processing is again executed when the deviation Δθ of the throttle opening degree becomes stable (period from t7 to t8). In this manner, in dependence on the deviation Δθ of the throttle opening degree, the fault detection processing will repetitively be executed, which is unfavorable for the exhaust gas recirculation control.

In other words, there may arise the possibility that the EGR-off state is sustained continuously. To say in another way, the number of times the exhaust gas recirculation is interrupted or stopped during the fault detection period extending, for example, from the time point t5 to t6, is increased, which in turn means that elimination of $NO_x$-components from the exhaust gas, the intrinsic purpose of the exhaust gas recirculation control, is not satisfactorily performed, involving degradation in the exhaust gas purification performance or capability.

Further, when the change Δθ of the throttle opening degree θ within a predetermined range takes place in the course of execution of the fault detection processing as encountered during a period from the time point t3 to t4, the EGR-off intake manifold pressure value PbOFF4 (indicated by a point on a solid-line curve in FIG. 28) becomes different from an EGR-off intake manifold pressure value PbOFF4a (indicated by a corresponding point a broken-line curve in FIG. 28), incurring thus an error in the fault detection. Thus, reliability as well as accuracy of the fault detection will be degraded.

Next, problems which may be brought about by the bypass air flow rate control means 9 will be described by reference to FIG. 29 which is a characteristic diagram for illustrating graphically relations between the intake manifold pressure Pb and the engine rotation number Ne by characteristic curves QE (broken line), QoDE (single-dotted broken-line), QEo (solid line), QoE (broken line) and QoEo (solid line), respectively, by using as parameters the bypass air flow rate Qb, the on/off states of the air conditioner and the on/off states of the exhaust gas recirculation.

More specifically, in FIG. 29, the curve QE represents the characteristic between the engine rotation number Ne and the intake manifold pressure Pb when the bypass air flow rate Qb is 200 l/min and when the exhaust gas recirculation is of a normal level αa, the curve QoDE represents the characteristic when the bypass air flow rate Qb is zero and when the air conditioner is in the off-state with the exhaust gas recirculation being at the normal level αa, the curve QEo represents the characteristic when the bypass air flow rate Qb is 200 l/min and when exhaust gas recirculation is stopped (off), the curve QoE represents the characteristic when the bypass air flow rate Qb is zero and when the exhaust gas recirculation is at the normal level αa, and finally the curve QoEo represents the characteristic when the bypass air flow rate Qb is zero and when the exhaust gas recirculation is stopped.

To be more concrete, the solid-line curves QEo and QoEo represent the characteristic relations between the intake manifold pressure Pb and the engine rotation number (rpm) when the exhaust gas recirculation is invalidated (off) in the states where bypass air flow is enabled and disabled, respectively, the broken-line curves QE and QoE represent the characteristic relation when the exhaust gas recirculation is validated in the states where the bypass air flow is enabled and disabled, respectively, and the single-dotted broken-line curve QoDE represents the characteristic when the bypass air flow is zero and when the air conditioner is turned off in the state where the exhaust gas recirculation is validated. Further, reference characters d and f designate points on the characteristic curves QoEo and QEo, respectively, e and g designate points on the characteristic curves QoE and QE, respectively, to which transitions may take place from the points d and the point f upon detection of a fault in the exhaust gas recirculation control system in the deceleration state, as indicated by solid-line arrows, and h designates a point on the characteristic curve QoDE which may transit to the point e as indicated by a broken-line arrow.

As can be seen in FIG. 29, because the intake manifold pressure Pb varies in dependence not only on the exhaust gas recirculation but also on the bypass air flow rate Qb, error may be involved in the EGR-off intake manifold pressure value PbOFF and the EGR-on intake manifold pressure value PbON, if the bypass air flow rate Qb undergoes a change during execution of the fault detection processing, in dependence on whether the exhaust gas recirculation is on or off, incurring erroneous fault detection in the worst case.

More specifically, let's assume that the EGR-off state is changed over to the EGR-on state in the course of the fault detection in the deceleration phase, as illustrated in FIG. 23. Then, there will take place transition from the point d to the point e or from the point f to the point g (as indicated by the solid-line arrow). In that case, the EGR fault detection can be effectuated normally because the bypass air flow rate Qb does not change. However, if the bypass air flow rate Qb changes in the course of transition from the point f to the point e (as indicated by the broken-line arrow), an error will make appearance in the intake manifold pressure difference ΔP. This sort of change in the bypass air flow rate Qb will take place, by way of example, during the dashpot operation in the deceleration phase.

As can be seen from the single-dotted broken-line characteristic curve QoDE shown in FIG. 29, the intake manifold pressure Pb varies in dependence on changes in the engine load such as typified by the on-state or off-state of the air conditioner. Consequently, the intake manifold pressure Pb in the EGR-on state (or EGR-off state) will be accompanied with an error when the engine load (such as the air conditioner) changes in the course of executing the fault detection processing for the exhaust gas recirculation control system, incurring thus as erroneous fault detection in the worst case because of the error in the intake manifold pressure difference $\Delta P$.

In more particular, the relation between the engine rotation number Ne and the intake manifold pressure Pb in the state in which the bypass air flow rate Qb is zero and in which the exhaust gas recirculation is being carried out with the air conditioner put into operation will be such as represented by the characteristic curve QoDE. As can be seen from this characteristic curve, an error is involved in the intake manifold pressure when the engine load changes from the point h on the characteristic curve QoDE to the point e on the characteristic curve QoE, similarly to the case of the change in the bypass air flow rate Qb.

In the foregoing description, although the engine load is assumed to be constituted by the air conditioner, it should be appreciated that the engine load is never restricted to the air conditioner but the phrase is used to encompass other engine load or loads such as a power steering load or the like electric/electronic loads.

Next, problems incurred by change in the atmospheric pressure will be elucidated by reference to FIG. 30. In the exhaust gas recirculation control system known heretofore, the fault detection is made on the assumption that the reference value FAIL is constant independent of the atmospheric pressure. However, there exists a possibility of erroneous fault detection for the exhaust gas recirculation control system, when the atmospheric pressure changes.

FIG. 30 is a characteristic diagram for illustrating a relation between the atmospheric pressure Pa and the intake manifold pressure difference $\Delta P$ on the assumption that the engine rotation number Ne is constant (e.g. at 2000 rpm). In the figure, a solid line curve represents the characteristic when the exhaust gas recirculation is normal, while broken-line curves represents the characteristics upon detection of a fault in the exhaust gas recirculation control system, from which it can be seen that the intake manifold pressure difference $\Delta P$ changes in dependence on changes in the atmospheric pressure Pa.

When the atmospheric pressure Pa is at 760 mmHg, no problem is incurred in the fault detection performed by comparing the intake manifold pressure difference $\Delta P$ with the predetermined reference value FAIL. However, when the atmospheric pressure falls to, for example, 560 mmHg, there arises a possibility of the erroneous detection.

Additionally it should be pointed out that because the intake manifold pressure Pb utilized in the exhaust gas recirculation control mentioned above is not subjected to the filter processing, error is likely to take place in the intake manifold pressure value as detected under the influence of pulsation of the engine operation.

As will now be apparent from the foregoing description, in the case of the fault detection apparatus for the exhaust gas recirculation control system known heretofore, the change in the intake manifold pressure Pb due to the change of the engine rotation number Ne is not taken into consideration when the deceleration state is set as one of the conditions for enabling the fault decision as described previously by reference to the flow chart of FIG. 23. For this reason, there may arise such situation that the intake manifold pressure difference $\Delta P$ making appearance between the EGR-on state and the EGR-off state when the conditions for enabling the fault decision are satisfied will become different in dependence on differences in the deceleration such as a rapid or steep deceleration and a gentle or slow deceleration (refer to FIG. 26), giving rise to a problem that erroneous fault detection for the exhaust gas recirculation control system may be incurred in the worst case.

As one of the measures for solving the problem mentioned above, it is conceivable to execute the processing for inhibiting the fault detection procedure when the engine rotation number Ne is abnormally high. In that case, the opportunity for performing the fault detection of the exhaust gas recirculation control system will undesirably be limited, giving rise to another problem. This is because the decision step in which the engine rotation number Ne does not undergo any appreciable change occurs less frequently. Furthermore, because the intake manifold pressure difference $\Delta P$ assumes different values in dependence on the engine rotation number Ne in the deceleration state even when the exhaust gas recirculation control system is normal, an erroneous fault detection may be resulted, to inconvenience.

On the other hand, when the stable state is set as the condition to be satisfied in order to enable the fault decision, as described hereinbefore by reference to FIG. 24, change of the throttle opening degree $\theta$ beyond a predetermined value in the course of the fault detection processing causes the condition for the fault detection to be unsatisfied because then the stable state can no more be ensured, whereby the fault detection processing may be inhibited on the way of execution (refer to the time point t6 in FIG. 28), incurring such unwanted situation that the number of times the fault detection is executed increases, as a result of which the exhaust gas recirculation is stopped frequently, involving degradation in the exhaust gas purification performance of the engine system.

Additionally, since the change of the intake manifold pressure Pb due to the changes in the bypass air flow rate Qb and the engine load (refer to FIG. 29) is not taken into consideration in the fault detection processing known heretofore, there may undesirably arise the erroneous fault detection, because the intake manifold pressure difference $\Delta P$ varies when the bypass air flow rate Qb and the engine load change in the course of execution of the fault detection processing.

Finally, because no consideration is paid to the fact that the intake manifold pressure Pb changes in response to the change in the atmospheric pressure Pa, erroneous fault detection may be resulted in case the atmospheric pressure Pa changes in the course of execution of the fault detection processing because the intake manifold pressure difference $\Delta P$ will vary correspondingly as a function of the atmospheric pressure.

SUMMARY OF THE INVENTION

In the light of the state of the art described above, it is an object of the present invention to provide a fault detecting apparatus for an exhaust gas recirculation system of an internal combustion engine, which apparatus can ensure an increased range for the fault decision as will as a high reliability and a high accuracy for the fault decision.

It is another object of the present invention to provide a fault detecting apparatus for an exhaust gas recirculation control system of an internal combustion engine, which apparatus can perform a fault detection for an exhaust gas recirculation system with high accuracy and reliability regardless of changes of the deceleration state set as a condition prerequisite for enabling the fault decision.

Still another object of the present invention is to provide a fault detecting apparatus for an exhaust gas recirculation control system of an internal combustion engine, which apparatus can carry out the fault detection for the exhaust gas recirculation control system with high accuracy and reliability nevertheless of difference in the stable state which is set as a condition prerequisite for the fault decision.

It is yet another object of the present invention to provide a fault detecting apparatus for an exhaust gas recirculation control system of an internal combustion engine, which apparatus is capable of detecting occurrence of a fault or abnormality in an exhaust gas recirculation control system with high accuracy and reliability notwithstanding of variation in a bypass air flow rate.

It is a further object of the present invention to provide a fault detecting apparatus for an exhaust gas recirculation control system of an internal combustion engine, which apparatus can ensure a fault detection of the exhaust gas recirculation control system with enhanced accuracy and reliability nevertheless of variation in the engine load.

It is a still further object of the present invention to provide a fault detecting apparatus for an exhaust gas recirculation control system of an internal combustion engine, which apparatus can perform a fault detection for an exhaust gas recirculation system with high accuracy and reliability regardless of change in the atmospheric pressure.

It is a yet further object of the present invention to provide a fault detecting apparatus for an exhaust gas recirculation control system of an internal combustion engine, which apparatus is capable of performing fault detection for the exhaust gas recirculation system with much improved accuracy and reliability.

In view of the above and other objects which will become more apparent as description proceeds, there is provided according to a general aspect of the present invention a fault detecting apparatus for an exhaust gas recirculation control system of an internal combustion engine, which apparatus includes an intake pipe for supplying air to the internal combustion engine, a throttle valve disposed in the intake pipe to be selectively opened and closed for regulating a flow of the air supplied to the internal combustion engine through the intake pipe, an exhaust gas recirculation pipe for introducing an exhaust gas of the internal combustion engine to the intake pipe at a location downstream of the throttle valve for recirculating the exhaust gas through the internal combustion engine, an exhaust gas recirculation valve disposed in said exhaust gas recirculation pipe for regulating a recirculation flow rate of the exhaust gas flowing through the exhaust gas recirculation pipe, a sensor means for detecting operation state of the internal combustion engine, inclusive of an intake pressure, to thereby output engine operation state information, an exhaust gas recirculation valve control means for controlling the exhaust gas recirculation valve in dependence on the operation state information supplied from the sensor means, a fault decision enabling condition detecting means for detecting satisfaction of a fault decision enabling condition to thereby enable a decision concerning occurrence of a fault in an exhaust gas recirculation control means inclusive of the exhaust gas recirculation valve control means on the basis of the operation state information, an enforcive valve opening/closing means for forcibly opening and/or closing the exhaust gas recirculation valve during a period in which the fault decision enabling condition is satisfied, and a fault decision means for comparing a value derived from the intake pressures detected upon enforcive opening/closing of the exhaust gas recirculation valve with a fault decision reference value to thereby decide whether any fault occurs in the exhaust gas recirculation control means, wherein the fault decision means includes a compensation means for suppressing influence of a parameter which affects the intake pressures detected upon said enforcive opening/closing of exhaust gas recirculation valve.

By virtue of the arrangement such that the parameter which exerts influence to the intake pressures detected upon enforcive opening/closing of the exhaust gas recirculation valve is compensated for, as described above, the range within which the fault decision is enabled can be widened and/or reliability of the fault decision can be improved.

In a preferred mode for implementing the fault detecting apparatus for an exhaust gas recirculation control system according to the present invention, the operation state information may contain at least information concerning a rotation number of the internal combustion engine and information indicating that the throttle valve is in a fully-closed state. In that case, the fault decision enabling condition detecting means detects as the fault decision enabling condition a deceleration state of the internal combustion engine on the basis of at least the information of the engine rotation number and the information indicating the fully-closed state of the throttle valve, while the compensation means can be so arranged as to correct at least one of the fault decision reference value referenced by the fault decision means in the comparison and the value derived from the intake pressures detected upon enforcive opening/closing of the exhaust gas recirculation valve by using the engine rotation number detected substantially concurrently with the detection of the intake pressure.

By correcting at least one of the intake pressures detected upon enforcive opening/closing of the exhaust gas recirculation valve in the engine deceleration state and the fault decision reference value referenced in the comparison in accordance with the engine rotation number detected substantially concurrently, wherein the fault decision is performed by using the corrected value for the comparison, as described above, influence of the parameter represented by the engine rotation number can be compensated for. Thus, the fault decision for the exhaust gas recirculation control system of the engine can be performed with high accuracy.

In another preferred mode for carrying out the invention, the operation state information may contain at least information concerning an engine rotation number and a throttle opening degree of the throttle valve, wherein the fault decision enabling condition detecting means may detect as the fault decision enabling condition a stable state of the internal combustion engine on the basis of at least the engine rotation number, and wherein the compensation means may correct at least one of the fault decision reference value referenced by the fault decision means upon the comparison and the value derived from the intake pressures detected upon the enforcive opening/closing of the exhaust gas recirculation valve by using the information of the throttle opening degree detected substantially concurrently with the detection of the intake pressure.

By correcting at least one of the value derived from the intake pressures detected upon enforcive opening/closing of the exhaust gas recirculation valve in the stable state of the internal combustion engine and the fault decision reference value in accordance with the change of the throttle valve detected substantially concurrently and performing the fault decision processing by using the corrected value in the comparison, as described above, influence of the parameter represented by the change of the throttle opening degree can essentially be canceled out. Thus, high accuracy can be ensured for the fault decision even when the throttle opening degree changes when the internal combustion engine is in the stable state. Besides, the fault detection processing can be protected against invalidation even when the throttle opening degree changes in the course of the processing, which in turn means that the number of times the fault detection processing is to be performed (i.e., the number of times the exhaust gas recirculation is interrupted) can correspondingly be decreased, whereby degradation in the exhaust gas purification performance due to stoppage of the recirculation can be suppressed to a minimum.

In yet another mode preferred for implementing the fault detecting apparatus according to the present invention, the compensation means may include an analogue-to-digital converter for converting the information of the throttle opening degree into a digital signal, and wherein at least one of the fault decision reference value and the value derived from the intake pressures may be corrected in dependence on a minimum resolution (unit quantization) of the analogue-to-digital converter.

By taking into consideration the minimum resolution or quantization of the A/D converter employed for converting the analogue throttle opening degree signal into a digital signal in the correction of the value derived from the intake pressures or the fault decision reference value, as described above, high accuracy and reliability can be ensured for the fault detection.

In still another preferred mode for carrying out the invention, the fault detecting apparatus for the exhaust gas recirculation control system may further include a bypass air flow rate control means for controlling the rate of intake air flow which bypasses the throttle valve, wherein the compensation means may include bypass air flow rate change inhibit means for inhibiting change of the bypass air flow rate during a period in which the fault decision enabling condition is satisfied (i.e. during execution of the fault decision processing).

By prohibiting the bypass air flow rate from changing when the fault decision processing is effected for diagnosing the exhaust gas recirculation control system, influence of variation in the bypass air flow rate to the intake pressure can be suppressed. Thus, the detected value of the intake pressure scarcely suffers from error, whereby accurate fault decision for the exhaust gas recirculation control system can be realized.

In a further preferred mode for carrying out the invention, the fault detecting apparatus mentioned above may further include a bypass air flow rate control means for controlling the rate of intake air flow which bypasses the throttle valve, wherein the compensation means may correct at least one of the fault decision reference value referenced by the fault decision means upon the comparison and the value derived from the intake pressures detected upon the enforcive opening/closing of the exhaust gas recirculation valve by using the information of the bypass air flow rate detected substantially concurrently with detection of the intake pressure.

Due to the arrangement in which at least one of the value derived from the intake pressure detected upon enforcive opening/closing of the exhaust gas recirculation valve and the fault decision reference value referenced in the comparison is corrected with the bypass air flow rate detected substantially concurrently with the intake pressure, as described above, influence of the bypass air flow rate to the intake pressure can essentially be canceled out, whereby the detected value of the intake pressure can be made essentially free of error. Thus, high accuracy and reliability can be ensured for the detection of a fault in the exhaust gas recirculation control system.

In a yet further preferred mode for carrying out the invention, the fault detecting apparatus may further include a bypass air flow rate control means for controlling the rate of intake air flow which bypasses the throttle valve, wherein the compensation means may include a bypass air flow rate change termination decision means for deciding whether or not change of the bypass air flow rate is terminated, and wherein the enforcive valve opening/closing means and the fault decision means are validated when the fault decision enabling condition is satisfied and when no change takes place in the bypass air flow rate.

By validating the fault detection of the exhaust gas recirculation control system at the time point at which a process for changing the bypass air flow rate has been terminated, as mentioned above, influence of any change in the rate of the bypass air flow to the intake pressure can substantially be canceled out, whereby the fault decision or diagnosis processing for the exhaust gas recirculation control system can be performed with high accuracy regardless of change in the bypass air flow rate.

In a still further preferred mode for carrying out the invention, the engine operation state information may contain at least information concerning an engine load of the internal combustion engine, wherein the compensation means may include an engine load change detecting means for detecting a change of the engine load, and wherein upon detection of a change in the engine load, the fault decision enabling condition may be inhibited from being satisfied.

By inhibiting the fault decision when the engine load changes, as mentioned above, influence of the parameter represented by the change in the engine load to the intake pressure can essentially be canceled out, whereby the fault decision can be realized with high accuracy and reliability notwithstanding of change in the engine load.

Further, the engine operation state information may contain at least information concerning an engine load of the internal combustion engine, and wherein the compensation means may correct at least one of the fault decision reference value referenced by the fault decision means upon the comparison and the value derived from the intake pressures detected upon enforcive opening/closing of the exhaust gas recirculation valve with the engine load detected substantially concurrently with detection of the intake pressure.

By correcting at least one of the values derived from the intake pressure detected upon enforcive opening/closing of the exhaust gas recirculation valve and the fault decision reference value serving as the reference for the comparison in accordance with the engine load which is detected substantially simultaneously with the intake pressure, and using the corrected value in the comparison, as described above, influence of the engine load to the intake pressure can essentially be suppressed, whereby the fault decision processing can be carried out for the exhaust gas recirculation control system with high accuracy and reliability.

In the case where an engine load is installed in association with the internal combustion engine to be driven thereby, and where an engine load driving means is provided for driving the engine load in response to a power-on command for the engine load, the compensation means may include an engine load inhibit means for inhibiting the engine load from being driven so long as the fault decision enabling condition is satisfied.

By inhibiting the engine load from being driven when the fault detection processing for the exhaust gas recirculation control system is effectuated, as mentioned above, influence of change in the engine load can essentially be excluded, whereby the fault decision enjoying high accuracy and reliability can be realized.

In another preferred mode for carrying out the invention, the operation state information may contain at least information concerning the atmospheric pressure. In that case, the fault decision means may make decision as to occurrence of a fault in the exhaust gas recirculation valve control means by comparing the value derived from the intake pressure detected upon enforcive opening/closing of the exhaust gas recirculation valve with a fault decision reference value, wherein the compensation means may correct at least one of the fault decision reference value referenced by the fault decision means in the comparison and the value derived from the intake pressures detected upon enforcive opening/closing of the exhaust gas recirculation valve by using the atmospheric pressure information.

By correcting at least one of the value or quantity based on the intake pressure detected upon enforcive opening/closing of the exhaust gas recirculation valve and the fault decision reference value serving as the reference in the comparison in accordance with the atmospheric pressure detected substantially simultaneously with the intake pressure and executing the fault detection processing by using the corrected value or values, as described above, influence of the atmospheric pressure to the intake pressure can satisfactorily be excluded, whereby the fault decision can be performed with high accuracy and reliability regardless of change in the atmospheric pressure.

In yet another preferred mode for carrying out in the invention, the compensation means may include an exhaust gas recirculation ratio equivalent value calculating means for calculating a value equivalent to an exhaust gas recirculation ratio corresponding to the exhaust gas recirculation flow rate on the basis of the intake pressures detected upon enforcive opening/closing of the exhaust gas recirculation valve, wherein the fault decision means may make decision as to occurrence of a fault in the exhaust gas recirculation control means on the basis of the exhaust gas recirculation ratio equivalent value.

By calculating the exhaust gas recirculation ratio equivalent value on the basis of the intake pressure detected upon enforcive opening/closing of the exhaust gas recirculation valve and executing the fault decision processing by using the exhaust gas recirculation ratio equivalent value, as described above, influence of the atmospheric pressure, the bypass air flow rate and/or the engine load to the intake pressure can further be suppressed, whereby the fault decision processing can be executed with high accuracy and reliability regardless of change(s) in the atmospheric pressure, bypass air flow rate and/or the engine load.

In yet further preferred mode for carrying out the invention, the compensation means may include an intake pressure detection timing calculating means for calculating a timing for detecting the intake pressures upon enforcive opening/closing of the exhaust gas recirculation valve, and a filter processing means for filtering information signal of the intake pressures as detected upon enforcive opening/closing of the exhaust gas recirculation valve in conformance with the timing, wherein the fault decision means may make decision as to occurrence of a fault in the exhaust gas recirculation control means on the basis of the intake pressure undergone the filter processing.

By performing the filtering or smoothing process on the intake pressures detected upon enforcive opening/closing of the exhaust gas recirculation valve and making the fault decision on the basis of the intake pressure signal undergone the filter processing, influence of pulsation of the engine operation to the intake pressures as detected can further be suppressed, whereby the fault decision processing for the exhaust gas recirculation control system can be realized with high accuracy and reliability nevertheless of pulsation of the engine operation.

The above and other objects, features and attendant advantages of the present invention will more easily be understood by reading the following description of the preferred embodiments thereof taken, only by way of example, in conjunction with the drawings.

DESCRIPTION OF THE PREFERRED EMBODIMENTS

Figure 1:
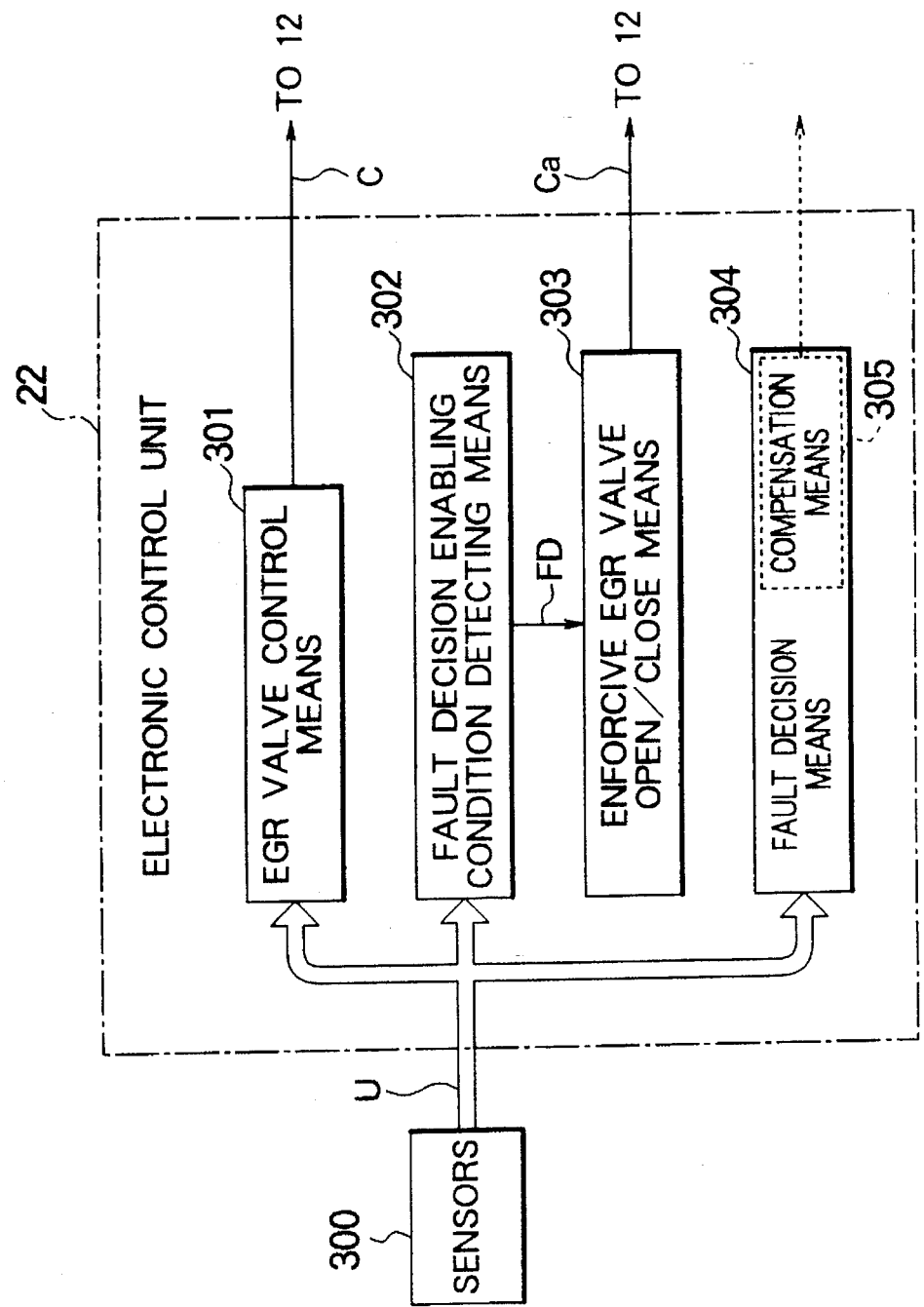
FIG. 1 is a functional block diagram showing schematically and functionally a general arrangement of a fault detecting apparatus for an exhaust gas control system of an internal combustion engine according to an embodiment of the present invention, the apparatus being implemented in the form of an electric control units.

Now, the present invention will be described in detail in conjunction with preferred or exemplary embodiments thereof by reference to the drawings. In the following description, like or equivalent parts are designated by like reference characters.

Embodiment 1

A fault detecting apparatus for an exhaust gas recirculation control system of an internal combustion engine according to a first embodiment of the invention will be described. In the first place, it should be mentioned that configuration of the exhaust gas recirculation control system in which the present invention can find application as well as that of an electronic control unit employed for carrying out the control are substantially identical with those shown in FIGS. 21 and 22, respectively.

FIG. 1 is a functional block diagram showing schematically and functionally an exhaust gas recirculation control module and an exhaust gas recirculation abnormality detecting module both of which are realized by the electronic control unit 22 according to the first embodiment of the invention. Needless to say, the electronic control unit 22 may be implemented by a microcomputer 100 as described hereinbefore by reference to FIG. 22.

Referring to the figure, reference numeral 22 and 12 designate the control solenoid and the electronic control unit, respectively. The various sensors are represented generally by a block 300 and includes the pressure sensor 6, the throttle position sensor 8, the ignition coil 13, the water temperature sensor 17, the idle switch 18, the air-conditioner switch 19 and others, as described hereinbefore by reference to FIG. 21. As the engine operation state information U (sensor signals), there are inputted to the electronic control unit 22, the intake manifold pressure (also referred to as the intake pressure) Pb, the throttle opening degree signal θ, the ignition signal Q (corresponding to the engine rotation number Ne), the cooling water temperature signal T, the idle signal I (equivalent to a fully opened throttle state signal) and the air-conditioner power-on signal A. Thus, it can be said that the various sensors 300 constitute the sensor means for detecting the operation state information U of the internal combustion engine inclusive of the intake manifold pressure Pb.

As can be seen from FIG. 1, the electronic control unit 22 is comprised of an EGR (exhaust gas recirculation) valve control means 301 for controlling the EGR control valve 11 (see FIG. 21) in accordance with the engine operation state information U supplied from the various sensors 300 by generating an exhaust gas recirculation control signal C for the EGR solenoid device 12, and a fault decision enabling condition detecting means 302 for detecting whether or not the condition for validating or enabling the fault detection processing for the exhaust gas recirculation control means (i.e., exhaust gas recirculation control system including the EGR control valve 11 and the EGR valve control means 301).

Further, the electronic control unit 22 includes an enforcive EGR valve open/close means 303 which responds to a fault-decision-condition satisfaction indicating signal FD supplied from the fault-decision-condition detecting means 302 to thereby deliver to the EGR solenoid device 12 an EGR control signal Ca for opening and closing forcibly, as occasion requires, the EGR control valve 11 during a period in which the condition for enabling the fault decision remains satisfied.

Additionally, the electronic control unit 22 includes a fault decision means 304 for deciding whether the EGR control means suffers abnormality or fault on the basis of the information of the intake manifold pressures Pb measured when the EGR control valve 11 is forcibly opened and closed, respectively, and a compensation means 305 which is incorporated in the fault decision means 304 to compensate for or suppress the influences of parameters which affect the intake manifold pressures Pb making appearance upon opening and closing of the EGR control valve 11, respectively.

At this juncture, it should be mentioned that the compensation means 305 serves for various functions which will be described hereinafter in conjunction with various embodiments of the invention and plays an important role in protecting the operation of the fault decision means 304 from adverse influence of various factors or parameters originating in various events and phenomena taking place in the operations of the engine system. In other words, the compensating means cooperates with the fault decision means 304 to ensure high reliability and accuracy of a fault detection or diagnosis performed by the fault decision means 304 for the exhaust gas recirculation control system.

In the case of the instant embodiment of the invention, the operation state information U may include the engine rotation number Ne and the idle switch I (indicating the fully closed state of the throttle valve 7).

More specifically, in the fault detecting apparatus according to the instant embodiment of the invention, the fault-decision-condition detecting means 302 is adapted to detect the deceleration state of the internal combustion engine as the condition which must be satisfied in order to effect the fault or abnormality decision on the basis of the information concerning the engine rotation number Ne and the state of the idle switch 1 indicating the fully closed state of the throttle valve 7. On the other hand, the fault decision means 304 compares a value derived from the intake manifold pressures Pb detected upon enforcive opening/closing of the EGR control valve 11 with a reference value determined previously for the fault decision (hereinafter referred to as the fault decision reference value).

The compensation means 305 corrects at least either the fault decision reference value employed in the comparison performed by the fault decision means 304 or the value based on the intake manifold pressures Pb detected upon enforcive opening/closing of the EGR control valve 11 by using the engine rotation numbers Ne detected concurrently with the intake manifold pressures.

Figure 21:
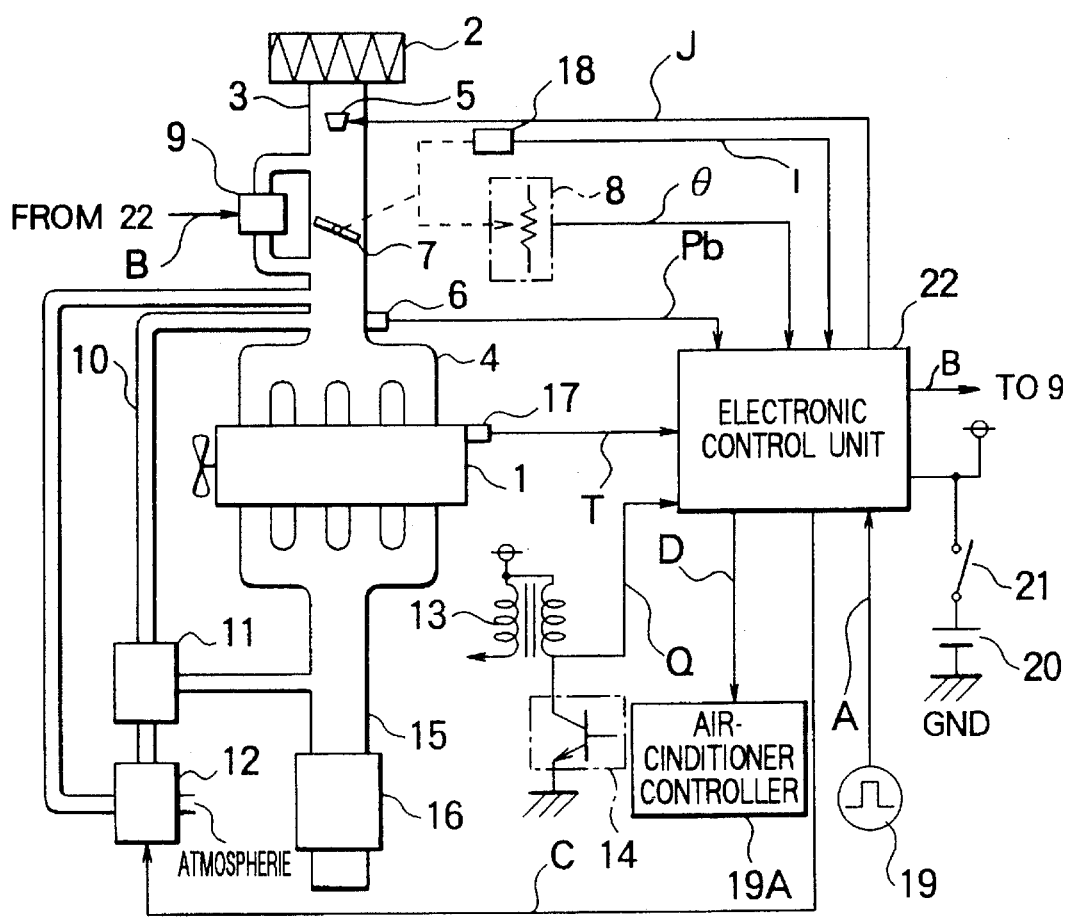
FIG. 21 is a block diagram showing schematically a general arrangement of an exhaust gas recirculation control system to which the fault detecting apparatuses according to the invention can be applied.
Figure 22:
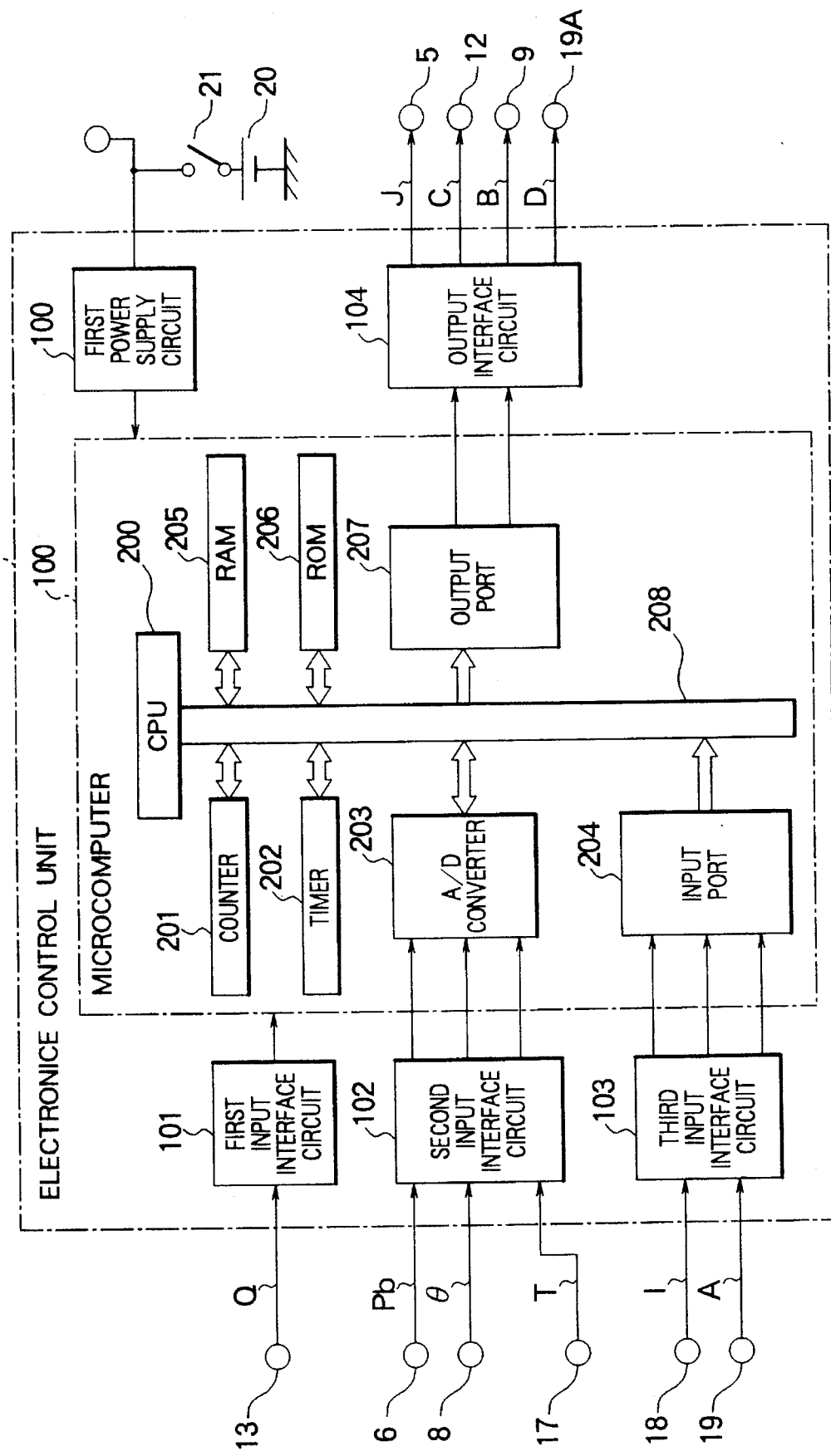
FIG. 22 is a block diagram showing a configuration of an electronic control unit employed in the system shown in FIG. 21.

Now, a fault detecting operation performed by the diagnosis apparatus according to the instant embodiment of the invention will be described by reference to a flow chart of FIG. 2 and characteristic diagrams of FIGS. 3 and 4 together with FIG. 1, FIG. 21 and FIG. 22.

Figure 2:
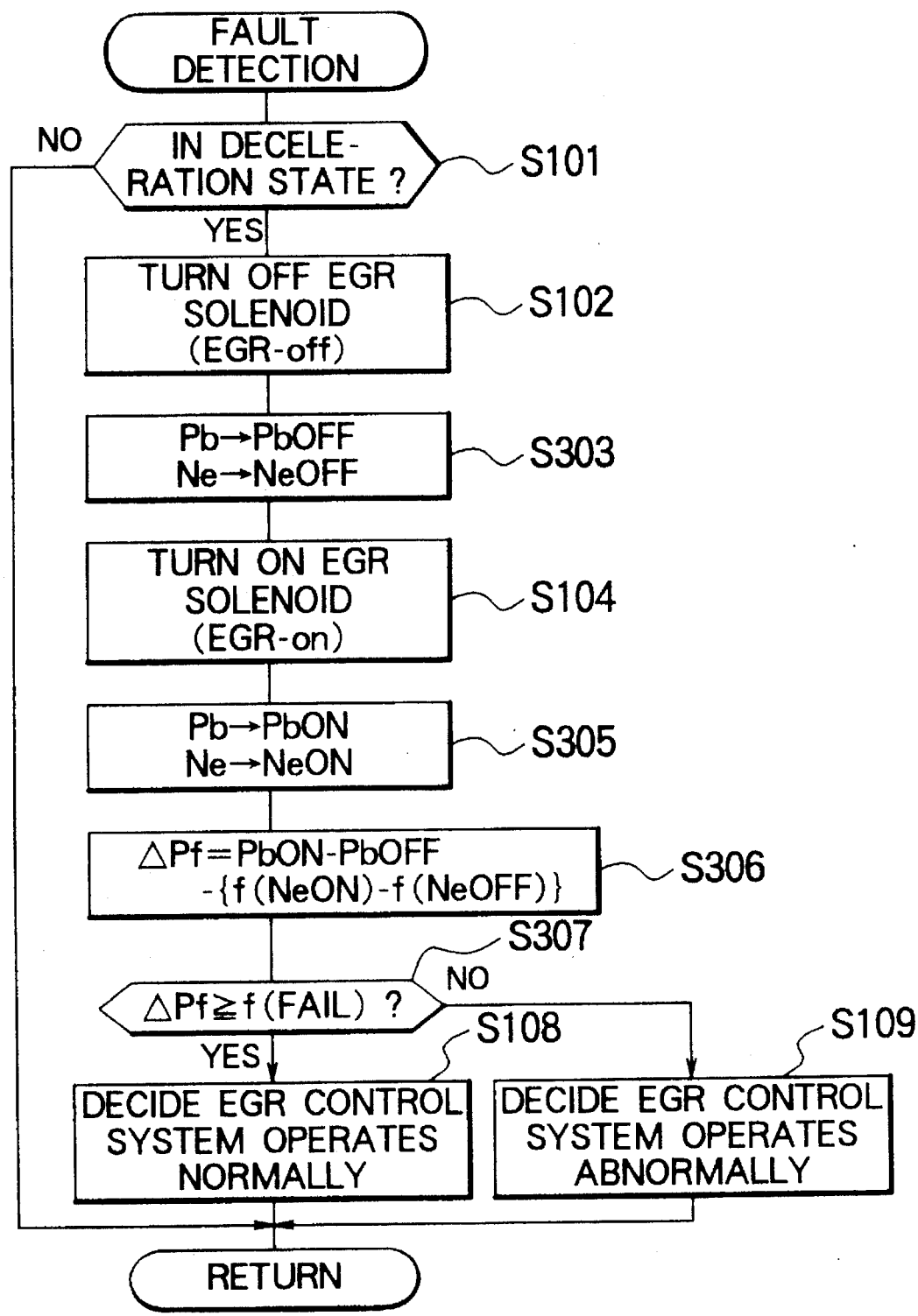
FIG. 2 is a flow chart for illustrating a fault detection processing operation for an exhaust gas recirculation control system according to a first embodiment of the invention.
Figure 23:
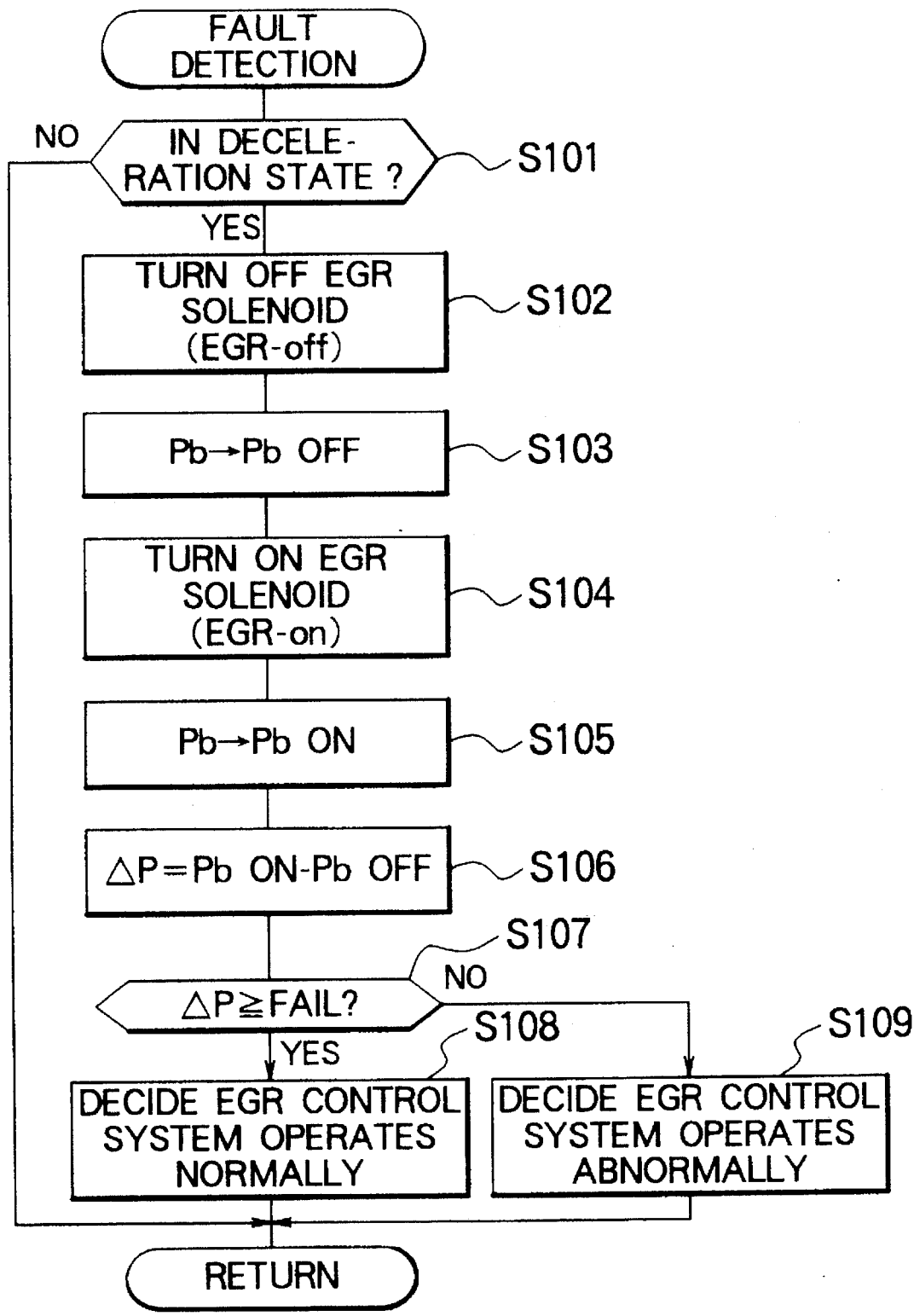
FIG. 23 is a flow chart for illustrating a conventional processing for detecting occurrence of a fault in an exhaust gas recirculation control system of an internal combustion engine.

In FIG. 2, steps S101, S102, S104, S108 and S109 are similar to those denoted by like reference characters in FIG. 23, while steps S303 and S305 to S307 correspond, respectively, to the steps S103 and S105 to S107 shown in FIG. 23.

Referring to FIG. 2, in the step S101, it is first checked from an engine rotation number Ne determined through a corresponding processing routine (not shown) and the idle signal I representing the state of the idle switch 18 whether the engine rotation number Ne is higher than a predetermined value and whether the throttle valve 7 is in the fully closed state. When both the conditions mentioned above are satisfied, it is then decided that the engine and hence the motor vehicle is in the state of deceleration. On the other hand, when it is decided in the step S101 that the aforementioned conditions are not met and thus the motor vehicle is not in the deceleration state (i.e., when the decision step S101 results in negation "NO"), the fault detection processing is terminated, as indicated by a block labelled "RETURN".

By contrast, when the decision step S101 results in affirmation "YES", indicating that the motor vehicle is in the deceleration state, the processing proceeds to the step 102 where the EGR solenoid device 12 is deactivated to invalidate or stop the exhaust gas recirculation. Thus, the EGR-off state is established. Parenthetically, it should be recalled that when the motor vehicle is being decelerated, the exhaust gas recirculation system is usually in the EGR-off state, as described hereinbefore. Accordingly, the phrase "enforcive opening/closing of the EGR valve" should be broadly interpreted such that at least opening or closing of the EGR valve is forcibly performed from the closed or opened state in dependence on the operation states of the engine and the exhaust gas recirculation system.

Subsequently, in a step S303, the intake manifold pressure Pb in the EGR-off state is stored as an EGR-off intake manifold pressure value PbOFF, while the engine rotation number Ne detected in the EGR-off state is stored as an EGR-off engine rotation number NeOFF.

Thereafter, in a step S104, the EGR solenoid device 12 is actuated to validate the exhaust gas recirculation. In a next step S305, the intake manifold pressure Pb is fetched in the state in which the exhaust gas recirculation is validated and stored as a value PbON (hereinafter referred to as the EGR-on intake manifold pressure value PbON) and at the same time the engine rotation number Ne detected in this EGR-on state is stored as an EGR-on engine rotation number NeON.

Figure 26:
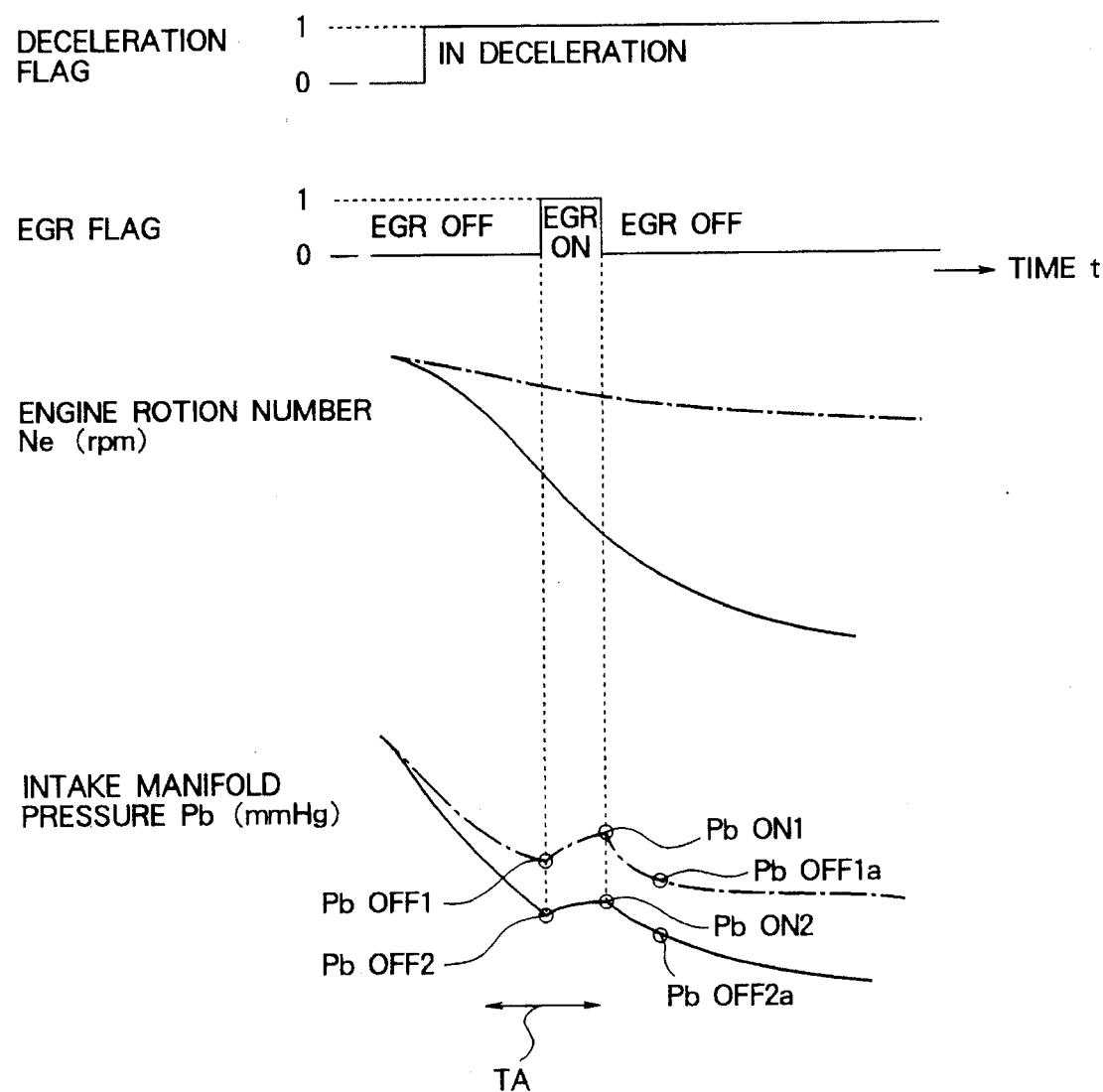
FIG. 26 is a timing chart for graphically illustrating in general changes in an engine rotation number and an intake manifold pressure as a function of time lapse in an internal combustion engine as well as influences which the changes exert to a fault detecting operation.
Figure 27:
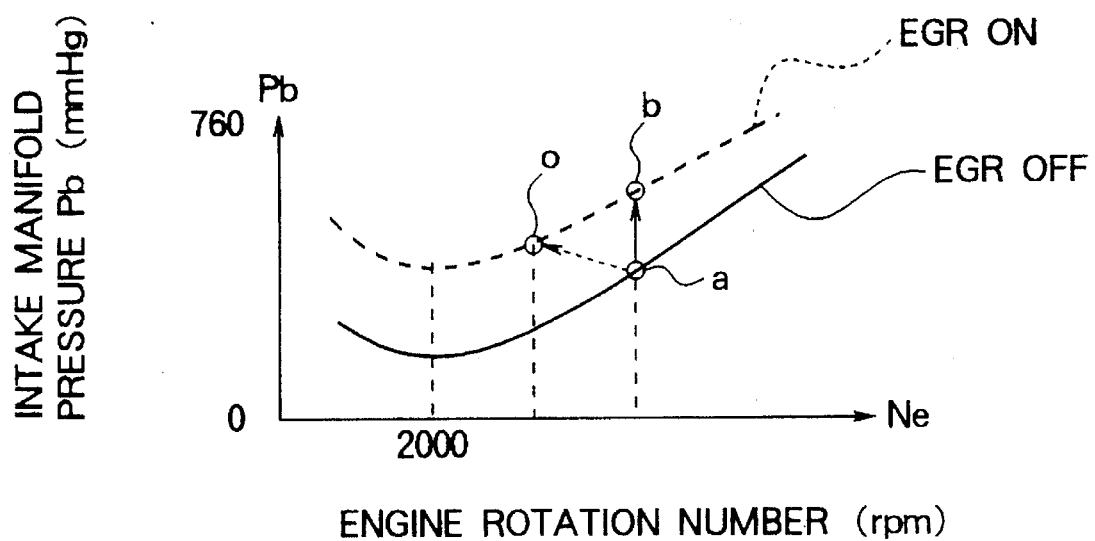
FIG. 27 is a characteristic diagram illustrating in general the relation which exists between an engine rotation number and an intake manifold pressure in an exhaust gas recirculation validated state and an exhaust gas recirculation invalidated state, respectively.
Figure 28:
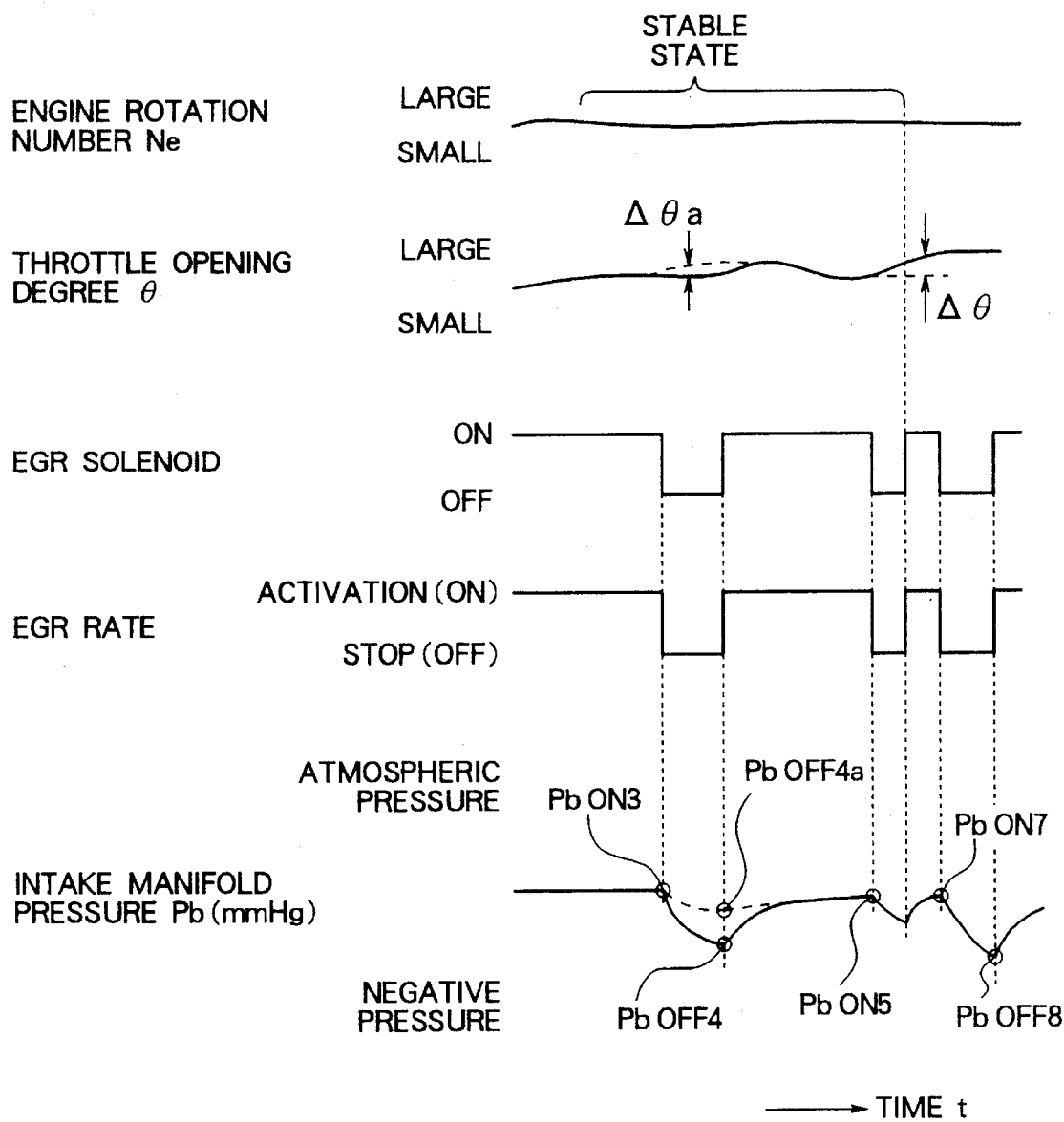
FIG. 28 is a timing chart for illustrating another conventional fault detecting operation for an exhaust gas recirculation control system of an internal combustion engine.

In this conjunction, it should be mentioned that the detection of the EGR-off intake manifold pressure value PbOFF and the EGR-on intake manifold pressure value PbON in the steps S303 and S305 are effectuated after the intake manifold pressure Pb has been stabilized in succession to invalidation (turn-off) and validation (turn-on) of the exhaust gas recirculation, respectively, (e.g. after lapse of about one second from the opening and the closing of the EGR control valve 11). The same holds true in the case where the EGR-on intake manifold pressure value PbON is first measured and thereafter the EGR-off intake manifold pressure value PbOFF is measured. To say in another way, the EGR-on intake manifold pressure value PbON1 and the EGR-off intake manifold pressure value PbOFF1a as well as the EGR-on intake manifold pressure value PbON2 and the EGR-on intake manifold pressure value PbON2a mentioned hereinbefore by reference to FIG. 26 may be measured in the reverse sequence, essentially to the same effect.

Next, in a step S306, on the basis of an intake manifold pressure difference ΔP between the EGR-on intake manifold pressure value PbON and the EGR-off intake manifold pressure value PbOFF and correcting functions f based on the EGR-on engine rotation number NeON and the EGR-off engine rotation number NeOFF, a corrected intake manifold pressure difference ΔPf is arithmetically determined in accordance with the following expression:

$$\Delta Pf = \Delta P - \{f(NeON) - f(NeOFF)\} \quad (1)$$

At this juncture, the correcting function f based on the EGR-on engine rotation number NeON and the EGR-off engine rotation number NeOFF and appearing in the above expression (1) will be described by reference to FIGS. 3 and 4.

Figure 3:
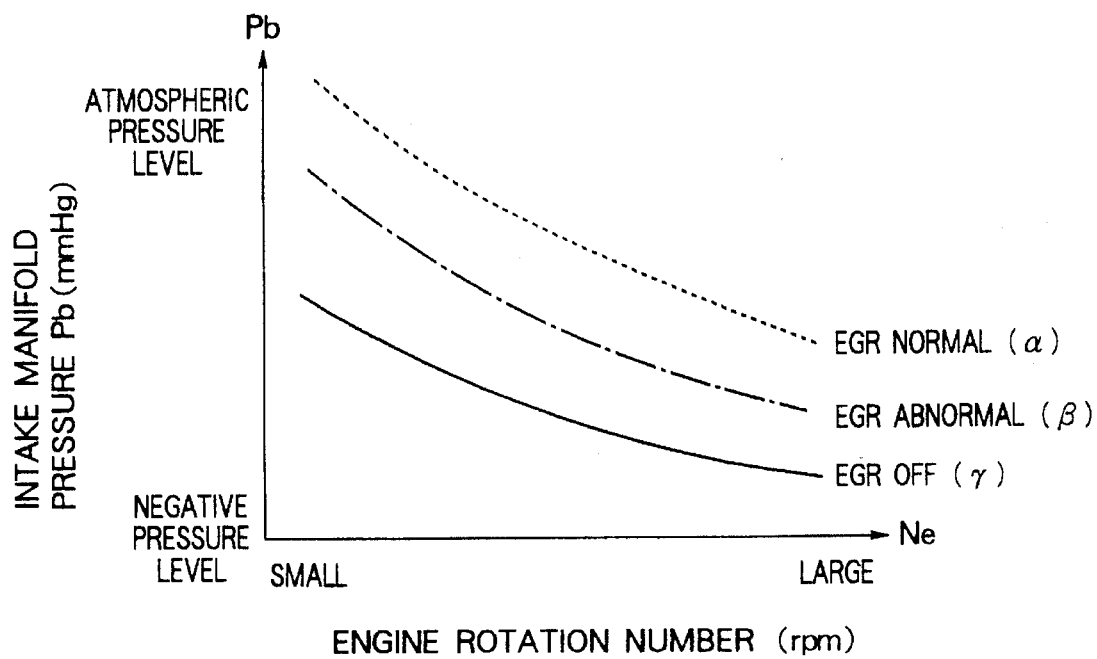
FIG. 3 is a characteristic diagram showing a relation between an engine rotation number and an intake manifold pressure during engine deceleration for illustrating the concept underlying the fault detecting apparatus according to the first embodiment of the invention.

FIG. 3 is a characteristic diagram illustrating a relation between the engine rotation number Ne and the intake manifold pressure Pb in an intrinsic warm-up state of the engine in which the bypass air flow rate Qb is constant at a predetermined level and in which no load is applied to the engine at all.

In FIG. 3, a solid-line characteristic curve labeled "EGR-off(γ)" shows a relation between the engine rotation number Ne and the intake manifold pressure Pb. As can be seen from this characteristic curve, the intake manifold pressure Pb tends to increase toward the atmospheric pressure Pa as the engine rotation number Ne decreases.

On the other hand, in FIG. 3, a broken-line characteristic curve labeled "EGR-normal(α)" illustrates a relation between the engine rotation number Ne and the intake manifold pressure Pb when the exhaust gas recirculation is effected normally. This characteristic curve shows that the intake manifold pressure Pb is significantly higher than the corresponding pressure in the EGR-off state (indicated by the solid-line curve γ).

Further, in FIG. 3, a single-dotted characteristic curve labeled "EGR-abnormal(P)" shows a relation between the engine rotation number Ne and the intake manifold pressure Pb in the state where the exhaust gas recirculation rate is lower than the normal flow rate α with the contents of noxious components $NO_x$ contained in the exhaust gas increasing, i.e., at an exhaust gas recirculation rate β where abnormality or occurrence of fault should be decided for the exhaust gas recirculation control system.

Additionally, it can be seen from FIG. 3 that the intake manifold pressures Pb change in dependence on the EGR rates α, β and γ, respectively.

Under the circumstances, the intake manifold pressure Pb should be corrected by taking into account the engine rotation number Ne. To this end, an EGR rate difference (β–γ) between the EGR rate β for which occurrence of a fault should be decided and the rate γ in the EGR-off state are previously determined. In this conjunction, relation between the engine rotation number Ne and the intake manifold pressure difference ΔP (corresponding to the EGR rate difference mentioned above) is such as illustrated by a solid-line characteristic curve in FIG. 4.

Figure 4:
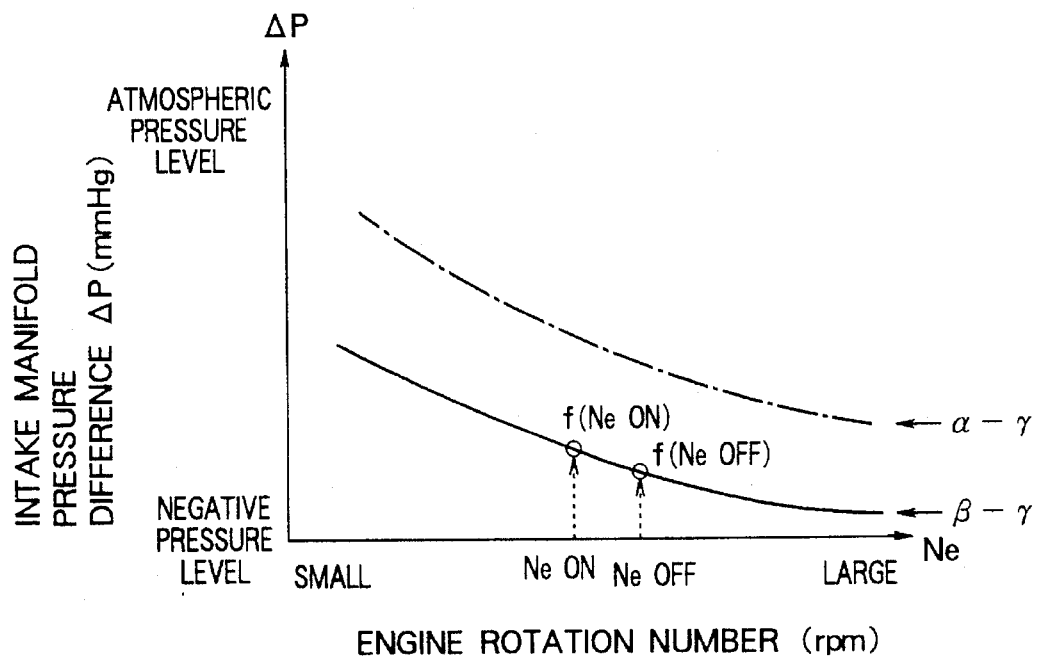
FIG. 4 is a characteristic diagram showing a relation between the engine rotation number and an intake manifold pressure difference (i.e., intake manifold pressure deviation) during the engine deceleration for illustrating the concept underlying the first embodiment of the invention.

More specifically, FIG. 4 is a characteristic diagram illustrating a relation between the engine rotation number Ne and the intake manifold pressure difference ΔP as measured in the state in which the bypass air flow rate Qb is constant at a predetermined value and in which no load is imposed on the engine, wherein a broken-line curve represents the characteristic or behavior of the intake manifold pressure difference ΔP which corresponds to an EGR rate difference (α–γ). As can be seen from the broken-line curve, the relation between the engine rotation number Ne and the intake manifold pressure difference ΔP bears similarity to the relation in the normal state of the exhaust gas recirculation.

It should here be noted that by taking into consideration the relations illustrated in FIG. 4, it is possible to determine errors involved in the EGR-on intake manifold pressure value PbON and the EGR-off intake manifold pressure value PbOFF which correspond to the EGR-on engine rotation number NeON and the EGR-off engine rotation number NeOFF in terms of the aforementioned functions f, respectively. In other words, although it is impossible to measure straightforwardly the absolute value of the intake manifold pressure Pb, it can be corrected by using the errors which are previously determined and stored to be read out as the intake manifold pressure errors.

Thus, the EGR-on intake manifold pressure correcting quantity f(NeON) and the EGR-off intake manifold pressure correcting quantity f(NeOFF) as read out represent errors of the EGR-on intake manifold pressure PbON and the EGR-off intake manifold pressure PbOFF, which errors are ascribable to difference in the engine rotation number Ne at the EGR rate β for which occurrence of a fault in the exhaust gas recirculation control system should be decided. Thus, by determining the difference between the EGR-on intake manifold pressure correcting quantity f(NeON) and the EGR-off intake manifold pressure correcting quantity f(NeOFF) (i.e., {f(NeON)–f(NeOFF)} in the expression (1), it is possible to correct the errors of the intake manifold pressure values Pb ascribable to the difference in the engine rotation number Ne.

To say in another way, with the aid of the relation illustrated in FIG. 4, it is possible at least to correct the engine rotation number Ne corresponding to the EGR rate β for which the fault occurrence for the exhaust gas recirculation control system should be decided.

Now, turning back to FIG. 2, in the step S306, the corrected intake manifold pressure difference ΔPf to be employed in the fault decision is determined through the procedure described above. Parenthetically, in case the correcting quantity {f(NeON)–f(NeOFF)} is of minus sign, it is clipped to zero to prevent the excessive correction based on the engine rotation number Ne.

In succession, in a step S307, it is decided whether or not the corrected intake manifold pressure difference ΔPf mentioned above is greater than a preset value f(FAIL) which can be determined on the basis of the engine rotation number Ne by referencing the characteristic diagram of FIG. 4.

When the result of the decision in the step S307 is affirmative or "YES" (i.e., when ΔPf≧f(FAIL)), this means that the corrected intake manifold pressure difference ΔPf is sufficiently large, indicating that the sufficient exhaust gas recirculation takes place satisfactorily. Accordingly, in a step S108, it is decided that the exhaust gas recirculation control system operates normally without suffering any abnormality.

On the other hand, when the result of the decision in the step S307 indicates that the corrected intake manifold pressure difference ΔPf is smaller than the preset reference value f(FAIL) (i.e., when the step S307 results in negation "NO"), this means that the exhaust gas recirculation is insufficient. Accordingly, it is decided in a step S109 that the exhaust gas recirculation system suffers abnormality.

As can be appreciated from the foregoing description, by correcting the EGR-on intake manifold pressure value PbON and the EGR-off intake manifold pressure value PbOFF in dependence on the EGR-on engine rotation number NeON and the EGR-off engine rotation number NeOFF, the intake manifold pressure difference ΔP appearing in the intake manifold pressure value Pb due to variations of the deceleration state can be corrected correspondingly. Thus, it is possible to perform the decision as to occurrence of a fault in the exhaust gas recirculation control system with high accuracy by using the corrected intake manifold pressure difference ΔPf.

Additionally, because the preset reference value f(FAIL) for the fault decision which is compared with the corrected intake manifold pressure difference ΔPf by the fault decision means 304 (FIG. 1) is determined by the compensation means 305 in dependence on the engine rotation number Ne, the accuracy of the fault decision processing can further be enhanced.

In the foregoing description of the first embodiment of the invention, it has been assumed that both of the values based on the intake manifold pressure value Pb (i.e., the intake manifold pressure difference ΔP) and the fault decision reference value are corrected by the compensation means 305. It should however be understood that the compensation means 305 may be so arranged as to correct at least either the fault decision reference value or the EGR-on intake manifold pressure value PbON and the EGR-off intake manifold pressure value PbOFF on the basis of the EGR-on engine rotation number NeON and the EGR-off engine rotation number NeOFF, respectively, substantially to the similar effect.

Further, although it has been described that the EGR-off intake manifold pressure value PbOFF and the EGR-on intake manifold pressure value PbON are fetched and stored once in the steps S303 and S305, respectively, they may be corrected immediately after detection thereof with the functions f of the engine rotation number Ne, wherein deviations of the EGR-off intake manifold pressure value PbOFF and the EGR-on intake manifold pressure value PbON from the corrected values thereof may be stored as the corrected intake manifold pressure differences ΔPf.

Figure 5:
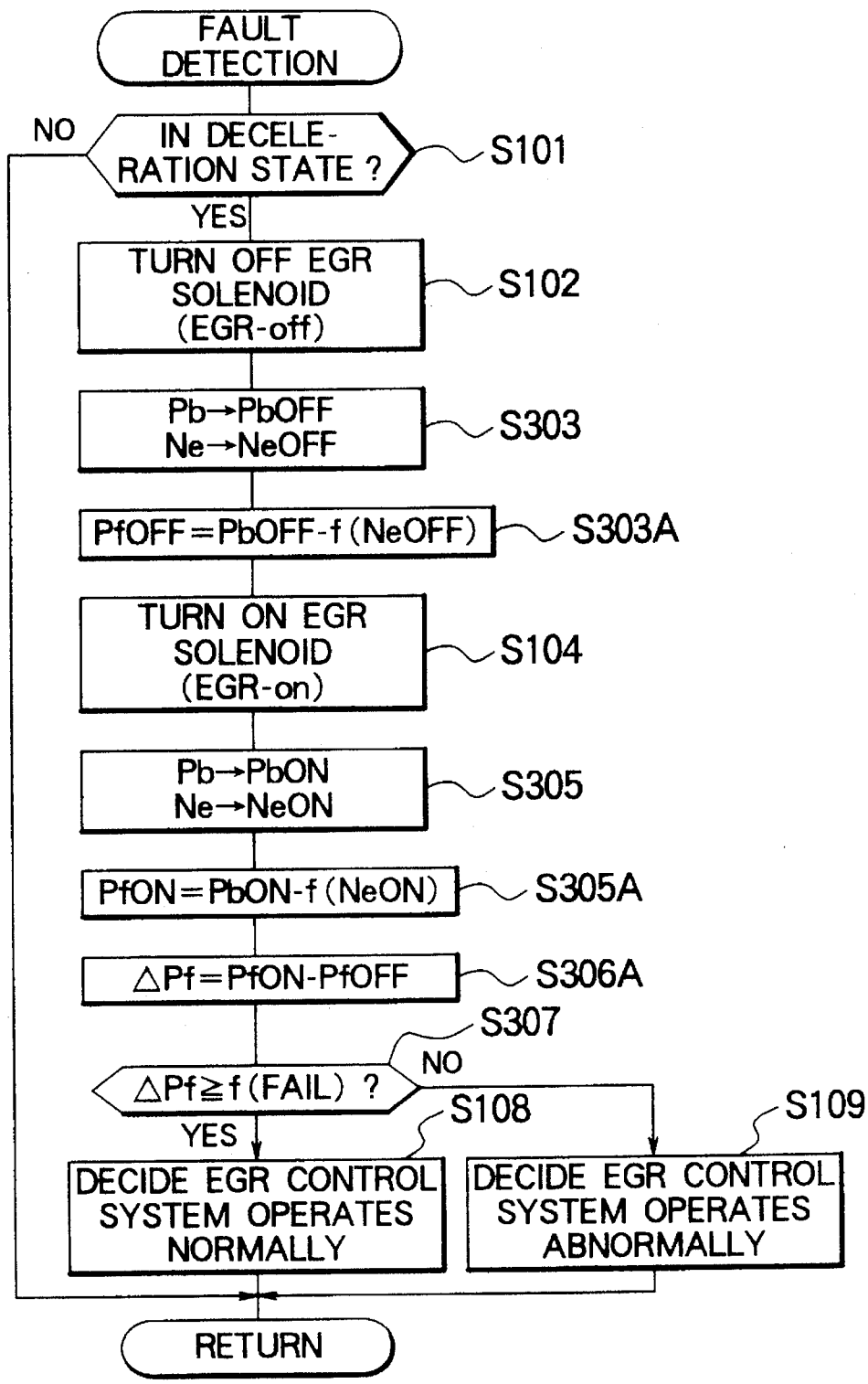
FIG. 5 is a flow chart for illustrating a version of the fault detection processing operation according to the first embodiment of the invention.

FIG. 5 is a flow chart for illustrating a version of the fault detection processing described above. In the figure, the steps S101, S102, S303, S104, S305, S307, S108 and S109 are same as those described hereinbefore. Further, a step S306A in FIG. 5 corresponds to the step S306 of the flow chart shown in FIG. 2.

According to the teaching of the invention incarnated in this version or modification, the EGR-off intake manifold pressure value PbOFF and the EGR-off engine rotation number NeOFF are detected in the step S303, which is followed by the step S303A where a corrected EGR-off intake manifold pressure value PfOFF is determined by taking into consideration the function f of the EGR-off engine rotation number NeOFF in accordance with the following expression (2):

$$PfOFF=PbOFF-f(NeOFF) \quad (2)$$

Similarly, after detection of the EGR-on intake manifold pressure value PbON and the EGR-on engine rotation number NeON in the step S305, a corrected EGR-on intake manifold pressure value PfON is determined by using the function f of the EGR-on engine rotation number NeON in accordance with the following expression (3):

$$PfON=PbON-f(NeON) \quad (3)$$

Subsequently, in the step S306A, the corrected intake manifold pressure difference ΔPf is determined from the corrected EGR-off intake manifold pressure value PfOFF and the corrected EGR-on intake manifold pressure value PfON both determined by the above expressions (2) and (3), respectively, in accordance with the following expression (4):

$$\Delta Pf=PfON-PfOFF \quad (4)$$

It can be appreciated that the above expression (4) is substantially identical with the expression (1). By using the corrected intake manifold pressure difference ΔPf thus obtained, the fault detection for the exhaust gas recirculation control system can be performed similarly to the processing (the first embodiment) described above.

Embodiment 2

In the case of the fault detecting apparatus for the exhaust gas recirculation control system according to the first embodiment of the invention, the throttle opening degree θ is not taken into consideration in executing the fault detection processing because the deceleration state is presumed as the condition for enabling the fault decision. However, in case the stable state is selected as the condition for enabling the fault decision, detection errors ascribable to change in the throttle opening degree θ as well as the intake manifold pressure Pb can not be neglected.

The second embodiment is directed to such arrangement that the change in the throttle opening degree θ is taken into account in the fault detection processing and will be described below by referring to a characteristic diagram of FIG. 6 and the flow chart of FIG. 7 in combination with FIG. 1, FIG. 21 and FIG. 22.

The fault decision enabling condition detecting means 302 determines as the condition for the fault detection processing the stable state of the internal combustion engine on the basis of the engine rotation number Ne.

The operation state information U inputted to the fault decision means 304 contains the engine rotation number Ne (in rpm) and the throttle opening degree θ of the throttle valve 7, wherein the fault decision means 304 makes decision as to occurrence of abnormality in the exhaust gas recirculation control system through comparison of the value based on the intake manifold pressures Pb detected upon enforcive opening and closing of the EGR control valve 11 with the fault decision reference value FAIL.

The compensation means 305 incorporated in the fault decision means 304 is adapted to correct at least either the fault decision reference value or the value derived from the intake manifold pressures Pb detected upon enforcive opening/closing of the EGR control valve 11 by using the throttle opening degrees θ detected at the time points of the enforcive operations of the EGR control valve 11 mentioned above.

Figure 6:
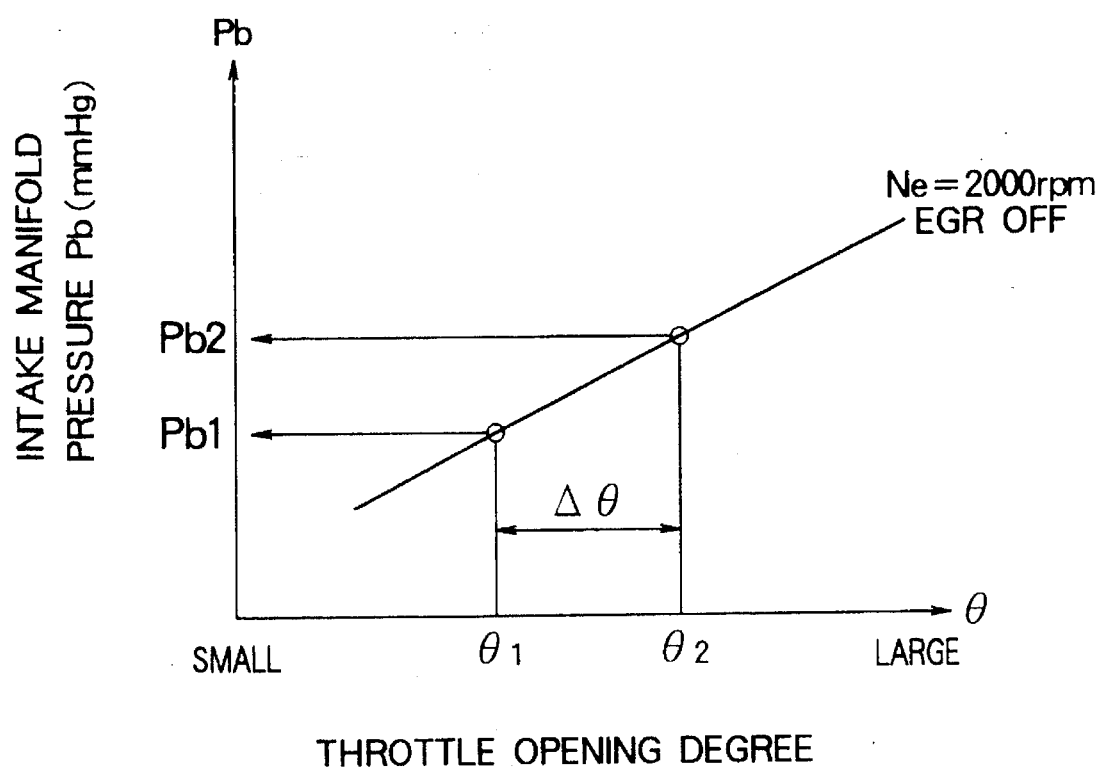
FIG. 6 is a characteristic diagram showing a relation between a throttle opening degree and an intake manifold pressure for illustrating the concept underlying a fault detecting apparatus according to a second embodiment of the invention.

FIG. 6 is a characteristic diagram illustrating a relation between the throttle opening degree θ and the intake manifold pressure Pb in the state in which the engine rotation number Ne is fixed at, for example, 2000 rpm and in which the exhaust gas recirculation is absent. As can be seen from this figure, the intake manifold pressure Pb as detected varies as the throttle opening degree θ changes.

Assuming, by way of example only, that the throttle opening degree θ changes from a value θ1 to a value θ2, the intake manifold pressure difference ΔP should be corrected by a value comparable to the deviation Δθ of the throttle opening degree in order to compensate for error which the intake manifold pressure Pb will suffer.

Figure 24:
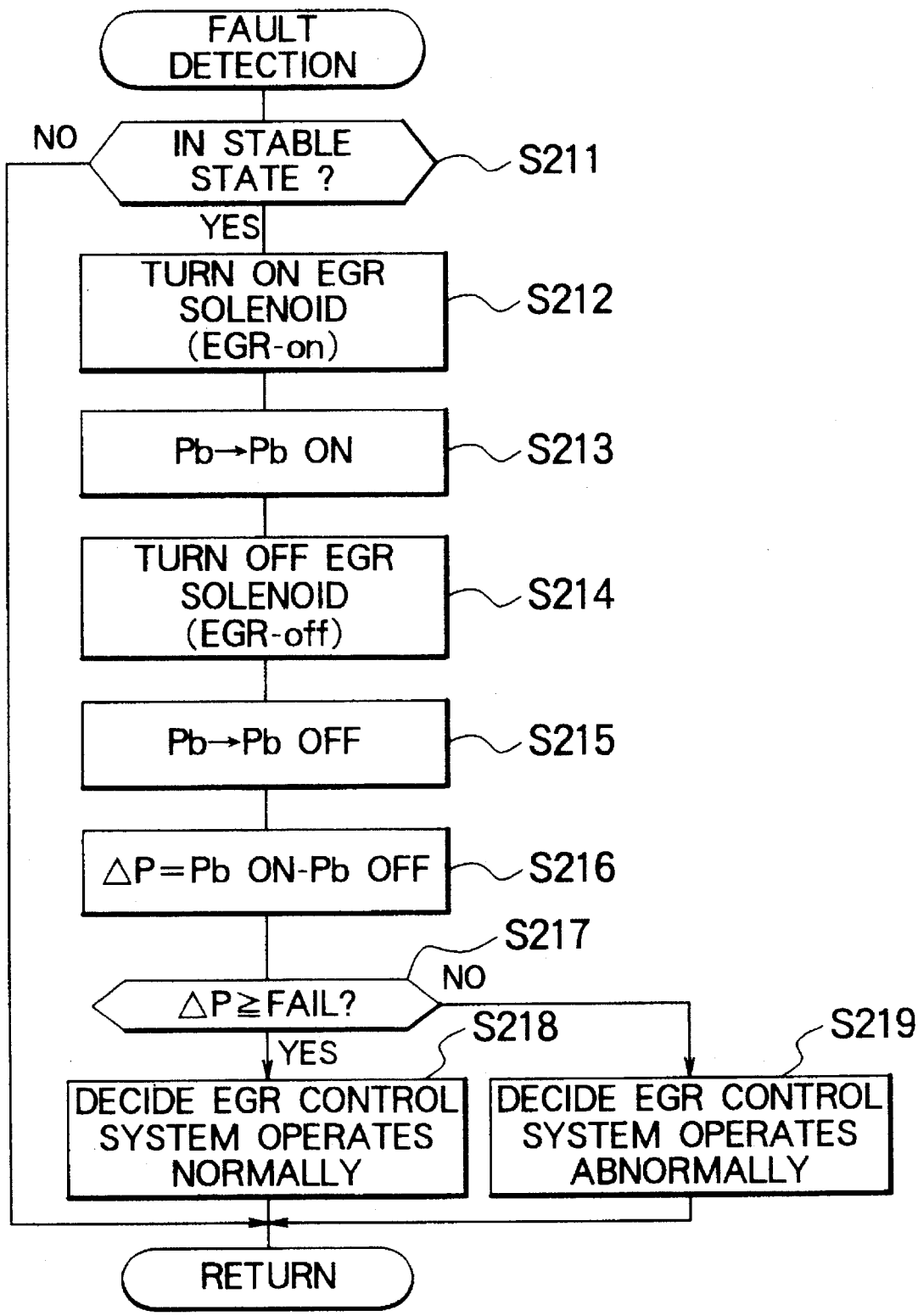
FIG. 24 is a flow chart for illustrating another conventional processing for detecting occurrence of a fault in the exhaust gas recirculation control system.

Next, operations involved in the fault detection executed by the fault decision means 304 incorporated in the CPU 200 according to the second embodiment of the invention will be described by reference to a flow chart of FIG. 7. In this figure, the steps S211, S212, S214, S218 and S219 are same or equivalent to those shown in FIG. 24, while the steps S223, S225, S226 and S227 correspond to the steps S213, S215, S216 and S217 shown in FIG. 24, respectively.

Referring to the figure, in the step S221, it is checked on the basis of the engine rotation number Ne and the throttle opening degree θ determined through processing routines (not shown) whether variation or deviation in the engine rotation number Ne is smaller than or equal to a preset value (i.e., whether the motor vehicle is in the stable state). If it is decided that the motor vehicle is not in the stable state (i.e., when the step S221 results in "NO"), the fault detection processing illustrated in FIG. 7 comes to an end.

On the other hand, when the answer of the decision step S211 is affirmative "YES", indicating that the motor vehicle is in the stable operation state, the EGR solenoid device 12 is actuated to thereby validate the exhaust gas recirculation in the step S212. As mentioned previously, when the motor vehicle is in the stable state, the EGR-on state normally prevails.

Accordingly, in the step 223, the intake manifold pressure Pb and the throttle opening degree θ in the EGR validated state are fetched and stored as the EGR-on intake manifold pressure value PbON and the EGR-on throttle opening degree θ1, respectively.

Subsequently, in the step S214, the EGR solenoid device 12 is forcibly deactivated to invalidate or stop the exhaust gas recirculation, which is then followed by the step S225 where the intake manifold pressure Pb and the throttle opening degree θ in the EGR-off state are fetched to be stored as the EGR-off intake manifold pressure value PbOFF and the EGR-off throttle opening degree θ2, respectively.

At this time point, there will make appearance a distinct difference between the EGR-off intake manifold pressure value PbOFF and the EGR-on intake manifold pressure value PbON so long as the exhaust gas recirculation is effected normally. Besides, it is possible to detect whether or not difference exists between the EGR-on throttle opening degree θ and the EGR-off throttle opening degree θ2 in the EGR-on and EGR-off states, respectively.

Accordingly, in the step S226, the intake manifold pressure difference ΔP between the EGR-on intake manifold pressure value PbON and EGR-off intake manifold pressure value PbOFF in the EGR-on and EGR-off states, respectively, is determined. Additionally, a correcting value g(Δθ) is determined in terms of a function g of the deviation Δθ(=θ1−θ2) between the EGR-on throttle opening degree θ1 and the EGR-off throttle opening degree θ2. Subsequently, a corrected intake manifold pressure difference value ΔPg is arithmetically determined in accordance with the following expression (5):

$$\Delta Pg = \Delta P - g(\Delta\theta) \quad (5)$$

In the above expression, the corrected value is clipped to zero when the correcting value g(Δθ) is of negative value, (i.e., of minus sign) for thereby preventing excessive correction of the deviation Δθ of the throttle opening degree.

In succession, in the step S227, it is decided whether or not an intake manifold pressure difference ΔPg is greater than a preset value FAIL. When the result of this decision step S227 is affirmative or "YES" (i.e., when ΔP≧FAIL), indicating that the intake manifold pressure difference ΔP is sufficiently large, it is then decided that the exhaust gas recirculation control system is normal. Accordingly, in the step S218, it is decided that the exhaust gas recirculation control system operates normally without suffering any fault. On the other hand, when the decision result of the step S227 indicates that the corrected intake manifold pressure difference ΔPg is smaller than the preset value FAIL (i.e., when the step S227 results in negation "NO"), this means that the exhaust gas recirculation is not normally carried out. Accordingly, it is decided in a step S219 that the exhaust gas recirculation system suffers abnormality.

Further, a processing routine in the step S211 for detecting change or variation in the stable state is provided association with the step S211, although it is not shown, and activated as an interruption processing periodically at every predetermined time interval for sampling the engine rotation number Ne and the throttle opening degree θ for the purpose of detecting change in the stable state on the basis of differences of these parameters before and after the sampling point, respectively. When occurrence of the change in the stable state is detected, the fault detecting routine for the exhaust gas recirculation system comes to an end.

As is apparent from the above description, the fault detection processing can be performed with enhanced accuracy by virtue of correction of the intake manifold pressure Pb by taking into account the variation in the throttle opening degree θ. Further, even when the deviation Δθ of the throttle opening degree greater than the preset value makes appearance in the course of the fault detection processing, the processing can continuously be carried out, whereby the problem that the exhaust gas purification performance of the exhaust gas recirculation control system is degraded due to frequent repetition of the fault detecting operation can satisfactorily be solved.

In the forgoing description, it has been assumed that the compensation means 305 is so arranged as to compensate for only the intake manifold pressure difference ΔP. It goes, however, without saying that the compensation means 305 may equally be so arranged as to correct at least one of the fault decision reference value and the intake manifold pressures Pb. Besides, although it has been described that the individual detection values are once stored, it will readily be understood that these detection values can be subjected to the correcting operation immediately upon detection thereof, as mentioned hereinbefore by reference to FIG. 5.

Embodiment 3

In the first and second embodiments of the invention, no consideration is paid to a minimum resolution of an AD converter used for analogue-to-digital (A/D) conversion of the throttle opening degree θ. However, the accuracy and reliability of the fault detection for the exhaust gas recirculation control system can further be improved by performing the compensation on the parameters involved in the fault detection in dependence on the minimum resolution (quantization) of the A/D converter.

For the reason mentioned above, a third embodiment of the present invention is directed to the compensation which depends on the minimum resolution pitch (unit quantization) of the A/D converter. Now, the third embodiment of the invention will be described by reference to a characteristic diagram of FIG. 8 and a flow chart of FIG. 9 together with FIG. 1, FIG. 21 and FIG. 22.

According to the teachings of the invention incarnated in this embodiment, the compensation means 305 includes an A/D converter 203 (see FIG. 22) for converting an analogue signal indicative of the throttle opening degree θ into a corresponding digital signal and is adapted to correct the fault decision reference value or the value derived from the intake manifold pressures Pb in accordance with the minimum resolution pitch of the A/D converter 203.

First, description will be made of error attributable to the minimum resolution pitch of the A/D converter 203 by reference to FIG. 8 which is a characteristic diagram for illustrating a relation between the throttle opening degree θ and the intake manifold pressure Pb in the EGR-off state on the assumption that the engine rotation number Ne is held constant at 2000 rpm, similarly to the case illustrated in FIG. 6, wherein intake manifold pressure values Pb1 and Pb2 correspond to those shown in FIG. 6 and wherein δ represents the minimum resolution pitch of the A/D converter 203. It can be seen from FIG. 8 that change in the throttle opening degree θ brings about change in the intake manifold pressure Pb as detected.

Normally, the A/D converter 203 incorporated in the electronic control unit 22 has the minimum resolution. Consequently, it is impossible to detect the throttle opening degree θ linearly in the strict sense in practice. Thus, the throttle opening degree θ is discretely detected with a minimum quantized degree corresponding to the minimum resolution δ.

Under the circumstances, different throttle opening degrees θ1a and θ1b falling within the minimum resolution pitch δ will be detected as a same throttle opening degree. The same holds true for the throttle opening degrees θ2a and θ2b.

For the reasons mentioned above, detection of the deviation Δθ of the throttle opening degree between the points θ1a and θ2a (represented by empty circle) and between the points θ1b and θ2b (represented by solid circle) will result in a same value. Accordingly, if the intake manifold pressure difference ΔP is corrected by a value comparable to the deviation Δθ of the throttle opening degree obtained in this manner, error of a magnitude corresponding to the minimum resolution pitch δ at maximum (i.e., difference between the points θ1b and θ1a or between the points θ2a and θ2b) will occur in the intake manifold pressure Pb, which represents a cause for error in the result of the fault detection.

Next, fault detecting operation according to the third embodiment of the invention will be described by reference to a flow chart shown in FIG. 9.

Figure 7:
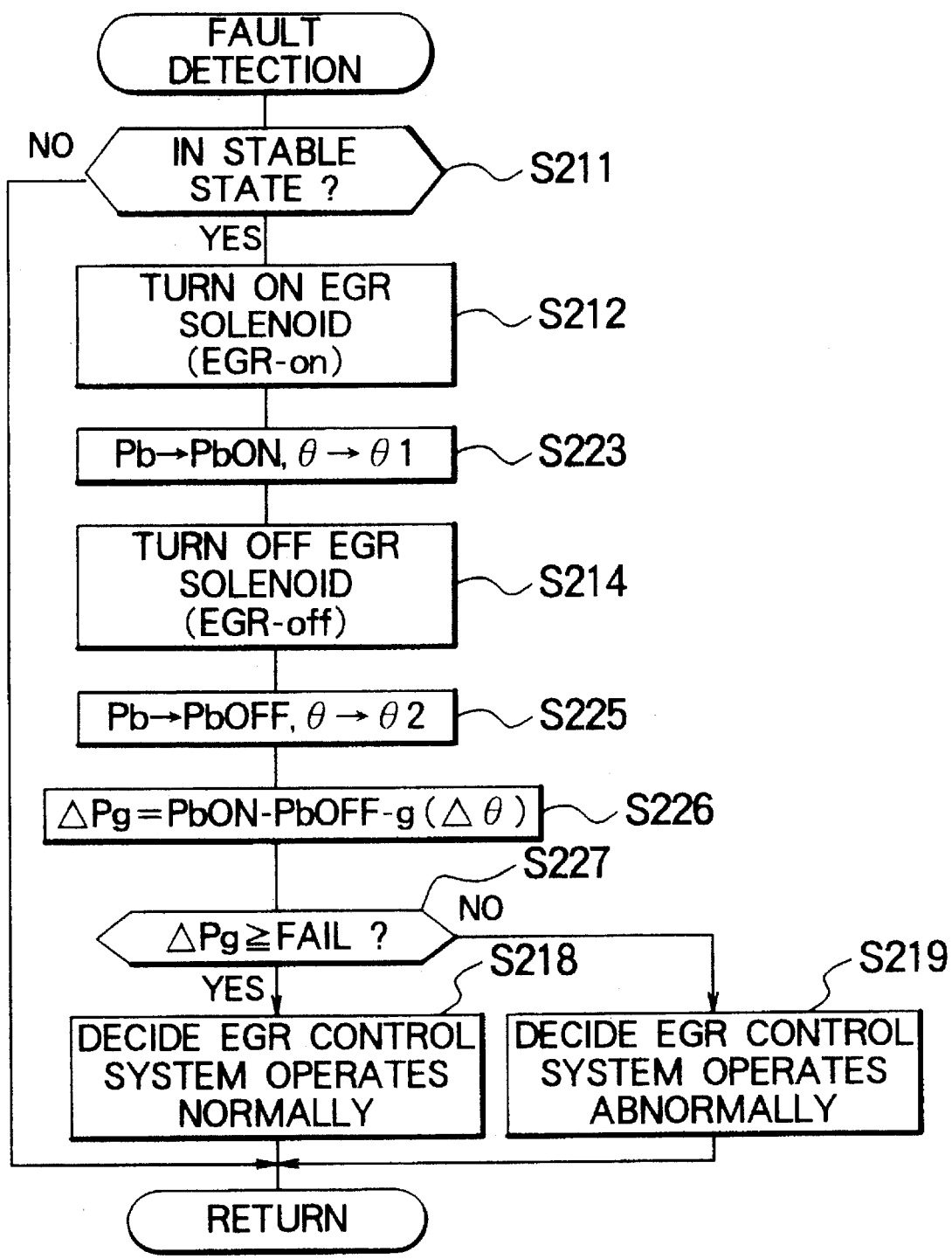
FIG. 7 is a flow chart illustrating a fault detection processing for an exhaust gas recirculation control system as executed by the fault detecting apparatus according to the second embodiment of the invention.
Figure 9:
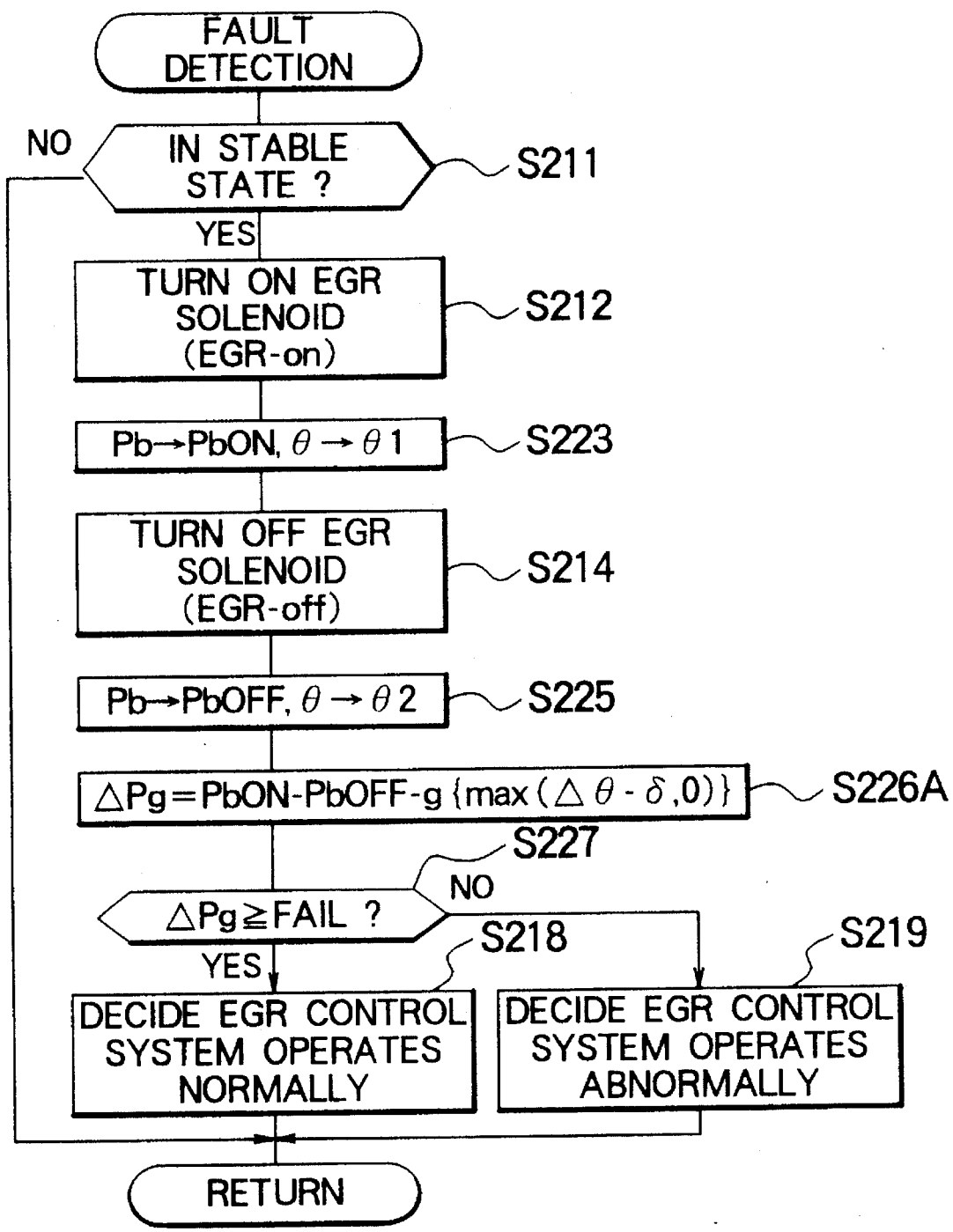
FIG. 9 is a flow chart for illustrating a fault detection processing for an exhaust gas recirculation control system executed by the fault control apparatus according to the third embodiment of the invention.

Parenthetically, the processing flow illustrated in FIG. 9 corresponds to that shown in FIG. 7 (the second embodiment) except that the step S226 in FIG. 7 is replaced by a step S226A. Accordingly, repetition of description in detail for the same steps as those shown in FIG. 7 will be unnecessary.

Referring to FIG. 9, when it is decided in the step S211 that the internal combustion engine is in the stable state, the EGR solenoid device 12 is actuated in the step S212, which is followed by the step S223 where the EGR-on intake manifold pressure value PbON and the throttle opening degree θ1 are fetched to be stored in a memory (not shown). Thereafter, in the step S224, the EGR solenoid device 12 is deactivated, whereupon the EGR-off intake manifold pressure value PbOFF and the EGR-off throttle opening degree θ2 are fetched to be stored.

Subsequently, in order to correct the intake manifold pressure difference ΔP between the EGR-on intake manifold pressure value PbON and EGR-off intake manifold pressure value PbOFF with the deviation Δθ of the throttle opening degree, a correcting value g(Δθ−δ) is determined on the basis of the intake manifold pressure difference ΔP and the deviation Δθ of the throttle opening degree to determine a corrected intake manifold pressure difference ΔPg in accordance with the following expression (6) (step S226A). Namely, $$\Delta Pg = \Delta P - g\{max(\Delta\theta - \delta, 0)\} \tag{6}$$

However, when the correcting value g(Δθ−δ) is of minus sign, it is clipped to zero in order to prevent excessive correction.

In secession, in the step S227, the corrected intake manifold pressure difference ΔPg is compared with the decision reference value FAIL. When the comparison shows that the corrected intake manifold pressure difference ΔPg is greater than the fault decision reference value, it is decided in the step S218 that the exhaust gas recirculation system operates normally. If otherwise, it is decided in the step S219 that the exhaust gas recirculation system suffers abnormality.

As is apparent from the foregoing, by subtracting the minimum resolution δ from the deviation Δθ of the throttle opening degree, as can be seen from the expression (6), correction of the intake manifold pressure Pb can be realized with the aid of the throttle opening degree θ by taking into consideration the minimum resolution pitch δ of the A/D converter, whereby accuracy of the fault detection can further be enhanced.

Next, description will be made in detail of the correction in which the minimum resolution pitch δ is taken into consideration.

Figure 8:
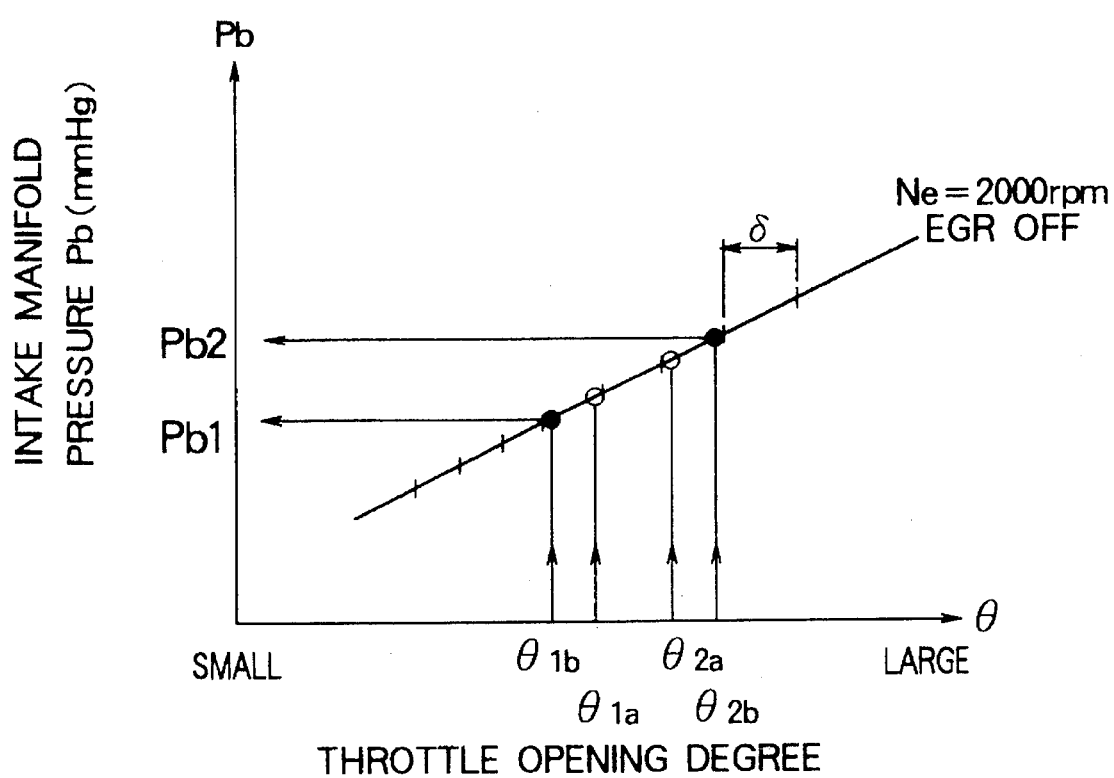
FIG. 8 is a characteristic diagram showing a relation between a throttle opening degree and an intake manifold pressure with a minimum resolution quantization of an A/D converter being taken into consideration in a fault detecting apparatus according to a third embodiment of the invention.

By way of example, let's consider that the throttle opening degree θ increases by a minute opening degree δθ (which is smaller than the minimum resolution pitch δ) from a value located immediately before the quantization with the minimum resolution pitch δ on the characteristic curve shown in FIG. 8 such as the point θ2b. In that case, the A/D conversion of the throttle opening degree θ by the A/D converter 203 will result in increase by one bit.

On the other hand, when the throttle opening degree θ increases by a minute value which is smaller than the minute throttle opening degree δθ or the minimum resolution pitch δ from a point immediately following the quantization with the minimum resolution pitch δ such as the point θ2a, the digital quantity resulting from the A/D conversion of the throttle opening degree θ by the A/D converter 203 will not increase at all because the change of the throttle opening degree θ does not exceed the minimum resolution pitch δ.

As a consequence, by subtracting the minimum resolution pitch δ from the deviation Δθ of the throttle opening degree in accordance with the aforementioned expression (6), the digital quantity resulting from the A/D conversion of the throttle opening degree θ by the A/D converter 203 can increase by one bit only when the throttle opening degree θ increases more than the minimum resolution pitch δ of the A/D converter. Thus, the digital quantity resulting from the A/D conversion is prevented from increasing by one bit for all increments of the throttle opening degree θ by the minute throttle opening degree δθ, whereby occurrence of error due to the A/D conversion can adequately be suppressed.

Embodiment 4

In the case of the embodiments of the invention described above, no consideration is paid to error or change of the intake manifold pressure Pb which is attributable to change or variation in the bypass air flow rate Qb. It is however desirable to inhibit the bypass air flow rate Qb from changing in the course of execution of the fault detection processing in order to exclude the error ascribable to variation in the bypass air flow rate Qb.

In the following, a fourth embodiment of the invention which is directed to prevent the bypass air flow rate Qb from varying during the fault detecting operation will be described by reference to a characteristic diagram of FIG. 10 and a flow chart of FIG. 11 together with FIG. 1, FIG. 21 and FIG. 22.

In this case, it is assumed that the prerequisite condition for enabling the fault detection processing is that the internal combustion engine is in the deceleration state. Further, the compensation means 305 includes a bypass air flow rate change inhibit means for inhibiting the bypass air flow rate Qb from changing when the fault decision enabling condition is satisfied.

Figure 10:
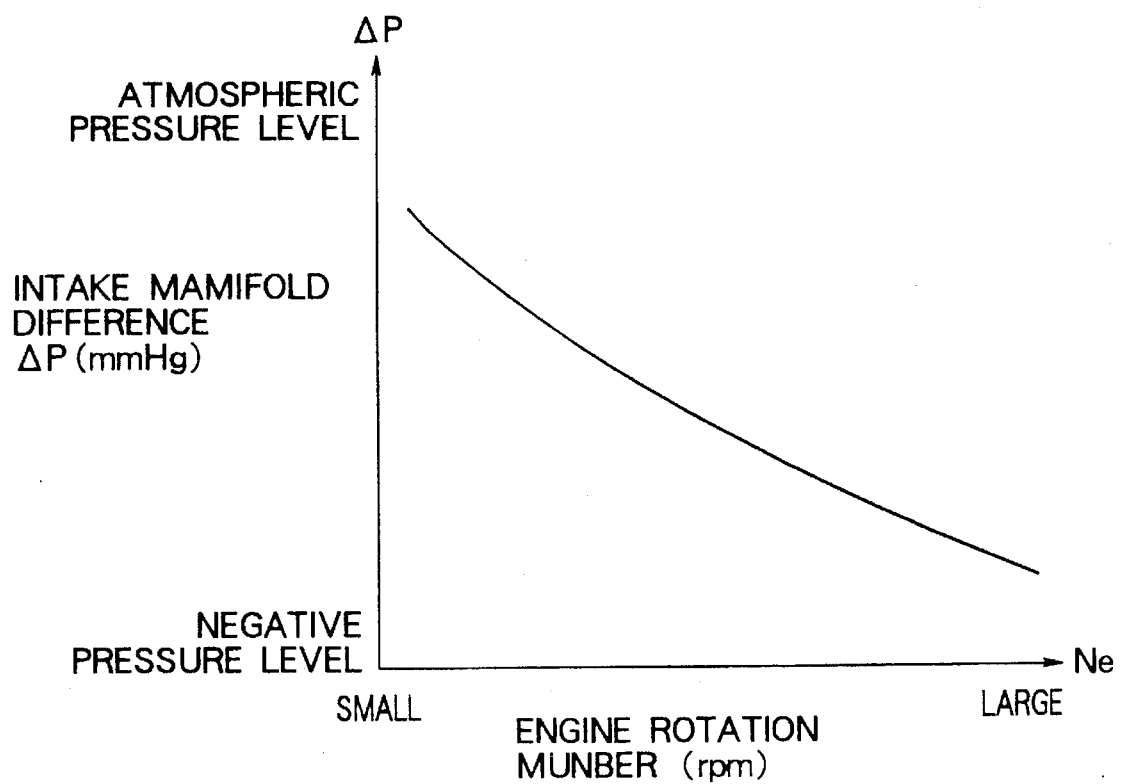
FIG. 10 is a characteristic diagram showing graphically a relation between an engine rotation number (rpm) and an intake manifold pressure difference or deviation (mmHg) during deceleration of the engine with a bypass air flow rate being taken as a parameter for illustrating the concept underlaying a fourth embodiment of the invention.

FIG. 10 is a characteristic diagram for graphically illustrating a relation between the engine rotation number Ne and the intake manifold pressure difference $\delta P$ in the case where the bypass air flow rate Qb is fixed at zero or 200 (l/m). As can be seen from this diagram, the relation between the engine rotation number Ne and the intake manifold pressure difference $\Delta P$ can be represented by a same characteristic curve independent of the value at which the bypass air flow rate Qb is held to be constant, as indicated by a single solid-line curve.

Figure 29:
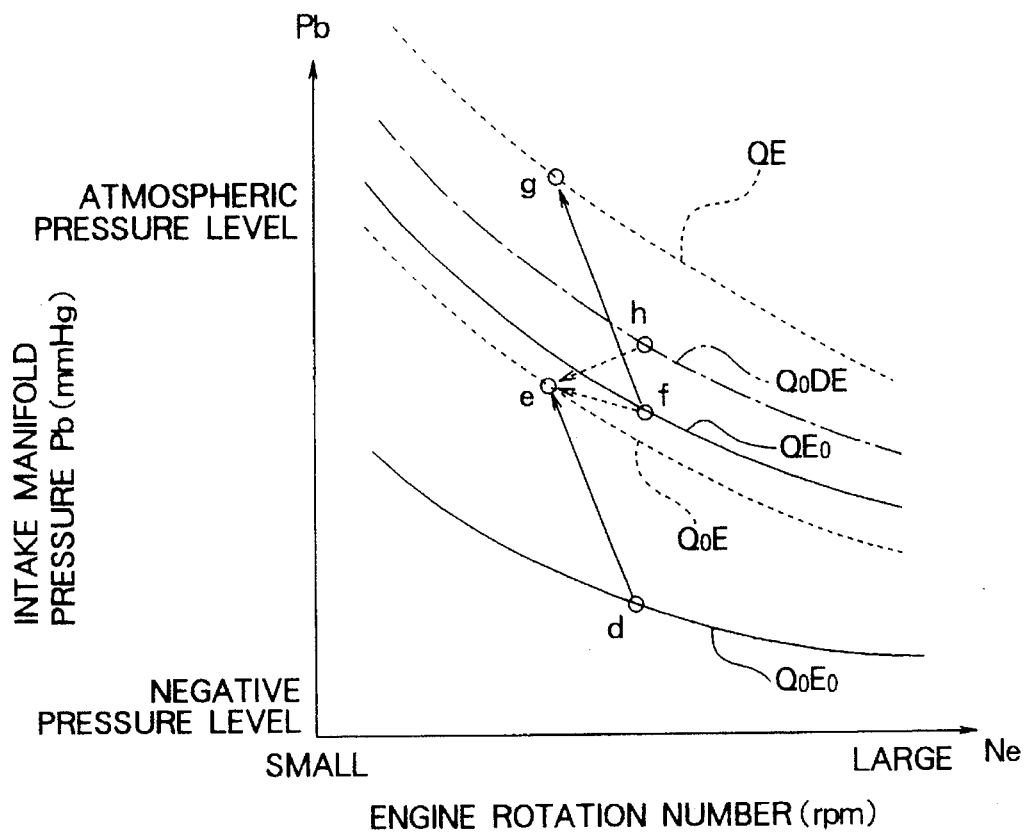
FIG. 29 is a characteristic diagram for graphically illustrating generally relations between an intake manifold pressure and an engine rotation number during deceleration of an engine with a change of a bypass air flow rate being taken as parameter.

More specifically, in the characteristic diagram of FIG. 29, the intake manifold pressure Pb assumes different values in dependence on the values of the bypass air flow rate Qb (i.e., zero or 200 l/m). In contrast, by employing the intake manifold pressure difference $\Delta P$ of the intake manifold pressure Pb, there arises no difference in the intake manifold pressure difference $\Delta P$ in dependence on the values at which the bypass air flow rate Qb is fixed to be constant, as can be seen from the single solid-line curve shown in FIG. 10. The fault detection processing according to the instant embodiment is performed by taking advantage of this fact.

Now, referring to the flow chart of FIG. 11, the fault detecting operation according to the instant embodiment will be described. Parenthetically, the processing flow shown in FIG. 11 corresponds to that of FIG. 2 (which was referred to in the description of the first embodiment) except that a step S11 is additionally inserted between the steps S101 and S102.

Figure 11:
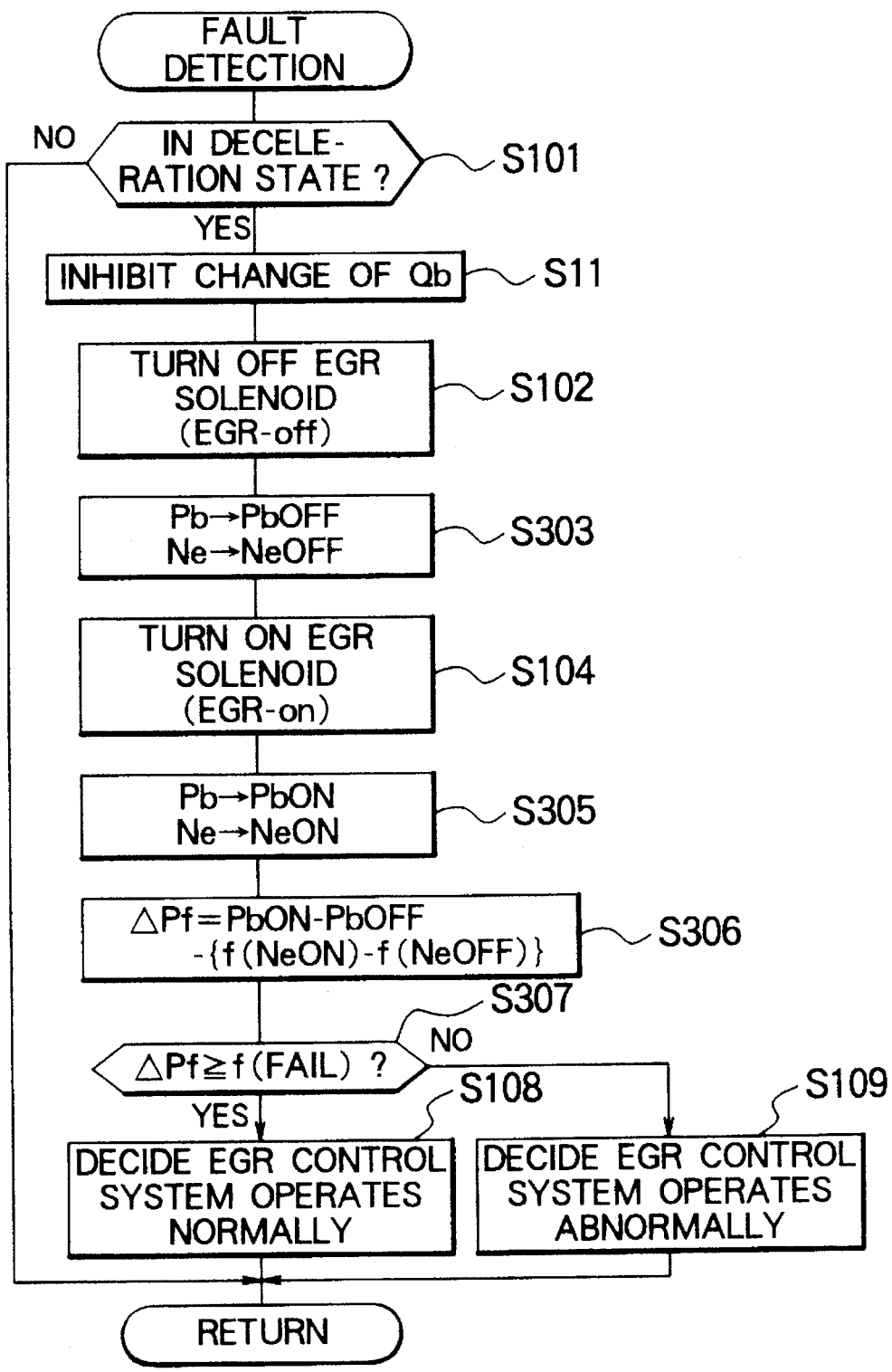
FIG. 11 is a flow chart for illustrating a fault detection processing for an exhaust gas recirculation control system executed by a fault detecting apparatus according to the fourth embodiment of the invention.
Figure 25:
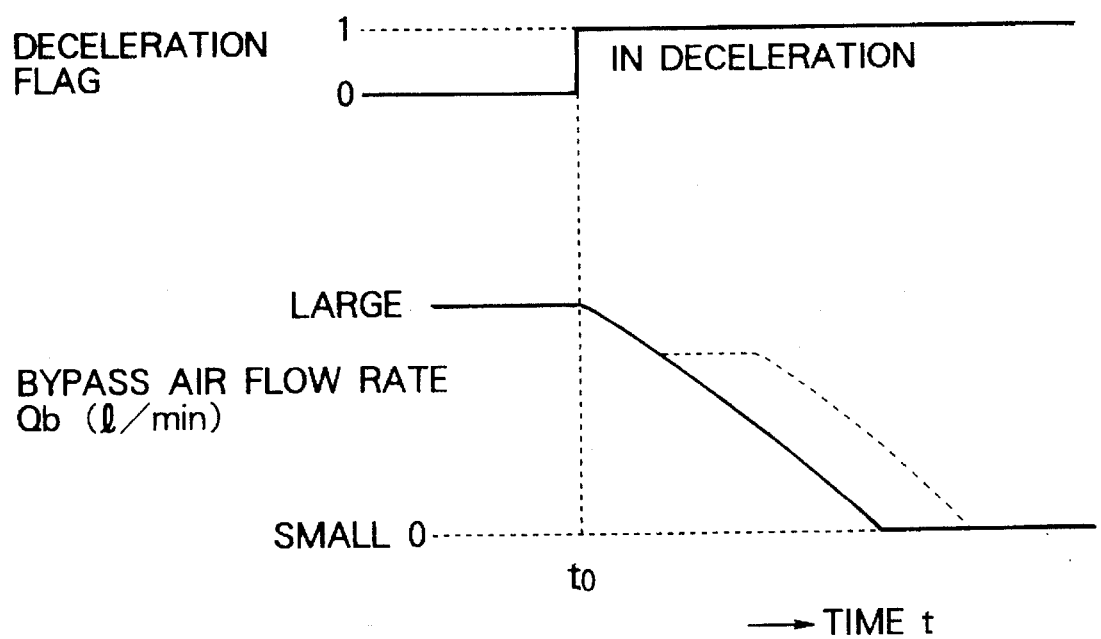
FIG. 25 is a timing chart for graphically illustrating generally a change in a bypass air flow rate as a function of time lapse in a deceleration state of an internal combustion engine.

Referring to FIG. 11, in succession to the decision step S101 where the internal combustion engine is decided as being decelerated, the bypass air flow rate Qb is inhibited from being updated or changed during the period in which the fault detecting operation is performed in the step S11. Thus, the bypass air flow rate Qb continues to be constant during the fault detecting operation, as indicated by a broken line in FIG. 25.

By inhibiting the bypass air flow rate Qb from being changed (or by maintaining the bypass air flow rate Qb to be constant, to say in another way) during execution of the fault detection processing in this manner, the intake manifold pressure difference $\Delta P$ can be protected against error ascribable to variation in the bypass air flow rate Qb.

The processing steps following the step S102 are the same as those shown in FIG. 2. Thus, repeated description of these steps will be unnecessary. Although the above description has been made on the assumption that the condition for enabling the fault detection processing is that the internal combustion engine is in the deceleration state, it goes without saying that substantially same effects can be achieved equally even when the engine is in the stable state.

Embodiment 5

In the case of the fourth embodiment described above, the bypass air flow rate Qb is inhibited from being changed during execution of the fault detection processing. However, such an arrangement may equally be adopted in which the influence of variation in the bypass air flow rate Qb to the intake manifold pressure Pb is compensated for.

The fifth embodiment of the invention is directed to the compensation for the influence of the change in the bypass air flow rate Qb to the intake manifold pressure Pb. This embodiment will be described by reference to a flow chart of FIG. 12 together with FIG. 1, FIG. 21, FIG. 22 and FIG. 29.

Also in this case, it is assumed that the fault decision enabling condition is that the engine is in the deceleration state. The operation state information U inputted to the fault decision means 304 (see FIG. 1) contains the bypass air flow rate Qb. Further, the fault decision means 304 makes decision concerning occurrence of fault in the exhaust gas recirculation control means by comparing a value based on the intake manifold pressures Pb detected upon enforcive opening/closing of the EGR control valve 11 with the fault decision reference value.

Furthermore, the compensation means 305 is adapted to correct at least either one of the fault decision reference value FAIL referenced by the fault decision means 304 or the intake manifold pressures Pb detected upon enforcive opening/closing of the EGR control valve 11 by making use of the bypass air flow rate Qb detected concurrently.

Referring to FIG. 29 which is a characteristic diagram for graphically illustrating a relation between the engine rotation number Ne (in rpm) and the intake manifold pressure Pb (in mmHg), it can be seen that the intake manifold pressure Pb assumes different values in dependence on changes of the bypass air flow rate Qb. According to the instant embodiment of the invention, the fault detection is carried out by taking into consideration this fact.

Now, by referring to the flow chart of FIG. 12, description will be made of the fault detecting operation according to the instant embodiment. Incidentally, the flow chart of FIG. 12 substantially corresponds to that of FIG. 2 (referred to in the description of the first embodiment). More specifically, steps S303B, S305B and S306B shown in FIG. 12 correspond to the steps S303, S305 and S306 shown in FIG. 2, respectively. The other steps shown in FIG. 12 are essentially same as those designated by like reference characters in FIG. 2.

More specifically, in the steps S303B and S305B, the bypass air flow rate Qb is detected in addition to the detected values of the intake manifold pressure Pb, while in the step S306B, the detected value of the bypass air flow rate Qb is employed as an additional correcting quantity.

Figure 12:
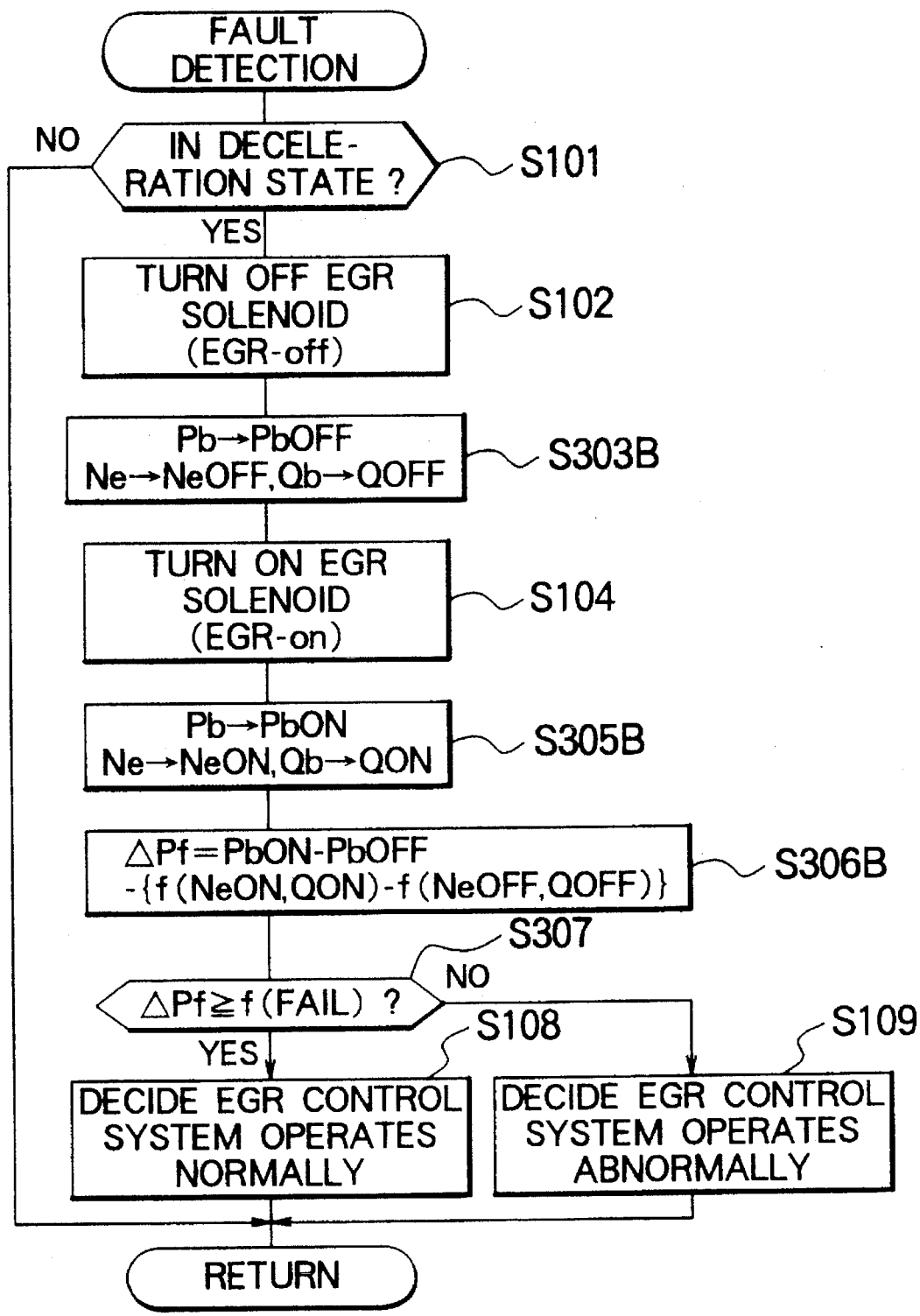
FIG. 12 is a flow chart illustrating a fault detection processing for an exhaust gas recirculation control system executed by a fault detecting apparatus according to a fifth embodiment of the invention.

Referring to FIG. 12, when it is decided in the step S101 that the internal combustion engine is being decelerated, the exhaust gas recirculation is turned off in the step S102, which is then followed by the step S303B where EGR-off intake manifold pressure value PbOFF and the EGR-off bypass air flow rate QbOFF are detected to be stored in a memory (not shown). Incidentally, the bypass air flow rate Qb can be detected on the basis of a bypass control signal B which is supplied to the bypass air flow rate control means 9 from the electronic control unit 22.

Similarly, the EGR-on intake manifold pressure value PbON, the EGR-on engine rotation number NeON and the EGR-on bypass air flow rate QbON are detected and stored in the step S305B.

Subsequently, in the step S306B, the intake manifold pressure Pb is corrected on the basis of a difference δQ between the EGR-on bypass air flow rate QbON and the EGR-off bypass air flow rate QbOFF by referencing the relation illustrated in FIG. 29. To be more concrete, the corrected intake manifold pressure difference ΔPf is arithmetically determined by using functions f in accordance with the following expression (7):

$$\Delta Pf = \Delta P - \{f(NeON, QON) - f(NeOFF, QOFF)\} \quad (7)$$

Through the processing described above, the intake manifold pressure Pb can be protected against error brought about by variation of the bypass air flow rate Qb.

In this case, it is sufficient for the compensation means 305 to correct at least either one of the fault decision reference value FAIL or the value based on the intake manifold pressure values Pb. Further, although it has been described that the quantities detected in the steps S303B and S305B are once stored, they can be corrected immediately after the detection thereof.

Embodiment 6

In the fifth embodiment described above, the bypass air flow rate Qb is detected to be used as one of the correcting quantities. However, such arrangement may equally be adopted in which the fault detecting operation is put into effect after a change (a gentle change brought about by the dashpot operation mentioned previously, hereinafter referred to also as the dashpot change) of the bypass air flow rate Qb.

Now, a sixth embodiment of the invention which is designed to perform the fault detection processing upon detection of termination of change in the bypass air flow rate Qb will be described by referring to a flow chart of FIG. 13 together with FIG. 1, FIG. 21 and FIG. 22.

In the case of the instant embodiment, the compensation means 305 includes a bypass air flow change termination detecting means for deciding whether or not change of the bypass air flow rate Qb has been completed or terminated. Further, the EGR valve open/close enforcing means 303 and the fault decision means 304 are validated when the fault decision enabling condition is satisfied and when the change of the bypass air flow rate Qb has been terminated.

Referring to the flow chart of FIG. 13, the fault detecting operation of the instant embodiment will be described.

Figure 13:
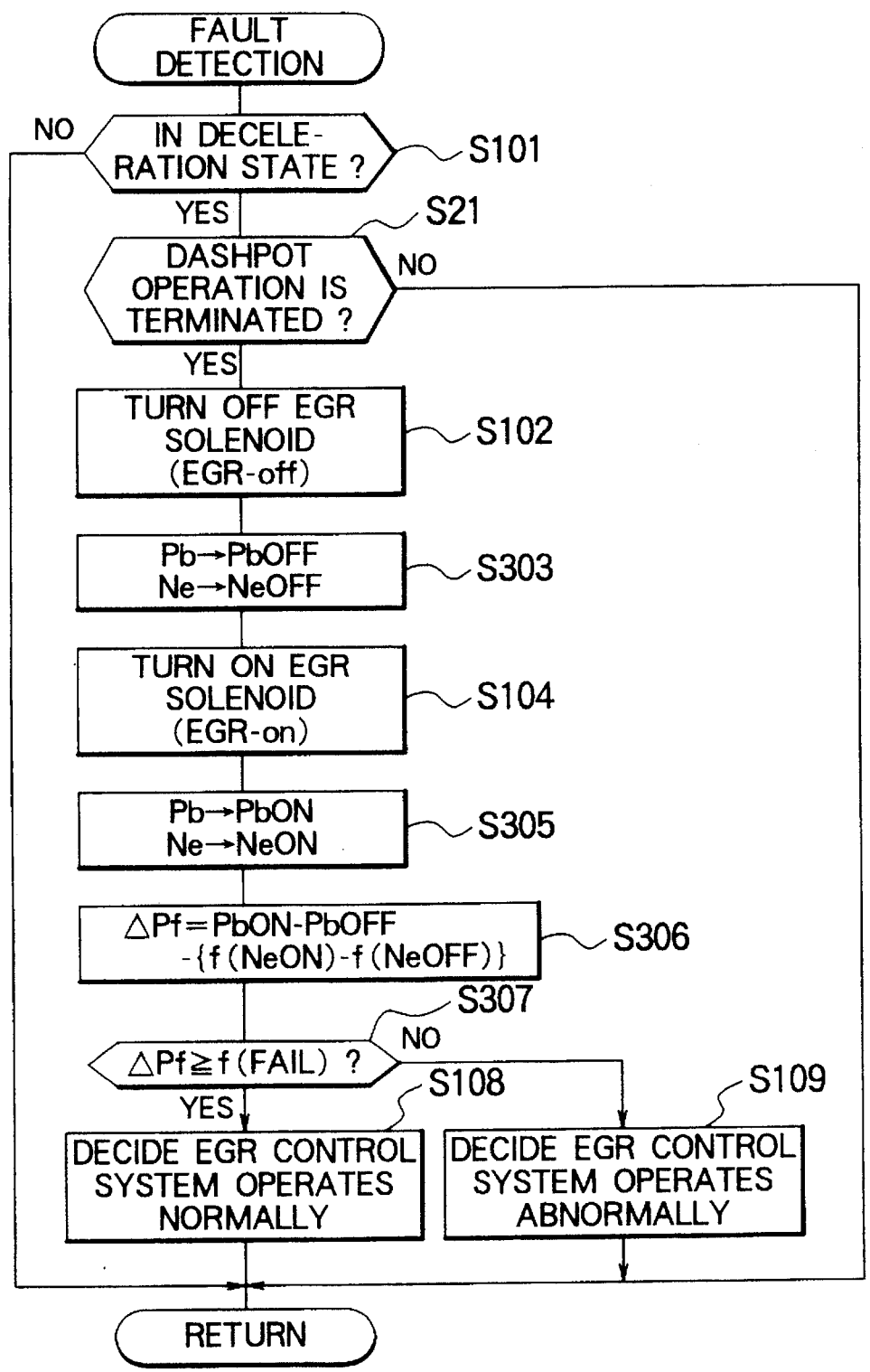
FIG. 13 is a flow chart illustrating a fault detection processing for an exhaust gas recirculation control system execution by a fault detecting apparatus according to a sixth embodiment of the invention.

Parenthetically, the processing flow shown in FIG. 13 is essentially same as that of FIG. 2 except that a step S21 is additionally inserted between the steps S101 and S102.

Referring to FIG. 13, in the step S101, it is decided that the internal combustion engine is in the deceleration state, whereupon the decision step S21 is executed to determine whether the dashpot operation (i.e., change of the bypass air flow rate Qb) has been terminated.

The bypass air flow rate Qb is given by the following expression (8):

$$Qb = \max\{Qi, Qd\} \quad (8)$$

where Qi represents a bypass air flow rate required in the idle state and Qd represents a bypass air flow rate brought about by the dashpot operation. Thus, the above expression means that a greater one of the air flow rates in the idle state and the dashpot operation, respectively, is selected as the bypass air flow rate Qb. Further, in the step S21, termination of the dashpot operation is decided when the condition mentioned below is satisfied.

$$Qd < Qi$$

When termination of the dashpot operation is determined in the decision step S21 (i.e., when the answer of the step S21 is "YES"), the processing proceeds to the steps S102 et seq. If otherwise (i.e., when the answer of the step S21 is "NO"), the processing routine shown in FIG. 13 comes to an end.

By virtue of the arrangement described above, the bypass air flow rate Qb is positively prevented from being changed during execution of the fault detecting operation for the exhaust gas recirculation control system. Thus, the intake manifold pressure Pb can be protected against error which is ascribable to variation in the bypass air flow rate Qb.

At this juncture, it should be mentioned that although deceleration state is adopted as the condition for enabling the fault detection processing in the fourth to sixth embodiments, same or equivalent effects as intended can be achieved even when the stable state is selected as the fault decision enabling condition.

Embodiment 7

In the embodiments described above, no consideration is paid to the engine load. However, the engine load should preferably be added as a quantity for correction or compensation in order to prevent the intake manifold pressure Pb from suffering error due to variation taking place in the engine load during the fault detection processing.

According to the invention incarnated in the seventh embodiment, it is proposed to prohibit the fault detection processing in response to a change in the engine load. This embodiment will be described by reference to a flow chart of FIG. 14 together with FIG. 1, FIG. 21 and FIG. 22.

In this case, the operation state information U inputted to the fault decision means 304 contains information concerning the engine load. Further, the compensation means 305 includes an engine load change detecting means for detecting change in the engine load for thereby prohibiting satisfaction of the fault decision enabling condition upon detection of a change in the engine load.

Now, the fault detecting operation of the instant embodiment of the invention will be described by reference to a flow chart of FIG. 14.

Figure 14:
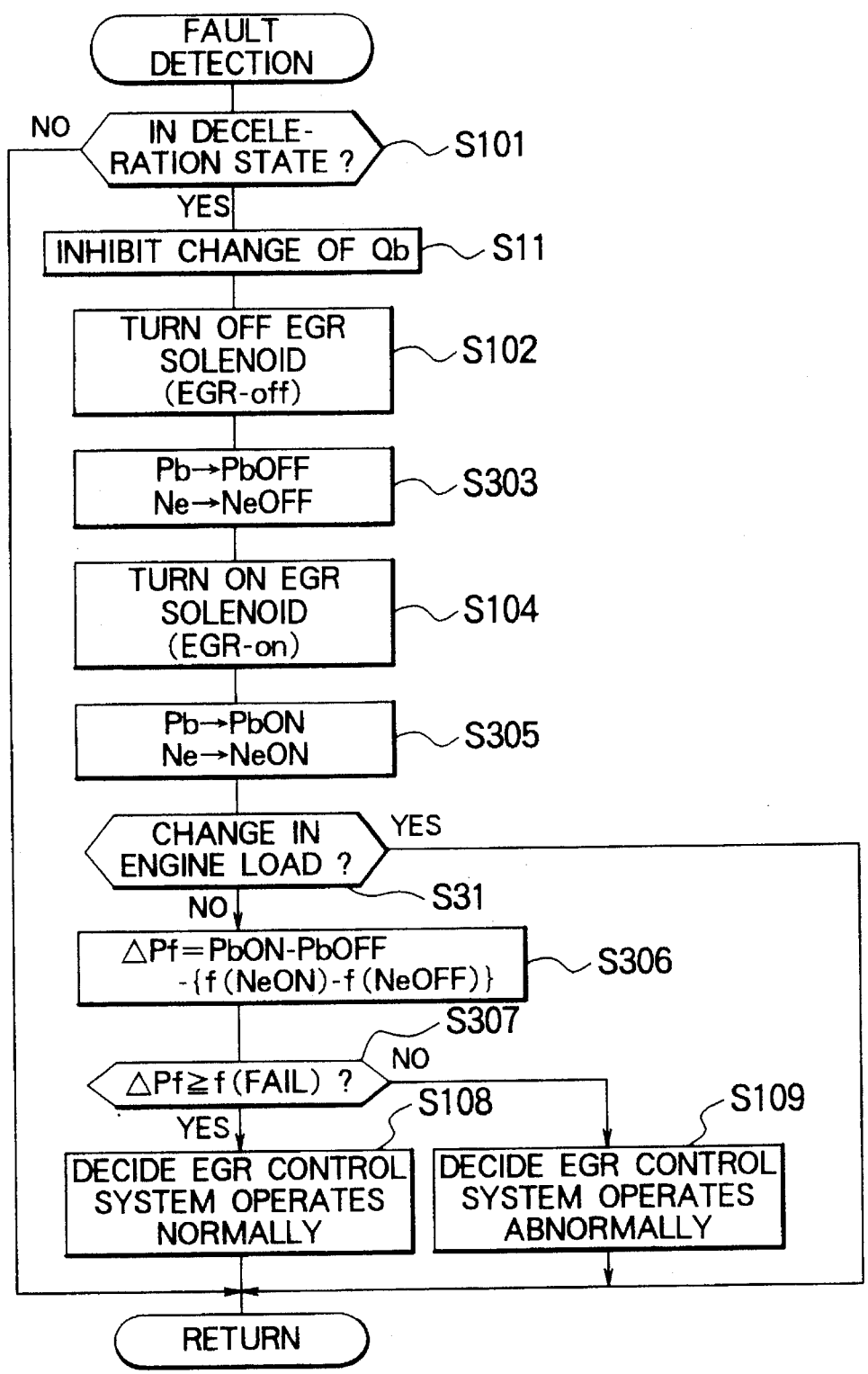
FIG. 14 is a flow chart illustrating a fault detection processing for an exhaust gas recirculation control system as executed by a fault detecting apparatus according to a seventh embodiment of the invention.

The processing flow illustrated in FIG. 14 essentially corresponds to that shown in FIG. 11 (referred to in the description of the fourth embodiment) except that a step S31 is additionally inserted between the steps S305 and S306.

Referring to FIG. 14, after storage of the aforementioned various quantities detected in the EGR-on and EGR-off states in the manner described previously, it is decided in the step S31 whether any change has occurred in the engine load during the detection processing. The change of the engine load may be detected on the basis of, for example, the air-conditioner power-on signal delivered from the air-conditioner on/off switch 19.

When it is decided in the step S31 that no change has occurred in the engine load (i.e., when the decision step S31 results in negation "NO"), the processing proceeds to the steps S306 et seq. On the other hand, when the answer of the decision step S306 is affirmative "YES", the fault detection processing shown in FIG. 13 comes to an end. Since the processing steps S306 et seq. are substantially same as those described hereinbefore, repeated description thereof will be unnecessary.

The engine load change detection processing may be carried out by a corresponding interruption routine activated periodically at a predetermined time interval for sampling the engine load state to thereby detect the change in the engine load on the basis of the load states as sampled. Since such engine load change detection processing itself can readily occur to those skilled in the art, description in concrete will be unnecessary.

As is apparent from the above description, by virtue of the arrangement that the fault detection processing is terminated immediately upon detection of change in the engine load during execution of the fault detection processing for the exhaust gas recirculation system, erroneous fault detection ascribable to variation in the engine load can be prevented because the influence thereof to the intake manifold pressure Pb can be excluded from the fault detection processing.

Embodiment 8

In the case of the seventh embodiment described above, the fault detection for the exhaust gas recirculation system is inhibited in response to a change in the engine load. However, such an arrangement may equally be adopted in which influence of variation in the engine load to the intake manifold pressure Pb is compensated for in dependence on the engine load change.

The eighth embodiment of the invention is directed to the compensation for the influence of the change in the engine load (such as brought about by power-on of the air conditioner) to the intake manifold pressure Pb. This embodiment will be described by reference to a flow chart of FIG. 15 together with FIG. 1, FIG. 21 and FIG. 22.

Also in this case, the condition for enabling the fault decision is that the engine is in the deceleration state. The operation state information U inputted to the fault decision means 304 (see FIG. 1) contains the air-conditioner power-on signal A. Further, the fault decision means 304 makes decision concerning occurrence of fault in the exhaust gas recirculation control means by comparing a value based on the intake manifold pressures Pb detected upon enforcive opening/closing of the EGR control valve 11 with the fault decision reference value FAIL.

Furthermore, the compensation means 305 is adapted to correct at least either one of the fault decision reference value referenced by the fault decision means 304 or the intake manifold pressures Pb detected upon enforcive opening/closing of the EGR control valve 11 by taking into account the engine loads detected concurrently.

Now, by reference to the flow chart of FIG. 15, description will be made of the fault detecting operation according to the instant embodiment. Incidentally, the flow chart of FIG. 15 substantially corresponds to that of FIG. 11 or 12. More specifically, steps S101, S11, S102, S104, S307, S108 and S109 shown in FIG. 15 correspond to those described hereinbefore, while steps S303C, S305C and S306C correspond to the steps S303, S305 and S306 in the processing flow shown in FIG. 11, respectively.

In the steps S303C and S305C, the engine load state is detected in addition to the intake manifold pressure Pb and the engine rotation number Ne, while in the step S306C, the detected value of the engine load state is employed as a correcting quantity in addition to the engine rotation number Ne.

Figure 15:
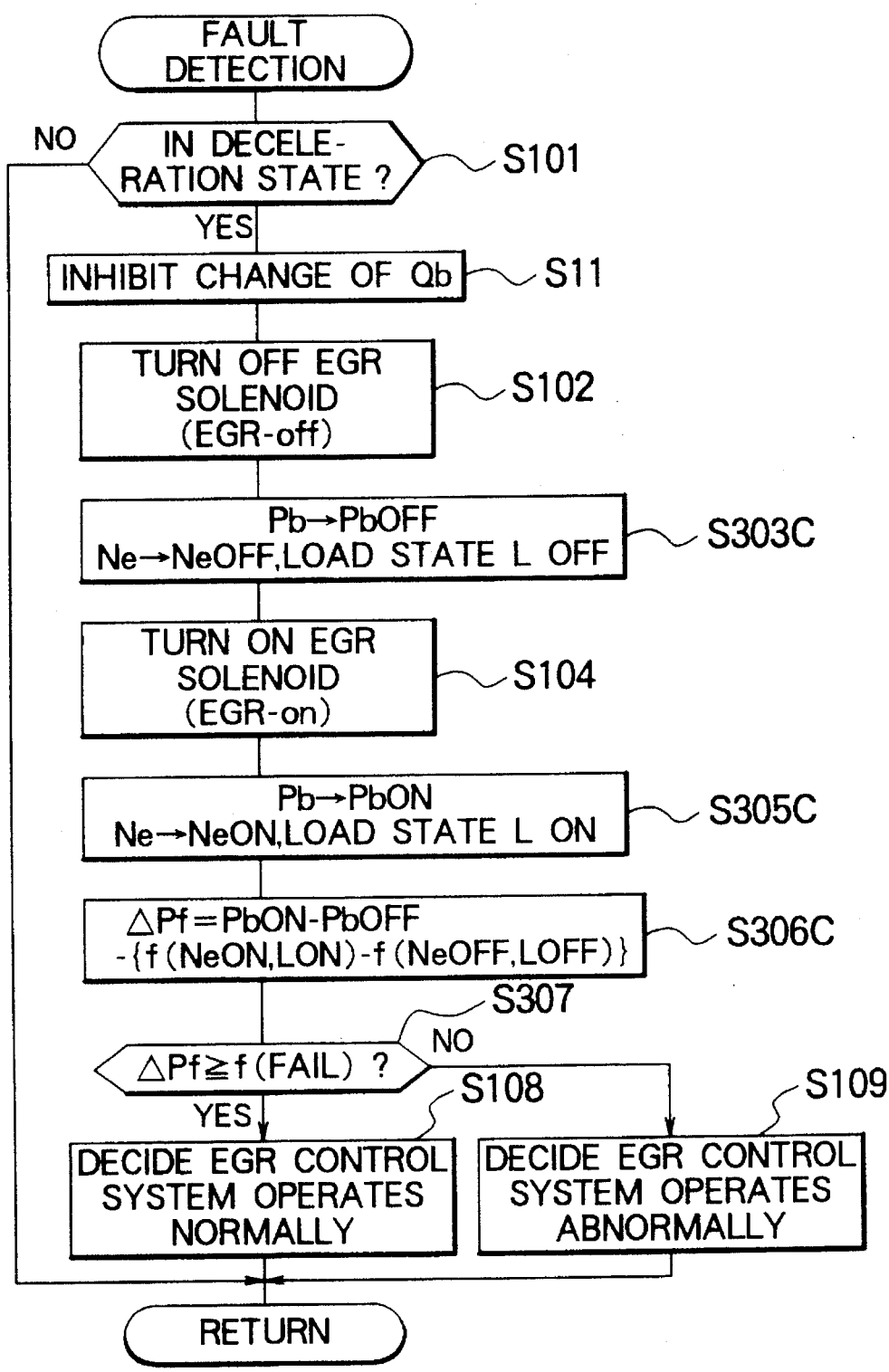
FIG. 15 is a flow chart illustrating a fault detection processing for an exhaust gas recirculation control system as executed by a fault detecting apparatus according to an eighth embodiment of the invention.

Referring to FIG. 15, when it is decided in the step S101 that the internal combustion engine is being decelerated, the bypass air flow control is inhibited in the step S11, which is then followed by the step S102 where the exhaust gas recirculation is stopped. Thereafter, in the step S303C, an EGR-off engine load state LOFF is detected together with the EGR-off intake manifold pressure value PbOFF and the EGR-off engine rotation number NeOFF to be stored in a memory (not shown).

Further, after the exhaust gas recirculation is regained in the step S104, the EGR-on intake manifold pressure value PbON, the EGR-on engine rotation number NeON and an engine load state LON are detected and stored in the step S305C.

Subsequently, in the step S306C, the pressure difference $\Delta P$ of the intake manifold pressure Pb is corrected in accordance with functions f determined previously in consideration of the load states L and the engine rotation numbers Ne detected concurrently with the intake manifold pressures Pb. Namely, the pressure difference $\Delta P$ is corrected in accordance with the following expression (9):

$$\Delta Pf = \Delta P - \{f(NeON, LON) - f(NeOFF, LOFF)\} \qquad (9)$$

Subsequently, decision as to occurrence of abnormality in the exhaust gas recirculation system is effected through the steps S307, S108 and S109.

In this manner, owing to the processing described above, the intake manifold pressure Pb and the pressure difference $\Delta P$ thereof can be protected against error brought about by variation of the engine load.

In this case, it is sufficient for the compensation means 305 to correct at least either one of the fault decision reference value FAIL or the value based on the intake manifold pressure values Pb. Further, although it has been described that the quantities as detected are once stored, they can be corrected immediately upon detection thereof.

Embodiment 9

In the case of the eighth embodiment described above, the value (i.e., the pressure difference $\Delta P$) derived from the intake manifold pressure Pb is corrected as a function of change in the engine load detected in the course of execution of the fault detection processing. However, activation of the engine load may be inhibited during a period in which the fault detection processing is being executed, substantially to the same effect.

Thus, according to a ninth embodiment of the invention, it is taught to inhibit the activation of the engine load during a period in which the fault detection processing is being executed for the exhaust gas recirculation control system. This embodiment will be described by referring to a flow chart of FIG. 16 in combination with FIG. 1, FIG. 21 and FIG. 22.

It is assumed that the engine load is an air conditioner and that the electronic control unit 22 includes an air-conditioner (engine load) driving means for driving and controlling the air conditioner. More specifically, the air-conditioner driving means responds to the air-conditioner power-on signal A for generating an air-conditioner driving signal D in dependence on the engine operation state to drive the air conditioner.

Further, the compensation means 305 includes an engine load drive inhibit means for inhibiting activation or operation of the air conditioner so long as the fault decision enabling condition mentioned hereinbefore is satisfied. In other words, the compensation means 305 incorporated in the electronic control unit 22 is associated with the air conditioner driving means.

Figure 16:
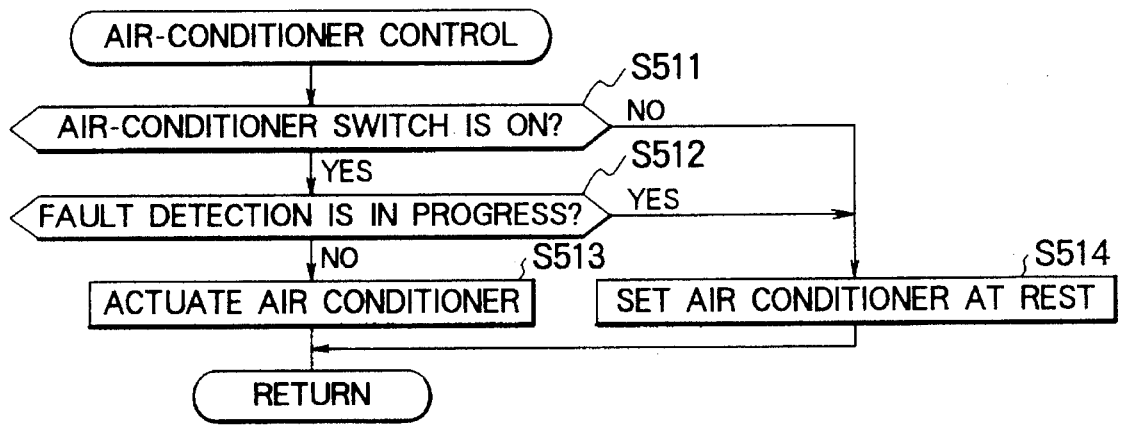
FIG. 16 is a flow chart for illustrating an air conditioner control operation process executed according to a ninth embodiment of the invention.

Now, referring to a flow chart of FIG. 16, description will turn to the air conditioner control operation according to the ninth embodiment of the invention on the presumption that the engine load is prevented from changing during the fault detecting operation for the exhaust gas recirculation system. To say in another way, in the system in which the air conditioner (typifying the engine load) is controlled by the electronic control unit 22 via the air-conditioner controller 19A and others, as shown in FIG. 11, operation of the air conditioner is prohibited during the fault detecting operation.

At first, in a step S511, it is decided whether or not the air-conditioner on/off switch 19 is closed. When the air-conditioner on/off switch 19 is opened (i.e., when this step S511 results in negation "NO"), the processing proceeds to a step S514, whereupon the processing is terminated (RETURN) because the air conditioner is not operated.

On the contrary, if it is decided in the step S511 that the air-conditioner on/off switch 19 is closed (i.e., if the answer of the step S511 is "YES"), decision is then made in a step S512 as to whether or not the fault detecting processing such as the fault detecting routine shown in FIG. 11 is being executed. When this decision step S512 results in affirmation "YES", the processing proceeds to a step S514 where operation of the air conditioner is stopped. The processing then comes to an end.

By contrast, when it is decided in the step S512 that the fault detecting operation is not being carried out (i.e., when the decision step S512 results in "NO"), the air conditioner is put into operation in a step S513.

Through the processing procedures described above, the air conditioner is prevented from activation even when the air-conditioner power-on signal A is generated by the air-conditioner on/off switch 19 so long as the fault detecting operation for the exhaust gas recirculation system is being performed.

Embodiment 10

In the various embodiments described so far, no consideration is paid to the influence of variation or fluctuation in the atmospheric pressure Pa to the intake manifold pressure Pb. However, since the intake manifold pressure Pb is affected by the atmospheric pressure Pa, the influence of the latter should be taken into account in order to enhance further the accuracy and reliability of the fault detecting operation for the exhaust gas recirculation system.

A tenth embodiment of the invention is thus concerned with measures for the compensation of the influence of the atmospheric pressure Pa to the intake manifold pressure Pb. This embodiment will be described by reference to flow charts shown in FIG. 17 and FIG. 18 together with FIG. 1, FIG. 21 and FIG. 22.

In this case, the operation state information U inputted to the fault decision means 304 contains information concerning the atmospheric pressure Pa. Further, the fault decision means 304 is adapted to compare a value ($\Delta P$) derived from the intake manifold pressures Pb detected upon enforcive opening/closing of the EGR control valve 11 with the fault decision reference value FAIL to decide thereby whether or not the EGR control means suffers from abnormality or fault.

Further, the compensation means 305 is so designed as to correct at least either the fault decision reference value referenced by the fault decision means 304 for the comparison as described hereinbefore or the value derived from the intake manifold pressures Pb detected when the EGR control valve 11 is forcibly opened and closed.

Next, operation for detecting the atmospheric pressure Pa will be explained by reference to a flow chart of FIG. 7. In general, the atmospheric pressure Pa may be detected by means of an atmospheric pressure sensor provided separately from the pressure sensor 6. However, in that case, provision of the atmospheric pressure sensor involves expensiveness. Thus, according to the invention incarnated in the instant embodiment, the atmospheric pressure Pa is detected by using the pressure sensor 6 inherently provided for detecting the intake manifold pressure Pb and by resorting to an atmospheric detection processing routine illustrated in FIG. 17.

At first, in a step S701, information concerning the engine rotation number Ne (rpm) is referenced to decide whether the internal combustion engine is stopped or not. Unless the engine is stopped (i.e., when the decision step S701 results in "NO"), the processing proceeds to a step S703 (which will be described hereinafter). If otherwise (i.e., when the answer of the step S701 is "YES"), the processing proceeds to a step S702 where the intake manifold pressure Pb is detected to be stored as the atmospheric pressure Pa because in the stationary state of the engine, the intake manifold pressure Pb can be regarded as indicating the atmospheric pressure Pa.

In the step S703 mentioned above, information of the throttle opening degree $\theta$ is fetched to decide whether or not the throttle valve 7 is in the fully opened state. Unless the throttle valve 7 is fully opened (i.e., when the answer of the decision step S703 is "NO"), the processing routine shown in FIG. 17 comes to an end.

By contrast, when it is found in the step S703 that the throttle valve 7 is in the fully opened state (i.e., when the answer of this step is "YES"), then the intake manifold pressure Pb is fetched as a detected intake manifold pressure Pbwot. On the basis of this detected pressure Pbwot, the atmospheric pressure Pa is arithmetically determined in accordance with the following expression (10) to be stored in a memory (not shown). Namely, $$Pa=Pbwot+Ps \qquad (10)$$

where Ps represents a pressure loss in an intake air passage within the intake pipe 3. Thus, the above expression (10) shows that a value obtained by adding the pressure loss Ps to the detected intake manifold pressure Pbwot represents the atmospheric pressure Pa. Thus, the pressure value determined in accordance with the above expression (10) is stored as the atmospheric pressure Pa.

Figure 18:
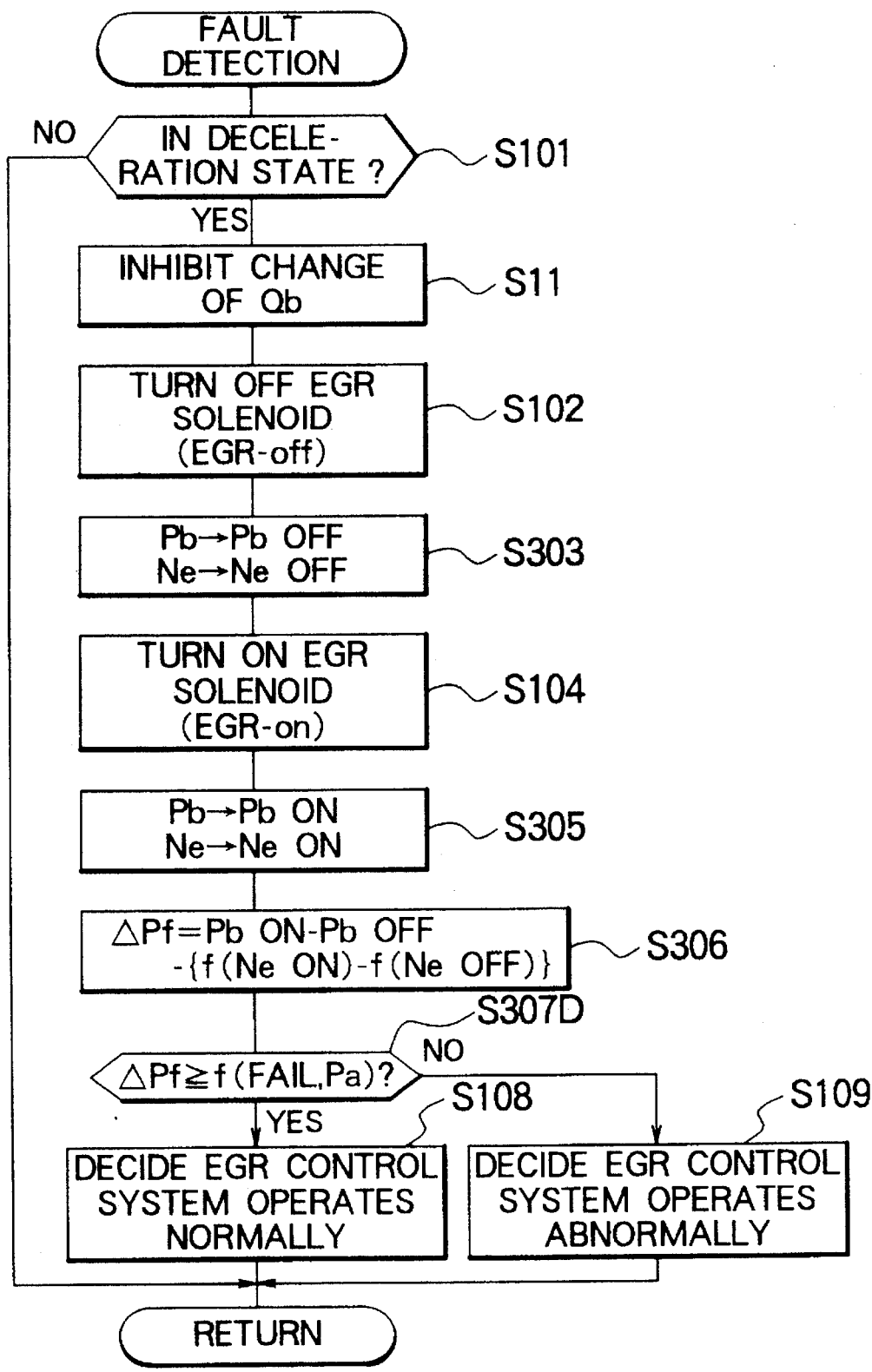
FIG. 18 is a flow chart for illustrating a fault detection processing for an exhaust gas recirculation control system executed by a fault detecting apparatus according to the tenth embodiment of the invention.

Now, the fault detecting operation for the exhaust gas recirculation system according to the tenth embodiment of the invention will be described by reference to a flow chart of FIG. 18 which corresponds to that of FIG. 11. To be more concrete, steps S101, S11, S102, S303, S104, S305, S306, S108 and S109 shown in FIG. 18 are essentially same as or equivalent to those denoted by like characters in FIG. 11. Accordingly, repeated description of these steps is omitted. Further, it is to be noted that a step S307D shown in FIG. 18 corresponds to the step S307.

In the step S307D, however, the atmospheric pressure is additionally used as a correcting quantity for the fault decision reference value. Namely, the latter is determined as a function f of the engine rotation number (rpm) Ne and the atmospheric pressure Pa. In other words, the corrected intake manifold pressure difference $\Delta Pf$ obtained from the step S306 is compared with a fault decision reference value f(FAIL, Pa) to determine whether the condition mentioned below is satisfied or not. Namely, ΔPf≧f(FAIL, Pa)

Figure 17:
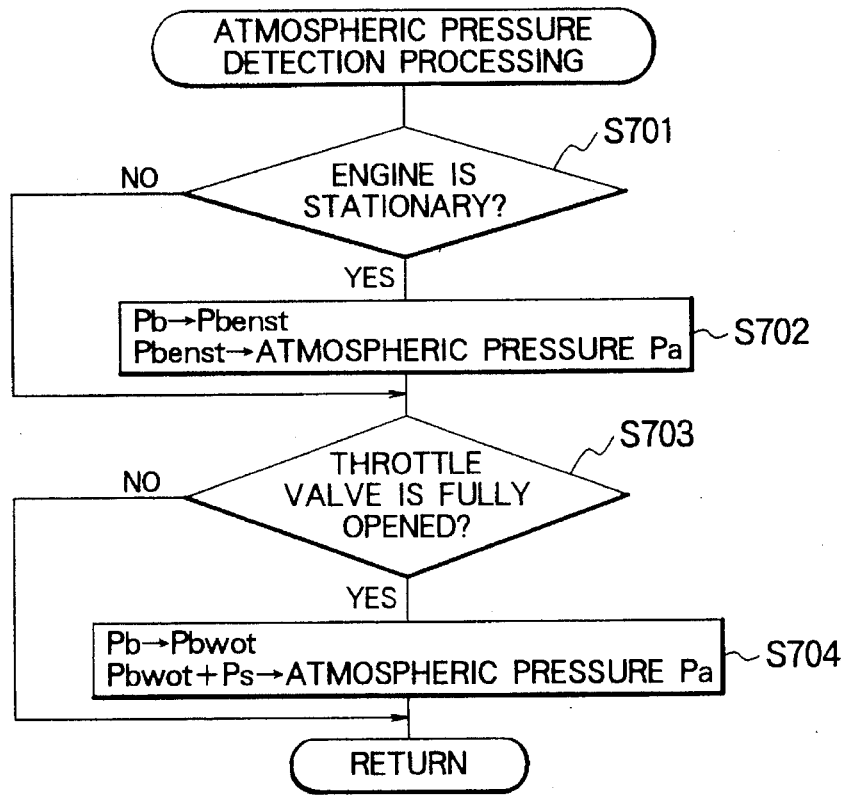
FIG. 17 is a flow chart for illustrating an atmospheric pressure detection processing according to a tenth embodiment of the invention.

In this manner, the fault detection for the exhaust gas recirculation system can be realized with high accuracy independent of variations in the atmospheric pressure Pa, because the fault decision reference value is corrected in consideration of the atmospheric pressure Pa detected through the processing routine shown in FIG. 17. Thus, the possibility of erroneous fault detection due to variations in the atmospheric pressure Pa can positively be suppressed.

Although it has been assumed in the above description that only the fault decision reference value FAIL is corrected as the function of the atmospheric pressure Pa, it should be appreciated that the compensation means 305 may correct at least either the value (ΔP) derived from the intake manifold pressure Pb or the fault decision reference value FAIL. Further, as the condition for the fault decision, it is presumed that the internal combustion engine is being decelerated. It goes however without saying that the stable state may equally be adopted as the fault decision enabling condition, substantially to the same effect.

Embodiment 11

In the foregoing description of the various embodiments of the invention, the pressure difference ΔP is adopted as the value or quantity derived from the intake manifold pressure Pb. However, instead of the intake manifold pressure difference ΔP, there may be adopted an EGR-ratio equivalent value which can also be derived form the intake manifold pressure Pb. In that case, the fault decision for the exhaust gas recirculation system can further be improved in respect to the accuracy and the reliability, whereby erroneous fault detection due to variations in the atmospheric pressure Pa, the bypass air flow rate Qb or the engine load can be suppressed more positively.

According to an eleventh embodiment of the invention, the fault detecting operation for the exhaust gas recirculation system is carried out by using the EGR-ratio equivalent value. This embodiment will be described by reference to a characteristic diagram of FIG. 19 and a flow chart of FIG. 20 together with FIG. 1, FIG. 21 and FIG. 22.

In the case of the instant embodiment, the compensation means 305 includes an EGR-ratio equivalent value calculating means for calculating the EGR-ratio equivalent value PEGR corresponding to the EGR flow rate on the basis of the intake manifold pressures Pb detected upon enforcive opening/closing of the EGR control valve 11. Further, the fault decision means 304 makes decision as to occurrence of abnormality in the EGR control means on the basis of the EGR-ratio equivalent value PEGR.

Figure 19:
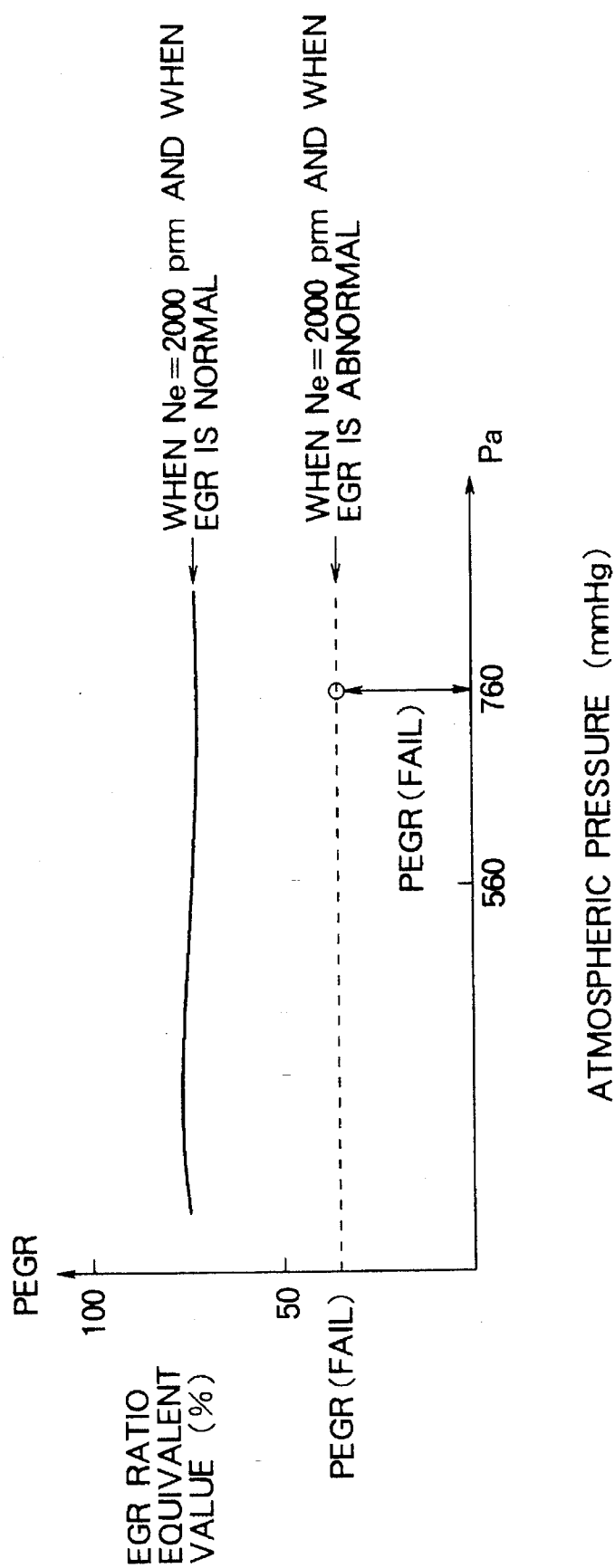
FIG. 19 is a characteristic diagram showing a relation between the atmospheric pressure and an EGR-ratio equivalent value for illustrating the concept underlying an eleventh embodiment of the invention.
Figure 30:
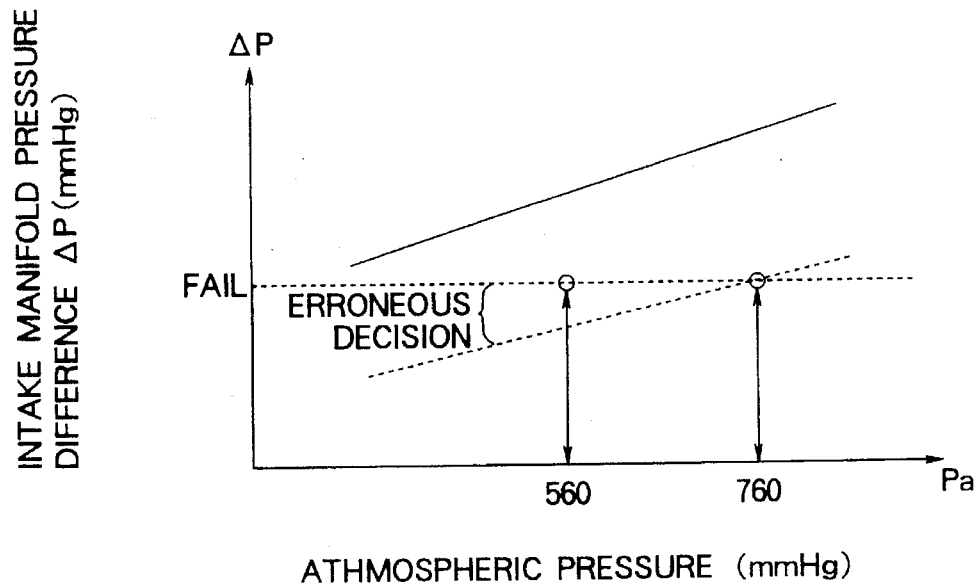
FIG. 30 is a characteristic diagram for illustrating a relation between the atmospheric pressure and an intake manifold pressure difference or deviation as measured.

FIG. 19 is a characteristic diagram showing a relation between the atmospheric pressure and the EGR-ratio equivalent value PEGR determined on the basis of the relation illustrated in FIG. 30. In FIG. 19, a solid-line curve represents the Pa-versus-PEGR characteristic on the conditions that the engine rotation number Ne is constant at 2000 rpm and that the exhaust gas recirculation control system is normal, while a broken-line curve represents the same when the engine rotation number Ne is 2000 rpm (constantly) and when the exhaust gas recirculation system suffers abnormality.

As can be seen from FIG. 19, the EGR-ratio equivalent value PEGR indicated by the solid-line curve is constant so long as the engine rotation number Ne remains constant. Thus, even when a PEGR fault decision reference value PEGR(FAIL) is at a fixed value independent of the atmospheric pressure Pa, erroneous fault detection for the exhaust gas recirculation system can be avoided.

Figure 20:
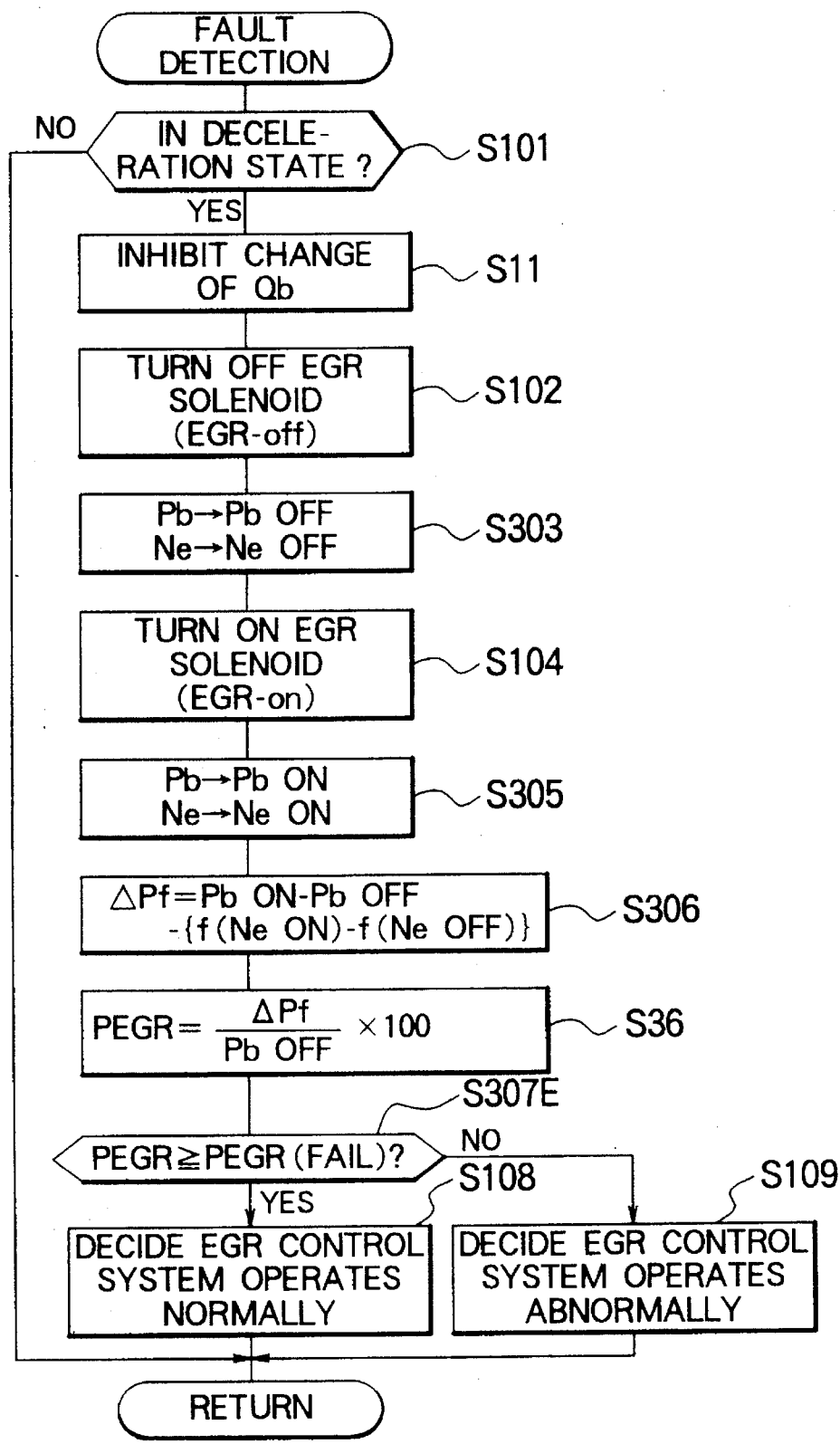
FIG. 20 is a flow chart for illustrating a fault detection processing for an exhaust gas recirculation control system executed by a fault detecting apparatus according to the eleventh embodiment.

Next, fault detecting operation for the exhaust gas recirculation system according to the instant embodiment will be described by reference to the flow chart of FIG. 20, which corresponds to FIG. 11. More specifically, steps S101, S11, S102,S303, S104, S305, S306, S108 and S109 shown in FIG. 20 are essentially same as those designated by like reference characters in FIG. 11. Accordingly, repeated description of these steps will be unnecessary. Further, a step S307E of FIG. 20 corresponds to the step S307 shown in FIG. 11.

According to the teachings of the invention incarnated in the instant embodiment, a step S36 for calculating the EGR-ratio equivalent value PEGR is additionally provided in succession to the step S306 of determining the corrected intake manifold pressure difference ΔPf.

In the step S307E, the EGR-ratio equivalent value PEGR is compared with the PEGR fault decision reference value PEGR(FAIL) which is determined as a function of the engine rotation number Ne.

To be more concrete, in the step S36, the EGR-ratio equivalent value PEGR is calculated on the basis of the corrected intake manifold pressure difference ΔPf determined in the step S306 and the EGR-off intake manifold pressure value PbOFF in accordance with the following expression (11):

$$PEGR=(\Delta Pf/PbOFF)\times 100\ [\%] \qquad (11)$$

Since the EGR-ratio equivalent value PEGR as determined is standardized by the EGR-off intake manifold pressure value PbOFF, dispersion of the intake manifold pressure Pb can sufficiently be suppressed, whereby the accuracy of the fault detection can correspondingly be enhanced.

In this manner, by using the EGR-ratio equivalent value PEGR in the fault depiction processing, the fault detection can be realized with high accuracy regardless of variations in the atmospheric pressure Pa. Similarly, the fault detection can be realized with high accuracy without being affected by variations in the bypass air flow rate Qb and the engine load.

In FIG. 20, the other processing steps are essentially same as those described hereinbefore by reference to FIG. 11.

The fault detecting operation described above can positively suppress erroneous fault detection ascribable to variation or change in the atmospheric pressure Pa, the bypass air flow rate Qb or the engine load.

Embodiment 12

In the embodiments described so far, no consideration is paid to pulsation of the engine operation. It is however desirable to suppress error of the intake manifold pressure Pb brought about under the influence of pulsation of the engine operation by performing a filter processing on the intake manifold pressures Pb sampled a number of times.

A twelfth embodiment of the invention is directed to the fault detection processing procedure in which a filter processing is adopted for suppressing erroneous detection of the intake manifold pressure Pb due to pulsation of the engine operation. This embodiment will be described by reference to FIG. 1, FIG. 21 and FIG. 22.

In the case of the instant embodiment, the compensation means 305 includes an intake manifold pressure detection timing calculating means for arithmetically determining the timing at which the intake manifold pressure Pb is to be detected upon enforcive opening/closing of the EGR control valve 11 and a filter processing means for effecting a filter or smoothing processing on the intake manifold pressure Pb in conformance with the detection timing mentioned above. On the other hand, the fault decision means 304 is adapted to determine the possibility of occurrence of abnormality in the exhaust gas recirculation control system on the basis of a filtered intake manifold pressure PbF resulting from the filter processing.

Now, description will turn to the filtering operation according to the instant embodiment of the invention.

At a time point at which the predetermined condition for the fault decision is satisfied and which precedes to the detection of the intake manifold pressure Pb, e.g. at a time point when the fault detection processing is started (i.e., a predetermined time point immediately before the exhaust gas recirculation is forcibly validated or invalidated), the filter processing is executed for canceling out pulsation of the engine operation upon every detection of the intake manifold pressure Pb for the engine control in accordance with the following expression (12):

$$PbF(n)=PbF(n-1) \times K + Pb(n) \times (1-K) \qquad (12)$$

where PbF(n) represents a current intake manifold pressure value undergone the filter processing, PbF(n−1) represents a preceding intake manifold pressure value undergone the filter processing, Pb(n) represents a currently detected value of the intake manifold pressure Pb, and K represents a filter constant of a given value selected from a range of zero to one. At this juncture, it is to be mentioned that the filter processing expression (12) is widely known in the art.

When the predetermined condition is satisfied, the processing is executed, which can be given by the following expression (13):

$$PbF(n)=Pb(n) \qquad (13)$$

Thus, by using as the current intake manifold pressure value Pb(n) the currently calculated intake manifold pressure value PbF(n) obtained from the filter processing performed at the time point when the predetermined fault decision enabling condition is satisfied, the intake manifold pressure Pb(n) substantially free from error can be employed in the fault detection processing.

Through the processing procedure described above, dispersion of the intake manifold pressure Pb due to the pulsation of the engine operation can be suppressed, whereby reliability of the fault detection for the exhaust gas recirculation control system can further be enhanced.

In this conjunction, it should be mentioned that the filter processing mentioned above may be replaced by a moving average (or running mean) processing, substantially to the same effect.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the various embodiments of the invention have been described discretely from one another, it should be understood that this is only for convenience of description and that the first to third embodiments and the tenth to twelfth embodiments may be combined with one another in appropriate manner in practical applications. Further, any one of the fourth to sixth embodiments may be combined with a given one of the seventh to ninth embodiments. By combining, for example, the engine rotation number Ne with the bypass air flow rate Qb or the atmospheric pressure Pa to compensate for the error in the intake manifold pressure Pb as detected, the accuracy of the fault detection can further be increased owing to what is called the synergetic effect.

Thus, all suitable modifications and equivalents may be resorted to, falling within the spirit and scope of the invention.

What is claimed is:

1. A fault detecting apparatus for an exhaust gas recirculation control system of an internal combustion engine, comprising:

an intake pipe for supplying air to said internal combustion engine;

a throttle valve disposed in said intake pipe to be selectively opened and closed for regulating a flow of the air supplied to said internal combustion engine through said intake pipe;

an exhaust gas recirculation pipe for introducing an exhaust gas of said internal combustion engine to said intake pipe at a location downstream of said throttle valve for recirculating the exhaust gas through said internal combustion engine;

an exhaust gas recirculation valve disposed in said exhaust gas recirculation pipe for regulating a recirculation flow rate of the exhaust gas flowing through said exhaust gas recirculation pipe;

sensor means for detecting operation state of said internal combustion engine, inclusive of an intake pressure, to thereby output engine operation state information;

exhaust gas recirculation valve control means for controlling said exhaust gas recirculation valve in dependence on said operation state information supplied from said sensor means;

fault decision enabling condition detecting means for detecting satisfaction of a decision enabling condition for enabling a decision concerning occurrence of a fault in an exhaust gas recirculation control means inclusive of said exhaust gas recirculation valve control means on the basis of said operation state information;

enforcive valve opening/closing means for forcibly opening and/or closing said exhaust gas recirculation valve during a period in which said fault decision enabling condition is satisfied; and fault decision means for comparing a value derived from the intake pressures detected upon enforcive opening/closing of said exhaust gas recirculation valve with a fault decision reference value to thereby decide whether any fault occurs in said exhaust gas recirculation control means;

wherein said fault decision means includes compensation means for suppressing influence of a parameter which affects said intake pressures detected upon said enforcive opening/closing of said exhaust gas recirculation valve.

2. A fault detecting apparatus for an exhaust gas recirculation control system according to claim 1, wherein said operation state information contains at least information concerning a rotation number of said internal combustion engine and information indicating that said throttle valve is in a fully-closed state;

wherein said fault decision enabling condition detecting means detects as said fault decision enabling condition a deceleration state of said internal combustion engine on the basis of at least said information of the engine rotation number and said information indicating the fully-closed state of said throttle valve; and wherein said compensation means corrects at least one of said fault decision reference value referenced by said fault decision means upon said comparison and said value derived from the intake pressures detected upon enforcive opening/closing of said exhaust gas recirculation valve by making use of the engine rotation number detected substantially concurrently with detection of said intake pressure.

3. A fault detecting apparatus for an exhaust gas recirculation control system according to claim 2, further comprising:

bypass air flow rate control means for controlling rate of intake air flow which bypasses said throttle valve;

wherein said compensation means includes bypass air flow rate change inhibit means for inhibiting change of said bypass air flow rate during a period in which said fault decision enabling condition is satisfied.

4. A fault detecting apparatus for an exhaust gas recirculation control system according to claim 2, further comprising:

bypass air flow rate control means for controlling rate of intake air flow which bypasses said throttle valve;

wherein said compensation means corrects at least one of said fault decision reference value referenced by said fault decision means upon said comparison and the value derived from the intake pressures detected upon said enforcive opening/closing of said exhaust gas recirculation valve by making use of the information of said bypass air flow rate detected substantially concurrently with detection of said intake pressure.

5. A fault detecting apparatus for an exhaust gas recirculation control system according to claim 2, further comprising:

bypass air flow rate control means for controlling rate of intake air flow which bypasses said throttle valve;

wherein said compensation means includes bypass air flow rate change termination decision means for deciding whether or not change of said bypass air flow rate is terminated; and wherein said enforcive valve opening/closing means and said fault decision means are validated when said fault decision enabling condition is satisfied and when no change takes place in said bypass air flow rate.

6. A fault detecting apparatus for an exhaust gas recirculation control system according to claim 2, wherein said engine operation state information contains at least information concerning an engine load of said internal combustion engine;

wherein said compensation means includes engine load change detecting means for detecting a change of said engine load; and wherein upon detection of a change in said engine load, said fault decision enabling condition is invalidated from satisfaction.

7. A fault detecting apparatus for an exhaust gas recirculation control system according to claim 2, wherein said engine operation state information contains at least information concerning an engine load of said internal combustion engine; and wherein said compensation means corrects at least one of said fault decision reference value referenced by said fault decision means upon said comparison and said value derived from the intake pressures detected upon enforcive opening/closing of said exhaust gas recirculation valve by making use of the engine load detected substantially concurrently with detection of said intake pressure.

8. A fault detecting apparatus for an exhaust gas recirculation control system according to claim 2, further comprising:

an engine load installed in association with said internal combustion engine to be driven thereby; and engine load driving means for driving said engine load in response to a power-on command for said engine load;

wherein said compensation means includes engine load inhibit means for inhibiting said engine load from being driven so long as said fault decision enabling condition is satisfied.

9. A fault detecting apparatus for an exhaust gas recirculation control system according to claim 2, wherein said operation state information contains at least information concerning atmospheric pressure;

wherein said fault decision means makes decision as to occurrence of a fault in said exhaust gas recirculation control means by comparing the value derived from the intake pressure detected upon enforcive opening/closing of said exhaust gas recirculation valve with a fault decision reference value; and wherein said compensation means corrects at least one of said fault decision reference value referenced by said fault decision means upon said comparison and said value derived from the intake pressures detected upon enforcive opening/closing of said exhaust gas recirculation valve by making use of said atmospheric pressure information.

10. A fault detecting apparatus for an exhaust gas recirculation control system according to claim 2, wherein said compensation means includes exhaust gas recirculation ratio equivalent value calculating means for calculating a value equivalent to an exhaust gas recirculation ratio corresponding to the exhaust gas recirculation flow rate on the basis of intake pressures detected upon enforcive opening/closing of said exhaust gas recirculation valve; and wherein said fault decision means makes decision as to occurrence of a fault in said exhaust gas recirculation control means on the basis of said exhaust gas recirculation ratio equivalent value.

11. A fault detecting apparatus for an exhaust gas recirculation control system according to claim 2, wherein said compensation means includes:

intake pressure detection timing calculating means for calculating a timing for detecting the intake pressures upon enforcive opening/closing of said exhaust gas recirculation valve; and filter processing means for filtering information signal of said intake pressures as detected upon enforcive opening/closing of said exhaust gas recirculation valve in conformance with said timing; and wherein said fault decision means makes decision as to occurrence of a fault in said exhaust gas recirculation control means on the basis of the intake pressure undergone said filter processing.

12. A fault detecting apparatus for an exhaust gas recirculation control system according to claim 1, wherein said operation state information contains at least information concerning an engine rotation number and a throttle opening degree of said throttle valve;

wherein said fault decision enabling condition detecting means detects as said fault decision enabling condition a stable state of said internal combustion engine on the basis of at least said engine rotation number; and wherein said compensation means corrects at least one of said fault decision reference value referenced by said fault decision means upon said comparison and the value derived from the intake pressures detected upon said enforcive opening/closing of said exhaust gas recirculation valve by making use of the information of said throttle opening degree detected substantially concurrently with detection of said intake pressure.

13. A fault detecting apparatus for an exhaust gas recirculation control system according to claim 12, wherein said compensation means includes an analogue-to-digital converter for converting the information of said throttle opening degree into a digital signal; and wherein at least one of said fault decision reference value and the value derived from said intake pressure is corrected in dependence on a minimum resolution (quantization) of said analogue-to-digital converter.

14. A fault detecting apparatus for an exhaust gas recirculation control system according to claim 12, further comprising:

bypass air flow rate control means for controlling rate of intake air flow which bypasses said throttle valve;

wherein said compensation means includes bypass air flow rate change inhibit means for inhibiting change of said bypass air flow rate during a period in which said fault decision enabling condition is satisfied.

15. A fault detecting apparatus for an exhaust gas recirculation control system according to claim 14, wherein said compensation means includes an analogue-to-digital converter for converting the information of said throttle opening degree into a digital signal; and wherein at least one of said fault decision reference value and the value derived from said intake pressure is corrected in dependence on a minimum resolution of said analogue-to-digital converter.

16. A fault detecting apparatus for an exhaust gas recirculation control system according to claim 12, further comprising:

bypass air flow rate control means for controlling rate of intake air flow which bypasses said throttle valve;

wherein said compensation means corrects at least one of said fault decision reference value referenced by said fault decision means upon said comparison and the value derived from the intake pressures detected upon said enforcive opening/closing of said exhaust gas recirculation valve by making use of the information of said bypass air flow rate detected substantially concurrently with detection of said intake pressure.

17. A fault detecting apparatus for an exhaust gas recirculation control system according to claim 16, wherein said compensation means includes an analogue-to-digital converter for converting the information of said throttle opening degree into a digital signal; and wherein at least one of said fault decision reference value and the value derived from said intake pressure is corrected in dependence on a minimum resolution of said analogue-to-digital converter.

18. A fault detecting apparatus for an exhaust gas recirculation control system according to claim 12, further comprising:

bypass air flow rate control means for controlling rate of intake air flow which bypasses said throttle valve;

wherein said compensation means includes bypass air flow rate change termination decision means for deciding whether or not change of said bypass air flow rate is terminated; and wherein said enforcive valve opening/closing means and said fault decision means are validated when said fault decision enabling condition is satisfied and when no change takes place in said bypass air flow rate.

19. A fault detecting apparatus for an exhaust gas recirculation control system according to claim 18, wherein said compensation means includes an analogue-to-digital converter for converting the information of said throttle opening degree into a digital signal; and wherein at least one of said fault decision reference value and the value derived from said intake pressure is corrected in dependence on a minimum resolution of said analogue-to-digital converter.

20. A fault detecting apparatus for an exhaust gas recirculation control system according to claim 12, wherein said engine operation state information contains at least information concerning an engine load of said internal combustion engine;

wherein said compensation means includes engine load change detecting means for detecting a change of said engine load; and wherein upon detection of a change in said engine load, said fault decision enabling condition is invalidated from satisfaction.

21. A fault detecting apparatus for an exhaust gas recirculation control system according to claim 12, wherein said engine operation state information contains at least information concerning an engine load of said internal combustion engine; and wherein said compensation means corrects at least one of said fault decision reference value referenced by said fault decision means upon said comparison and said value derived from the intake pressures detected upon enforcive opening/closing of said exhaust gas recirculation valve by making use of the engine load detected substantially concurrently with detection of said intake pressure.

22. A fault detecting apparatus for an exhaust gas recirculation control system according to claim 21, wherein said compensation means includes an analogue-to-digital converter for converting the information of said throttle opening degree into a digital signal; and wherein at least one of said fault decision reference value and the value derived from said intake pressure is corrected in dependence on a minimum resolution of said analogue-to-digital converter.

23. A fault detecting apparatus for an exhaust gas recirculation control system according to claim 12, further comprising:

an engine load installed in association with said internal combustion engine to be driven thereby; and engine load driving means for driving said engine load in response to a power-on command for said engine load;

wherein said compensation means includes engine load inhibit means for inhibiting said engine load from being driven so long as said fault decision enabling condition is satisfied.

24. A fault detecting apparatus for an exhaust gas recirculation control system according to claim 23, wherein said compensation means includes an analogue-to-digital converter for converting the information of said throttle opening degree into a digital signal; and wherein at least one of said fault decision reference value and the value derived from said intake pressure is corrected in dependence on a minimum resolution of said analogue-to-digital converter.

25. A fault detecting apparatus for an exhaust gas recirculation control system according to claim 12, wherein said operation state information contains at least information concerning atmospheric pressure;

wherein said fault decision means makes decision as to occurrence of a fault in said exhaust gas recirculation control means by comparing the value derived from the intake pressure detected upon enforcive opening/closing of said exhaust gas recirculation valve with a fault decision reference value; and wherein said compensation means corrects at least one of said fault decision reference value referenced by said fault decision means upon said comparison and said value derived from the intake pressures detected upon enforcive opening/closing of said exhaust gas recirculation valve by making use of said atmospheric pressure information.

26. A fault detecting apparatus for an exhaust gas recirculation control system according to claim 25, wherein said compensation means includes an analogue-to-digital converter for converting the information of said throttle opening degree into a digital signal; and wherein at least one of said fault decision reference value and the value derived from said intake pressure is corrected in dependence on a minimum resolution of said analogue-to-digital converter.

27. A fault detecting apparatus for an exhaust gas recirculation control system according to claim 12, wherein said compensation means includes exhaust gas recirculation ratio equivalent value calculating means for calculating a value equivalent to an exhaust gas recirculation ratio corresponding to the exhaust gas recirculation flow rate on the basis of intake pressures detected upon enforcive opening/closing of said exhaust gas recirculation valve; and wherein said fault decision means makes decision as to occurrence of a fault in said exhaust gas recirculation control means on the basis of said exhaust gas recirculation ratio equivalent value.

28. A fault detecting apparatus for an exhaust gas recirculation control system according to claim 27, wherein said compensation means includes an analogue-to-digital converter for converting the information of said throttle opening degree into a digital signal; and wherein at least one of said fault decision reference value and the value derived from said intake pressure is corrected in dependence on a minimum resolution of said analogue-to-digital converter.

29. A fault detecting apparatus for an exhaust gas recirculation control system according to claim 12, wherein said compensation means includes:

intake pressure detection timing calculating means for calculating a timing for detecting the intake pressures upon enforcive opening/closing of said exhaust gas recirculation valve; and filter processing means for filtering information signal of said intake pressures as detected upon enforcive opening/closing of said exhaust gas recirculation valve in conformance with said timing; and wherein said fault decision means makes decision as to occurrence of a fault in said exhaust gas recirculation control means on the basis of the intake pressure undergone said filter processing.

30. A fault detecting apparatus for an exhaust gas recirculation control system according to claim 29, wherein said compensation means includes an analogue-to-digital converter for converting the information of said throttle opening degree into a digital signal; and wherein at least one of said fault decision reference value and the value derived from said intake pressure is corrected in dependence on a minimum resolution of said analogue-to-digital converter.

31. A fault detecting apparatus for an exhaust gas recirculation control system according to claim 1, further comprising:

bypass air flow rate control means for controlling rate of intake air flow which bypasses said throttle valve;

wherein said compensation means includes bypass air flow rate change inhibit means for inhibiting change of said bypass air flow rate during a period in which said fault decision enabling condition is satisfied.

32. A fault detecting apparatus for an exhaust gas recirculation control system according to claim 31, wherein said engine operation state information contains at least information concerning an engine load of said internal combustion engine;

wherein said compensation means includes engine load change detecting means for detecting a change of said engine load; and wherein upon detection of a change in said engine load, said fault decision enabling condition is invalidated from satisfaction.

33. A fault detecting apparatus for an exhaust gas recirculation control system according to claim 31, wherein said engine operation state information contains at least information concerning an engine load of said internal combustion engine; and wherein said compensation means corrects at least one of said fault decision reference value referenced by said fault decision means upon said comparison and said value derived from the intake pressures detected upon enforcive opening/closing of said exhaust gas recirculation valve with the engine load detected substantially concurrently with detection of said intake pressure.

34. A fault detecting apparatus for an exhaust gas recirculation control system according to claim 31, further comprising:

an engine load installed in association with said internal combustion engine to be driven thereby; and engine load driving means for driving said engine load in response to a power-on command for said engine load;

wherein said compensation means includes engine load inhibit means for inhibiting said engine load from being driven so long as said fault decision enabling condition is satisfied.

35. A fault detecting apparatus for an exhaust gas recirculation control system according to claim 31, wherein said operation state information contains at least information concerning atmospheric pressure;

wherein said fault decision means makes decision as to occurrence of a fault in said exhaust gas recirculation control means by comparing the value derived from the intake pressure detected upon enforcive opening/closing of said exhaust gas recirculation valve with a fault decision reference value; and wherein said compensation means corrects at least one of said fault decision reference value referenced by said fault decision means upon said comparison and said value derived from the intake pressures detected upon enforcive opening/closing of said exhaust gas recirculation valve by making use of said atmospheric pressure information.

36. A fault detecting apparatus for an exhaust gas recirculation control system according to claim 31, wherein said compensation means includes exhaust gas recirculation ratio equivalent value calculating means for calculating a value equivalent to an exhaust gas recirculation ratio corresponding to the exhaust gas recirculation flow rate on the basis of intake pressures detected upon enforcive opening/closing of said exhaust gas recirculation valve; and wherein said fault decision means makes decision as to occurrence of a fault in said exhaust gas recirculation control means on the basis of said exhaust gas recirculation ratio equivalent value.

37. A fault detecting apparatus for an exhaust gas recirculation control system according to claim 31, wherein said compensation means includes:

intake pressure detection timing calculating means for calculating a timing for detecting the intake pressures upon enforcive opening/closing of said exhaust gas recirculation valve; and filter processing means for filtering information signal of said intake pressures as detected upon enforcive opening/closing of said exhaust gas recirculation valve in conformance with said timing; and wherein said fault decision means makes decision as to occurrence of a fault in said exhaust gas recirculation control means on the basis of the intake pressure undergone said filter processing.

38. A fault detecting apparatus for an exhaust gas recirculation control system according to claim 1, further comprising:

bypass air flow rate control means for controlling rate of intake air flow which bypasses said throttle valve;

wherein said compensation means corrects at least one of said fault decision reference value referenced by said fault decision means upon said comparison and the value derived from the intake pressures detected upon said enforcive opening/closing of said exhaust gas recirculation valve by making use of the information of said bypass air flow rate detected substantially concurrently with detection of said intake pressure.

39. A fault detecting apparatus for an exhaust gas recirculation control system according to claim 38, wherein said engine operation state information contains at least information concerning an engine load of said internal combustion engine;

wherein said compensation means includes engine load change detecting means for detecting a change of said engine load; and wherein upon detection of a change in said engine load, said fault decision enabling condition is invalidated from satisfaction.

40. A fault detecting apparatus for an exhaust gas recirculation control system according to claim 38, wherein said engine operation state information contains at least information concerning an engine load of said internal combustion engine; and wherein said compensation means corrects at least one of said fault decision reference value referenced by said fault decision means upon said comparison and said value derived from the intake pressures detected upon enforcive opening/closing of said exhaust gas recirculation valve with the engine load detected substantially concurrently with detection of said intake pressure.

41. A fault detecting apparatus for an exhaust gas recirculation control system according to claim 38, further comprising:

an engine load installed in association with said internal combustion engine to be driven thereby; and engine load driving means for driving said engine load in response to a power-on command for said engine load;

wherein said compensation means includes engine load inhibit means for inhibiting said engine load from being driven so long as said fault decision enabling condition is satisfied.

42. A fault detecting apparatus for an exhaust gas recirculation control system according to claim 38, wherein said operation state information contains at least information concerning atmospheric pressure;

wherein said fault decision means makes decision as to occurrence of a fault in said exhaust gas recirculation control means by comparing the value derived from the intake pressure detected upon enforcive opening/closing of said exhaust gas recirculation valve with a fault decision reference value; and wherein said compensation means corrects at least one of said fault decision reference value referenced by said fault decision means upon said comparison and said value derived from the intake pressures detected upon enforcive opening/closing of said exhaust gas recirculation valve by making use of said atmospheric pressure information.

43. A fault detecting apparatus for an exhaust gas recirculation control system according to claim 38, wherein said compensation means includes exhaust gas recirculation ratio equivalent value calculating means for calculating a value equivalent to an exhaust gas recirculation ratio corresponding to the exhaust gas recirculation flow rate on the basis of intake pressures detected upon enforcive opening/closing of said exhaust gas recirculation valve; and wherein said fault decision means makes decision as to occurrence of a fault in said exhaust gas recirculation control means on the basis of said exhaust gas recirculation ratio equivalent value.

44. A fault detecting apparatus for an exhaust gas recirculation control system according to claim 38, wherein said compensation means includes:

intake pressure detection timing calculating means for calculating a timing for detecting the intake pressures upon enforcive opening/closing of said exhaust gas recirculation valve; and filter processing means for filtering information signal of said intake pressures as detected upon enforcive opening/closing of said exhaust gas recirculation valve in conformance with said timing; and wherein said fault decision means makes decision as to occurrence of a fault in said exhaust gas recirculation control means on the basis of the intake pressure undergone said filter processing.

45. A fault detecting apparatus for an exhaust gas recirculation control system according to claim 1, further comprising:

bypass air flow rate control means for controlling rate of intake air flow which bypasses said throttle valve;

wherein said compensation means includes bypass air flow rate change termination decision means for deciding whether or not change of said bypass air flow rate is terminated; and wherein said enforcive valve opening/closing means and said fault decision means are validated when said fault decision enabling condition is satisfied and when no change takes place in said bypass air flow rate.

46. A fault detecting apparatus for an exhaust gas recirculation control system according to claim 45, wherein said engine operation state information contains at least information concerning an engine load of said internal combustion engine;

wherein said compensation means includes engine load change detecting means for detecting a change of said engine load; and wherein upon detection of a change in said engine load, said fault decision enabling condition is invalidated from satisfaction.

47. A fault detecting apparatus for an exhaust gas recirculation control system according to claim 45, wherein said engine operation state information contains at least information concerning an engine load of said internal combustion engine; and wherein said compensation means corrects at least one of said fault decision reference value referenced by said fault decision means upon said comparison and said value derived from the intake pressures detected upon enforcive opening/closing of said exhaust gas recirculation valve with the engine load detected substantially concurrently with detection of said intake pressure.

48. A fault detecting apparatus for an exhaust gas recirculation control system according to claim 45, an engine load installed in association with said internal combustion engine to be driven thereby; and engine load driving means for driving said engine load in response to a power-on command for said engine load;

wherein said compensation means includes engine load inhibit means for inhibiting said engine load from being driven so long as said fault decision enabling condition is satisfied.

49. A fault detecting apparatus for an exhaust gas recirculation control system according to claim 45, wherein said operation state information contains at least information concerning atmospheric pressure;

wherein said fault decision means makes decision as to occurrence of a fault in said exhaust gas recirculation control means by comparing the value derived from the intake pressure detected upon enforcive opening/closing of said exhaust gas recirculation valve with a fault decision reference value; and wherein said compensation means corrects at least one of said fault decision reference value referenced by said fault decision means upon said comparison and said value derived from the intake pressures detected upon enforcive opening/closing of said exhaust gas recirculation valve by making use of said atmospheric pressure information.

50. A fault detecting apparatus for an exhaust gas recirculation control system according to claim 45, wherein said compensation means includes exhaust gas recirculation ratio equivalent value calculating means for calculating a value equivalent to an exhaust gas recirculation ratio corresponding to the exhaust gas recirculation flow rate on the basis of intake pressures detected upon enforcive opening/closing of said exhaust gas recirculation valve; and wherein said fault decision means makes decision as to occurrence of a fault in said exhaust gas recirculation control means on the basis of said exhaust gas recirculation ratio equivalent value.

51. A fault detecting apparatus for an exhaust gas recirculation control system according to claim 45, wherein said compensation means includes:

intake pressure detection timing calculating means for calculating a timing for detecting the intake pressures upon enforcive opening/closing of said exhaust gas recirculation valve; and filter processing means for filtering information signal of said intake pressures as detected upon enforcive opening/closing of said exhaust gas recirculation valve in conformance with said timing; and wherein said fault decision means makes decision as to occurrence of a fault in said exhaust gas recirculation control means on the basis of the intake pressure undergone said filter processing.

52. A fault detecting apparatus for an exhaust gas recirculation control system according to claim 1, wherein said engine operation state information contains at least information concerning an engine load of said internal combustion engine;

wherein said compensation means includes engine load change detecting means for detecting a change of said engine load; and wherein upon detection of a change in said engine load, said fault decision enabling condition is invalidated from satisfaction.

53. A fault detecting apparatus for an exhaust gas recirculation control system according to claim 1, wherein said engine operation state information contains at least information concerning an engine load of said internal combustion engine; and wherein said compensation means corrects at least one of said fault decision reference value referenced by said fault decision means upon said comparison and said value derived from the intake pressures detected upon enforcive opening/closing of said exhaust gas recirculation valve with the engine load detected substantially concurrently with detection of said intake pressure.

54. A fault detecting apparatus for an exhaust gas recirculation control system according to claim 53, wherein said operation state information contains at least information concerning atmospheric pressure;

wherein said fault decision means makes decision as to occurrence of a fault in said exhaust gas recirculation control means by comparing the value derived from the intake pressure detected upon enforcive opening/closing of said exhaust gas recirculation valve with a fault decision reference value; and wherein said compensation means corrects at least one of said fault decision reference value referenced by said fault decision means upon said comparison and said value derived from the intake pressures detected upon enforcive opening/closing of said exhaust gas recirculation valve by making use of said atmospheric pressure information.

55. A fault detecting apparatus for an exhaust gas recirculation control system according to claim 53, wherein said compensation means includes exhaust gas recirculation ratio equivalent value calculating means for calculating a value equivalent to an exhaust gas recirculation ratio corresponding to the exhaust gas recirculation flow rate on the basis of intake pressures detected upon enforcive opening/closing of said exhaust gas recirculation valve; and wherein said fault decision means makes decision as to occurrence of a fault in said exhaust gas recirculation control means on the basis of said exhaust gas recirculation ratio equivalent value.

56. A fault detecting apparatus for an exhaust gas recirculation control system according to claim 53, wherein said compensation means includes:

intake pressure detection timing calculating means for calculating a timing for detecting the intake pressures upon enforcive opening/closing of said exhaust gas recirculation valve; and filter processing means for filtering information signal of said intake pressures as detected upon enforcive opening/closing of said exhaust gas recirculation valve in conformance with said timing; and wherein said fault decision means makes decision as to occurrence of a fault in said exhaust gas recirculation control means on the basis of the intake pressure undergone said filter processing.

57. A fault detecting apparatus for an exhaust gas recirculation control system according to claim 1, further comprising:

an engine load installed in association with said internal combustion engine to be driven thereby; and engine load driving means for driving said engine load in response to a power-on command for said engine load;

wherein said compensation means includes engine load inhibit means for inhibiting said engine load from being driven so long as said fault decision enabling condition is satisfied.

58. A fault detecting apparatus for an exhaust gas recirculation control system according to claim 57, wherein said operation state information contains at least information concerning atmospheric pressure;

wherein said fault decision means makes decision as to occurrence of a fault in said exhaust gas recirculation control means by comparing the value derived from the intake pressure detected upon enforcive opening/closing of said exhaust gas recirculation valve with a fault decision reference value; and wherein said compensation means corrects at least one of said fault decision reference value referenced by said fault decision means upon said comparison and said value derived from the intake pressures detected upon enforcive opening/closing of said exhaust gas recirculation valve by making use of said atmospheric pressure information.

59. A fault detecting apparatus for an exhaust gas recirculation control system according to claim 57, wherein said compensation means includes exhaust gas recirculation ratio equivalent value calculating means for calculating a value equivalent to an exhaust gas recirculation ratio corresponding to the exhaust gas recirculation flow rate on the basis of intake pressures detected upon enforcive opening/closing of said exhaust gas recirculation valve; and wherein said fault decision means makes decision as to occurrence of a fault in said exhaust gas recirculation control means on the basis of said exhaust gas recirculation ratio equivalent value.

60. A fault detecting apparatus for an exhaust gas recirculation control system according to claim 57, wherein said compensation means includes:

intake pressure detection timing calculating means for calculating a timing for detecting the intake pressures upon enforcive opening/closing of said exhaust gas recirculation valve; and filter processing means for filtering information signal of said intake pressures as detected upon enforcive opening/closing of said exhaust gas recirculation valve in conformance with said timing; and wherein said fault decision means makes decision as to occurrence of a fault in said exhaust gas recirculation control means on the basis of the intake pressure undergone said filter processing.

61. A fault detecting apparatus for an exhaust gas recirculation control system according to claim 1, wherein said operation state information contains at least information concerning atmospheric pressure;

wherein said fault decision means makes decision as to occurrence of a fault in said exhaust gas recirculation control means by comparing the value derived from the intake pressure detected upon enforcive opening/closing of said exhaust gas recirculation valve with a fault decision reference value; and wherein said compensation means corrects at least one of said fault decision reference value referenced by said fault decision means upon said comparison and said value derived from the intake pressures detected upon enforcive opening/closing of said exhaust gas recirculation valve by making use of said atmospheric pressure information.

62. A fault detecting apparatus for an exhaust gas recirculation control system according to claim 61, wherein said engine operation state information contains at least information concerning an engine load of said internal combustion engine;

wherein said compensation means includes engine load change detecting means for detecting a change of said engine load; and wherein upon detection of a change in said engine load, said fault decision enabling condition is invalidated from satisfaction.

63. A fault detecting apparatus for an exhaust gas recirculation control system according to claim 61, wherein said compensation means includes exhaust gas recirculation ratio equivalent value calculating means for calculating a value equivalent to an exhaust gas recirculation ratio corresponding to the exhaust gas recirculation flow rate on the basis of intake pressures detected upon enforcive opening/closing of said exhaust gas recirculation valve; and wherein said fault decision means makes decision as to occurrence of a fault in said exhaust gas recirculation control means on the basis of said exhaust gas recirculation ratio equivalent value.

64. A fault detecting apparatus for an exhaust gas recirculation control system according to claim 63, wherein said engine operation state information contains at least information concerning an engine load of said internal combustion engine;

wherein said compensation means includes engine load change detecting means for detecting a change of said engine load; and wherein upon detection of a change in said engine load, said fault decision enabling condition is invalidated from satisfaction.

65. A fault detecting apparatus for an exhaust gas recirculation control system according to claim 61, wherein said compensation means includes:
intake pressure detection timing calculating means for calculating a timing for detecting the intake pressures upon enforcive opening/closing of said exhaust gas recirculation valve; and
filter processing means for filtering information signal of said intake pressures as detected upon enforcive opening/closing of said exhaust gas recirculation valve in conformance with said timing; and
wherein said fault decision means makes decision as to occurrence of a fault in said exhaust gas recirculation control means on the basis of the intake pressure undergone said filter processing.

66. A fault detecting apparatus for an exhaust gas recirculation control system according to claim 65, wherein said engine operation state information contains at least information concerning an engine load of said internal combustion engine;
wherein said compensation means includes engine load change detecting means for detecting a change of said engine load; and
wherein upon detection of a change in said engine load, said fault decision enabling condition is invalidated from satisfaction.

67. A fault detecting apparatus for an exhaust gas recirculation control system according to claim 1, wherein said compensation means includes exhaust gas recirculation ratio equivalent value calculating means for calculating a value equivalent to an exhaust gas recirculation ratio corresponding to the exhaust gas recirculation flow rate on the basis of intake pressures detected upon enforcive opening/closing of said exhaust gas recirculation valve; and
wherein said fault decision means makes decision as to occurrence of a fault in said exhaust gas recirculation control means on the basis of said exhaust gas recirculation ratio equivalent value.

68. A fault detecting apparatus for an exhaust gas recirculation control system according to claim 67, wherein said engine operation state information contains at least information concerning an engine load of said internal combustion engine;
wherein said compensation means includes engine load change detecting means for detecting a change of said engine load; and
wherein upon detection of a change in said engine load, said fault decision enabling condition is invalidated from satisfaction.

69. A fault detecting apparatus for an exhaust gas recirculation control system according to claim 67, wherein said compensation means includes:
intake pressure detection timing calculating means for calculating a timing for detecting the intake pressures upon enforcive opening/closing of said exhaust gas recirculation valve; and
filter processing means for filtering information signal of said intake pressures as detected upon enforcive opening/closing of said exhaust gas recirculation valve in conformance with said timing; and
wherein said fault decision means makes decision as to occurrence of a fault in said exhaust gas recirculation control means on the basis of the intake pressure undergone said filter processing.

70. A fault detecting apparatus for an exhaust gas recirculation control system according to claim 69, wherein said engine operation state information contains at least information concerning an engine load of said internal combustion engine;
wherein said compensation means includes engine load change detecting means for detecting a change of said engine load; and
wherein upon detection of a change in said engine load, said fault decision enabling condition is invalidated from satisfaction.

71. A fault detecting apparatus for an exhaust gas recirculation control system according to claim 1, wherein said compensation means includes:
intake pressure detection timing calculating means for calculating a timing for detecting the intake pressures upon enforcive opening/closing of said exhaust gas recirculation valve; and
filter processing means for filtering information signal of said intake pressures as detected upon enforcive opening/closing of said exhaust gas recirculation valve in conformance with said timing; and
wherein said fault decision means makes decision as to occurrence of a fault in said exhaust gas recirculation control means on the basis of the intake pressure undergone said filter processing.

72. A fault detecting apparatus for an exhaust gas recirculation control system according to claim 71, wherein said engine operation state information contains at least information concerning an engine load of said internal combustion engine;
wherein said compensation means includes engine load change detecting means for detecting a change of said engine load; and
wherein upon detection of a change in said engine load, said fault decision enabling condition is invalidated from satisfaction.

* * * * *